(12) United States Patent
Roslak et al.

(10) Patent No.: US 7,010,501 B1
(45) Date of Patent: Mar. 7, 2006

(54) PERSONAL SHOPPING SYSTEM

(75) Inventors: Thomas K. Roslak, Eastport, NY (US); Adam Petrovich, Pittsburgh, PA (US); Jerome Swartz, Old Field, NY (US); Ian Jenkins, Stony Brook, NY (US); John Pellaumail, Wargrave (GB)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/490,529

(22) Filed: Jan. 25, 2000

Related U.S. Application Data

(63) Continuation-in-part of application No. 09/232,142, filed on Jan. 16, 1999, now Pat. No. 6,640,214, which is a continuation-in-part of application No. 09/087,086, filed on May 29, 1998, now Pat. No. 6,101,483.

(51) Int. Cl.
  *G06F 17/60* (2006.01)

(52) U.S. Cl. .......................................... 705/26; 705/27

(58) Field of Classification Search ............ 705/26–27, 705/14; 710/7, 101; 235/462.01, 462.45, 235/472.01, 454, 439, 383, 385; 341/26; D14/348, 453, 435, 436, 470, 461, 462.01; 358/504–514; 359/196; 348/143; G06F 17/60
See application file for complete search history.

(56) References Cited

U.S. PATENT DOCUMENTS

| | | | | |
|---|---|---|---|---|
| 4,758,717 A | * | 7/1988 | Shepard et al. | 235/462.46 |
| 5,023,929 A | * | 6/1991 | Call | 725/14 |
| 5,047,614 A | * | 9/1991 | Bianco | 235/385 |
| 5,223,844 A | * | 6/1993 | Mansell et al. | 342/357.07 |
| 5,233,169 A | * | 8/1993 | Longacre, Jr. | 235/462.15 |
| 5,380,994 A | * | 1/1995 | Ray | 235/472 |
| 5,410,141 A | * | 4/1995 | Koenck et al. | 235/472 |
| 5,422,473 A | * | 6/1995 | Kamata | 235/384 |
| 5,424,524 A | * | 6/1995 | Ruppert et al. | 705/8 |
| 5,437,346 A | * | 8/1995 | Dumont | 186/61 |
| 5,468,942 A | * | 11/1995 | Oosterveen et al. | 235/383 |
| 5,496,540 A | * | 3/1996 | Gaffar et al. | 424/49 |
| 5,581,707 A | * | 12/1996 | Kuecken | |
| 5,595,264 A | * | 1/1997 | Trotta | 235/383 |
| 5,640,002 A | * | 6/1997 | Ruppert et al. | 235/462.46 |
| 5,664,110 A | * | 9/1997 | Green et al. | 705/26 |

(Continued)

FOREIGN PATENT DOCUMENTS

JP          10191309 A   *   7/1998

OTHER PUBLICATIONS

Unknown, Scanning wand makes checkout lines disappear, Marketing News, v28, n14, p6, Jul. 4, 1994.*

(Continued)

*Primary Examiner*—Cuong Nguyen
(74) *Attorney, Agent, or Firm*—Amin & Turocy, LLP

(57) ABSTRACT

The present invention relates to a personal shopping system for combined use in both the home of a user and a shopping establishment. The system includes a host computer which is coupled to a host modem and, optionally, to at least one wireless multi-access point. The portable terminal can be used in both the shopping establishment and the home of the user. It is configured to read bar codes associated with items related to shopping, and includes a memory, a bar code reader, a wireless transceiver, and a data interface. The data interface of the terminal communicates with a data interface of the shopping establishment kiosk cradle or directly with the shopping establishment's communications network.

21 Claims, 50 Drawing Sheets

U.S. PATENT DOCUMENTS

| | | | | |
|---|---|---|---|---|
| 5,665,953 | A * | 9/1997 | Mazzamuto et al. | 235/383 |
| 5,907,147 | A * | 5/1999 | La | 235/472 |
| 5,979,757 | A * | 11/1999 | Tracy et al. | 705/27 |
| 6,021,392 | A * | 2/2000 | Lester et al. | 705/2 |
| 6,055,514 | A * | 4/2000 | Wren | 705/27 |
| 6,084,528 | A * | 7/2000 | Beach et al. | 340/5.9 |
| 6,091,956 | A * | 7/2000 | Hollenberg | 455/456.5 |
| 6,168,079 | B1 * | 1/2001 | Becker et al. | 235/383 |
| 6,236,974 | B1 * | 5/2001 | Kolawa et al. | 705/7 |
| 6,246,993 | B1 * | 6/2001 | Dreyer et al. | 705/9 |
| 6,314,406 | B1 * | 11/2001 | O'Hagan et al. | 705/14 |
| 6,325,292 | B1 * | 12/2001 | Sehr | 235/492 |
| 6,697,103 | B1 * | 2/2004 | Fernandez et al. | 348/143 |
| 2001/0014167 | A1 * | 8/2001 | Gifford et al. | |
| 2003/0042314 | A1 * | 3/2003 | Good et al. | |

OTHER PUBLICATIONS

Anonymous, Customers take control, Retail World, v51n1 pp. 15, Jan. 26 - Feb. 8, 1998.*

Unknown, All the technology for tomorrow's shopper is here today..., Computergram International, n2782, Oct. 31, 1995.*

* cited by examiner

FIG. 31

```
WELCOME
THIS IS BASKET
NUMBER 1
PRESS = TO CONTINUE
```

FIG. 42A

```
HEINZ KETCHUP
20 OZ SQUEEZE
BASKET 1    QUANTITY 2
BASKET      ALTERNATE
```

FIG. 42B

PERSONAL SHOPPING SYSTEM

RELATED APPLICATIONS

This application is a continuation-in-part of U.S. patent application Ser. No. 09/232,142, filed on Jan. 16, 1999, now U.S. Pat. No. 6,640,214, which itself is a continuation-in-part of U.S. patent application Ser. No. 09/087,086, filed on May 29, 1998, now U.S. Pat. No. 6,101,483.

FIELD OF USE

This invention relates generally to an improved system for ordering and supplying selected goods and services to users located at a shopping or warehouse location and one or more remote locations. More specifically, this invention relates to a centrally-controlled personal shopping system which may be used from the home or shopping establishment to order and purchase selected goods. The improved system utilizes a variety of different portable shopping terminals linked to a controller via one or more hardwire or wireless communications networks.

BACKGROUND OF THE INVENTION

Hand-held computer terminals are well known in the prior art for many different applications, including their use in consumer portable shopping applications. Examples of prior art hand held terminals include the Palm Pilot™ and Sharp Wizard organizer as well as terminals available from Symbol Technologies, Inc., the assignee of the present invention, which is generally described in U.S. Pat. No. 4,758,717.

Another example of the use of hand held terminals, in the context of a portable shopping application, is described in U.S. Pat. No. 5,468,942 to Oosterveen et al. The Oosterveen '942 patent describes a system in which an authorized customer is issued a terminal having an integrated bar code scanner to record merchandise purchases. After items are scanned with the bar code scanner, the terminal maintains a record of merchandise selected for purchase by the customer within an internal memory. Prior to exiting the store, the information stored in the memory of the scanner is down loaded through a communication port attached to a terminal dispenser, and a printed ticket of the customer's purchases is printed on a printer. The customer then proceeds to a check out register where the customer tenders payment for the purchased merchandise. Occasional customers may be audited in order to ensure integrity of the self-service system.

U.S. Pat. No. 5,047,614 to Bianco discloses a method and apparatus for computer-aided shopping. A consumer is provided with a hand-held bar code reader and can scan various items at home. The user can order from home over a modem, or can dock the bar code reader in a kiosk at a store, and can then receive a printed shopping list with directions. Yet further, a list of items can be transmitted from the store kiosk to a warehouse for remote picking.

U.S. Pat. No. 5,664,110 to Green et al. discloses a remote ordering system. A user is provided with a display/processor unit which has an interactive video display for building a shopping list. Information on various products is stored in local memory in the display/processor unit. Communication between the display/processor unit and a central data format/transfer computer takes place when an order is to be placed, or if the locally-available product information needs to be updated or is missing. Communication can be by telephone, fiber optics and the like.

Co-assigned U.S. patent application Ser. No. 08/866,690 filed May 30, 1997 discloses a portable shopping and order fulfillment system with enhanced ordering and product data profiles, order collection and order fulfillment. The disclosure of U.S. patent application Ser. No. 08/866,690 is hereby expressly incorporated herein by reference, as are the disclosures of its parent U.S. patent application Ser. No. 08/780,023 filed Dec. 20, 1996 and its grandparent U.S. patent application Ser. No. 08/706,579 filed Sep. 5, 1996.

The prior art self-checkout systems can enhance the consumer's shopping experience. However, they exhibit certain deficiencies. For example, they may not provide adequate security, or may require cumbersome separate cards for security purposes. Further, prior art systems may not be able to deal effectively with multiple shopping establishments or varying user needs. There currently exists a need for a personal shopping system portable terminal with a convenient security system, and which is capable of enhanced shopping database management.

In addition, there exists a need for a consumer friendly system which is easy to use, provides multiple functions to a user and which can be used for multiple applications, including non-shopping related functions without modification. There also exists a need for an improved cradle system for receiving multiple data terminals. The need exists for a field configurable cradle setup with multiple communication protocols, modularity and simplicity of design.

SUMMARY OF THE INVENTION

It is an object of the present invention to provide an improved portable terminal which may be used in a personal shopping system.

It is another object of the present invention to provide such an improved portable terminal with an enhanced security system.

It is yet another object of the present invention to provide an improved portable terminal which can be used by a given consumer in both a home and store location, and can perform enhanced shopping database management.

It is still another object of the present invention to provide an improved cradle system which provides modular scalability and multiple communication alternatives.

It is a further object of the present invention to provide a cradle architecture which communicates with industry standard network architecture and which is held configurable in terms of hardware configurations and communications network setup.

It is a further object of the present invention to provide a system for ordering and supplying selected goods and services to in-store and out-of-store customers.

It is a still further object of the present invention relates to provide a centrally-controlled shopping system which may be used from the home or shopping establishment to order and purchase selected goods.

The present invention provides a personal shopping system for combined use in both the home of the user and at least one shopping establishment. The system includes a host computer coupled to a host modem or appropriate data communications device, and can include at least one shopping establishment kiosk cradle. The system further includes a portable terminal according to the present invention which comprises a two-way data interface configured to read bar codes associated with items related to shopping, and a memory coupled to the two-way data interface for storing data associated with the bar codes. The two-way data interface is configured for data exchange with other data interfaces to be discussed below.

The shopping establishment kiosk cradle includes a kiosk portable terminal-receiving station and a kiosk data interface associated with the kiosk portable terminal-receiving station. The shopping establishment kiosk cradle accepts the data associated with the bar codes from the portable terminal through the kiosk data interface and the terminal two-way data interface when the portable terminal is received in the kiosk portable terminal-receiving station, and then downloads the data associated with the bar codes to the host computer.

A home cradle associated with the home of the user is also provided. The home cradle includes a home portable terminal-receiving station and a home data interface which is associated with the home portable terminal-receiving station. The home cradle also includes a home data transfer circuit which is coupled to the home data interface for data exchange therewith. The home data transfer circuit is configured for data exchange with the host modem or other data communications device. The terminal two-way data interface of the portable terminal is configured for data exchange with the home data interface when the portable terminal is received in the home portable terminal-receiving station. The home data transfer circuit supplies the host computer with the data associated with the bar codes when the portable terminal is received in the home portable terminal-receiving station. The host computer receives the data associated with the bar codes, whether from the kiosk cradle or the home cradle, and stores the data in a shopping list data base.

The portable terminal can contain intrinsic identifying indicia to identify the user to the host computer. The memory of the portable terminal can be configured to store multiple lists of data associated with the bar codes, as multiple shopping lists corresponding to multiple shopping establishments.

The present invention comprises the portable terminal, the portable terminal in combination with the home cradle, and the portable terminal and home cradle in combination with the remaining components of the system, including the host computer, the host modem or appropriate communications device, and at least one shopping establishment kiosk cradle.

The present invention also provides a method of placing an order for items including at least one of goods and services. The method includes the steps of reading bar codes associated with the items via a two-way terminal data interface of a portable terminal; storing data associated with the bar codes in a memory of the portable terminal; and then transferring the data associated with the bar codes to a host computer for storage in a shopping list database. The transferring step includes the sub-steps of transferring the data associated with the bar codes from the memory of the portable terminal to the two-way terminal data interface of the portable terminal; transferring the data associated with the bar codes from the two-way terminal data interface to a data interface of either a kiosk portable terminal-receiving station of a shopping establishment kiosk cradle or a home portable terminal-receiving station of a home cradle; and then transferring the data to the host computer. The method further includes transmitting identifying indicia to the host computer to identify the user to the host computer; the indicia can be the aforementioned intrinsic identifying indicia contained in the portable terminal. A telephone "caller ID" function can be employed for additional security.

The present invention also provides for an improved terminal design and cradle assembly which may be utilized in numerous applications such as, for example, inventory control, package tracking and health maintenance tracking. The improved terminal provides for improved power management, self-diagnosis, cradle communications and system architecture as well as improved economics and programmability. In combination, the present invention also provides for an improved field configurable cradle assembly which permits the use of multiple terminals at a location and simultaneous data transfers over an industry standard network architectures such as Frame Relay, ATM, Ethernet and RS232 serial communication channels. The cradles are programmable to control multiple terminal data communications and may be attached and/or stacked to each other to provide multiple physical layouts at a user receiving area. The cradles may then be used to "synch" data through a central station and to transfer data to various destinations.

In a preferred embodiment of the present invention, the terminal features a rugged, ergonomically designed housing having a generally elongated rectangular shape which fits into user's hand. A terminal display, which is preferably a touch sensitive display, is provided on the front surface of the housing along with a plurality of buttons each of which are associated with at least one user function or application upon activation. The terminal further includes a bar code reader having a visible light source for displaying the area of reading for the bar code reader upon activation of a bar code reading function, wherein the terminal is configured to transmit the visible light away from the top surface of the terminal's housing such that the light is visible to the user holding the terminal. In addition, a plurality of bar code activation buttons are provided on one or more surfaces of the housing for activating the bar code reader such that the user's hand supports the terminal from the bottom and side surfaces of the terminal upon activation of the bar code reader with either of the bar code activation buttons, and whereby the user can view the display and the visible light source upon activation of either of the bar code activation buttons.

Further, a bar code storage device is provided for communicating with a centralized controller over at least one communications network. The bar code storage device includes an egg-shaped housing, a bar code reader for reading bar codes from a hardcopy source, memory storage means coupled to the bar code reader for storing the bar codes, and communication means for transferring the bar codes to the controller over the at least one network. The bar code reader further includes a visible light indicator for indicating the scanning status of the bar code reader and at least one bar code activation button located on the top surface of the terminal for activating the bar code reader.

In addition, the present invention provides for a "wearable" scanning system for communicating information to and from a user over at least one communications network. The scanning system is constructed and arranged to be worn by the user, and includes a computer processor worn on the user's forearm in communication with the at least one network, a ring-like scanning device worn on the customer's hand in communication with the computer processor, and a headset in communication with the computer processor. The headset further includes a speaker and a miniaturized display device for providing multimedia information to the user.

The present invention also provides for a personal shopping system for servicing customers at shopping establishment and remote locations over at least one communications network. In accordance with a preferred embodiment of the present invention, the system includes: at least one point-of-sale (POS) system located in the shopping establishment; at least one establishment or remotely located shopping terminal for acquiring shopping related data; and a centrally located controller for communicating with the POS system and the at least one shopping terminal via the at least one network, processing the shopping related data, and controlling shopping transactions engaged in by the customers.

Also disclosed is a theft prevention system for use in a shopping establishment that utilizes at least one portable bar scanner in communication with a centralized controller. The theft prevention system includes one or more proximity sensors in communication with the controller for monitoring product sales areas in the shopping establishment, one or more indicators in communication with each of the proximity sensors for indicating the scan status of sales items corresponding to the product sales areas being monitored by the proximity sensors.

In another aspect of the present invention, a method is provided for shopping at an establishment having a centrally-controlled shopping system for processing shopping transactions and orders from shopping establishment and remote locations, the system having a point-of-sale (POS) system located in the shopping establishment, at least one establishment or remotely located portable shopping terminal, and a controller in communication with the POS system and the at least one terminal via at least one communications network. The method includes the steps of associating the at least one terminal with the least one network and a customer, and scanning one or more items to be purchased using the portable terminal. The associating step can include the steps of checking-in at an customer entry station and obtaining an authorized terminal from a terminal receptacle, or alternatively, having the terminal automatically or "freely" associate itself with a corresponding in-store communications network. After the items have been scanned, the customer returns the terminal to the terminal receptacle; collects a transaction ticket corresponding to the scanned items; and purchases the scanned items indicated on the transaction ticket at a customer check-out station.

A further method is disclosed for communicating data to and from a remote shopping terminal over a telephone line without notifying the user of the terminal, the method comprising the steps of receiving a caller ID signal at the remote device; identifying the caller ID signal as a preprogrammed and authorized caller ID; deactivating an audible or visual signal indicative of a required user response; engaging the line to establish communication with the remote device; and generating a non-intrusive signal indicating data transfer activity on the telephone line. Such a system is advantageous for use in a personal shopping system wherein information, such as price, product description and other catalog information, is automatically downloaded over the telephone to a home shopping terminal during overnight hours.

Further objects, features and advantages of the invention will become apparent from the following detailed description taken in conjunction with the accompanying figures showing illustrative embodiments of the invention.

BRIEF DESCRIPTION OF THE DRAWINGS

The present invention will be understood and appreciated more fully from the following detailed description, taken in conjunction with the drawings, in which:

FIG. 31 shows an example of screens corresponding to the bar code scanner test of FIG. 28;

FIGS. 42A through 42E are sample messages corresponding to the picking module shown in FIG. 36;

DETAILED DESCRIPTION OF THE PREFERRED EMBODIMENTS

Figure 1:
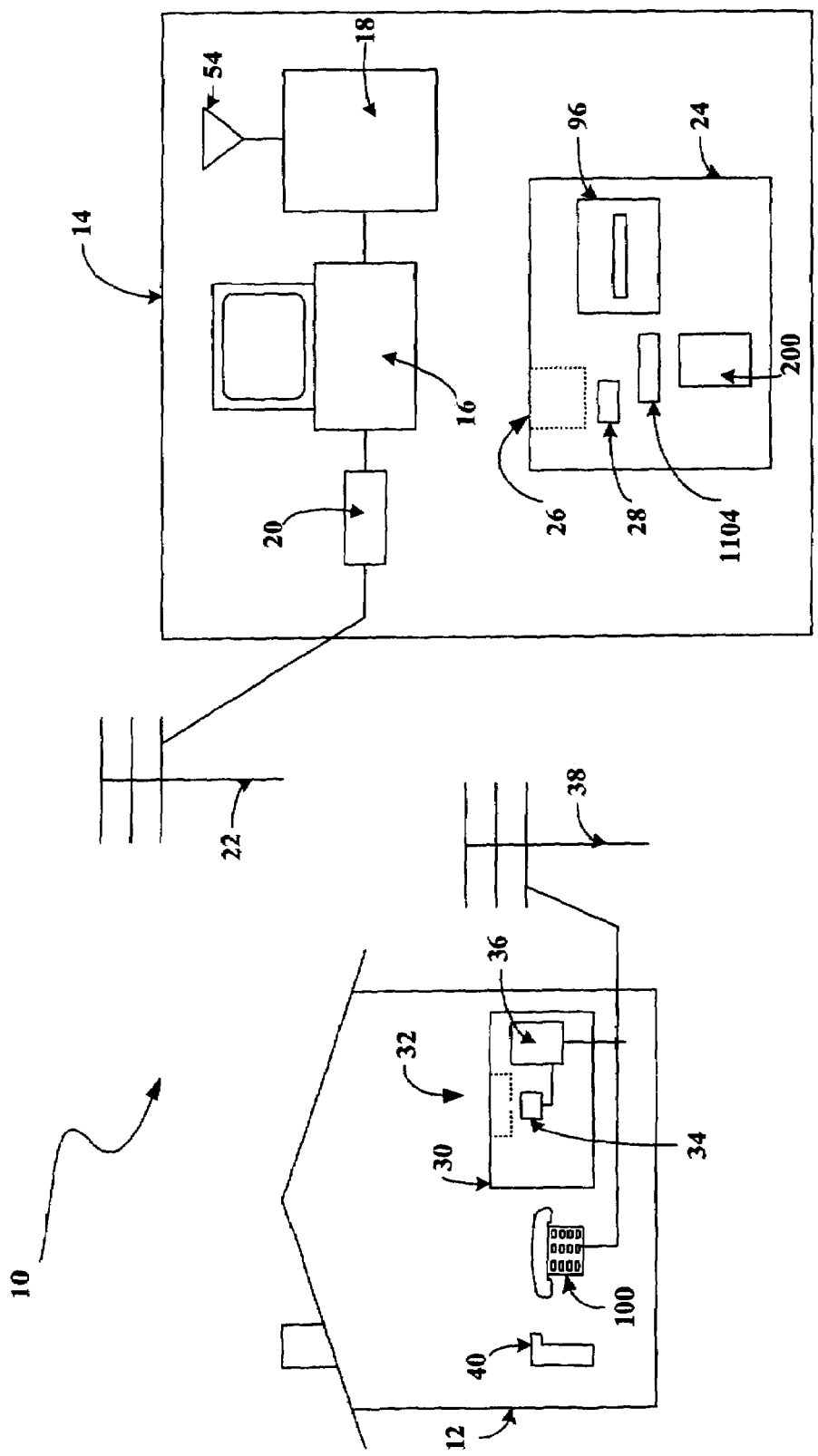
FIG. 1 is a semi-schematic view of a personal shopping system employing the portable terminal of the present invention.

With reference to FIG. 1, a personal shopping system 10 is suitable for combined use in both a home 12 of a user and at least one shopping establishment 14. The system includes a host computer 16. Host computer 16 can be located in shopping establishment 14, or can be otherwise associated therewith; e.g., it can be remotely located therefrom but in communication with other components of the system within shopping establishment 14. For example, the host computer 16 could be a grocery or retail store's main computer which is coupled to a set of cash registers; a central site system dedicated for home shopping or shopping generally from locations other than a store's retail facility; or a combination of both. Internet access to host 16 can also be employed.

System 10 also optionally includes at least one wireless multi-access point 18 which is associated with the shopping establishment 14 and which is coupled to the host computer 16. Wireless multi-access point 18, if used, would normally be present in or near shopping establishment 14 in order to pick up signals from a portable terminal to be discussed below, when the portable terminal is present within the shopping establishment 14. Alternatively, the portable terminal can be used to establish a connection to the shopping establishment's host computer via a commercial wireless carrier connected to host computer and/or the shopping establishment's communications network.

The system further includes a host modem 20, or suitable communications device, which can be situated similarly to the host computer and which is coupled to the host computer 16. Host modem 20 can in turn be coupled to a public or private telephone line 22 which may be hard-wired, cellular, satellite and the like.

The system further includes at least one shopping establishment kiosk cradle 24 coupled to the host computer 16. The kiosk cradle 24 in turn includes a kiosk portable terminal-receiving station 26 and a kiosk data interface 28 which is associated with the kiosk portable terminal-receiving station 26. By "associated" it is meant that the kiosk electrical or optical interface 28 is located so as to communicate with a two-way data interface of the portable terminal, to be discussed below, when the portable terminal is placed in the portable terminal-receiving station 26.

The system yet further includes a home cradle 30 which is associated with the home 12 of the user. In this context, "associated" would normally imply that the home cradle 30 is located within the home or at some nearby location where it is convenient for the user to use the home cradle without having to separately travel to a shopping establishment 14. Home cradle 30 includes a home portable terminal-receiving station 32 and a home data interface 34 which is associated with the home portable terminal-receiving station 32. Again, by "associated" it is meant that the data interface 34 is so located so as to interface with a corresponding two-way data interface of a portable terminal, to be discussed below, when the portable terminal is placed in the portable terminal-receiving station 32 of the home cradle 30. It is to be understood that the home cradle 30 can be arranged and configured for use in other locations, such as the office or other public location.

Home cradle 30 still further includes a home data transfer data circuit 36. Transfer circuit 36 is coupled to the home data interface 34 so as to engage in data exchange with the electrical or optical interface, and is also configured for data exchange with the host modem 20. Alternatively, the data exchange can be performed over a telephone line using Dual Tone Multi-Frequency (DTMF) communication for accessing a voice response system that confirms the user's order over the telephone. Such data transfer can occur, for example, through the telephone line 38 which can be any of the types discussed above for telephone line 22. The home cradle can be used as a so-called "portable portal" for creating and managing shopping lists via an Internet web site or a modem connected to a host to order products and obtain information about products.

Figure 3B:
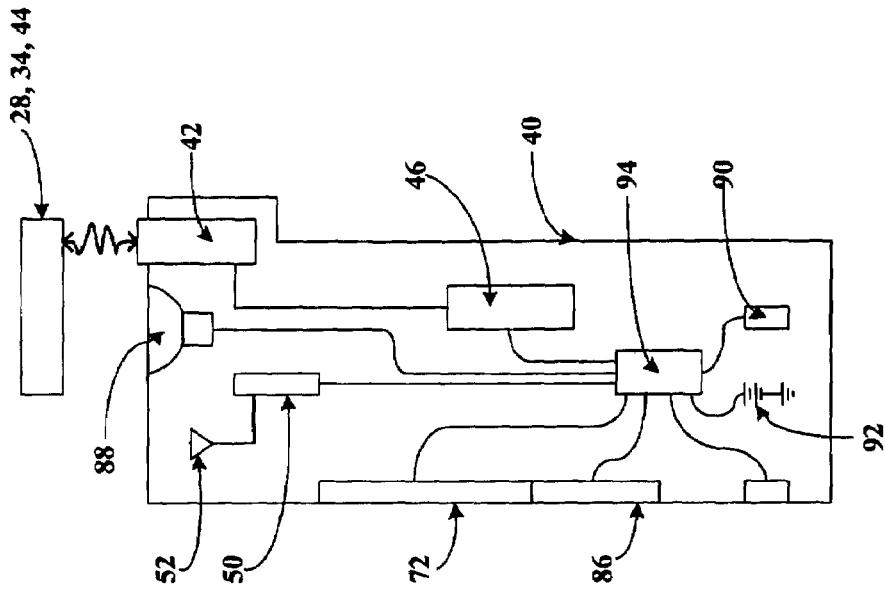
FIG. 3B is a side semi-schematic cross-sectional view of the portable terminal of FIG. 3A.
Figure 3A:
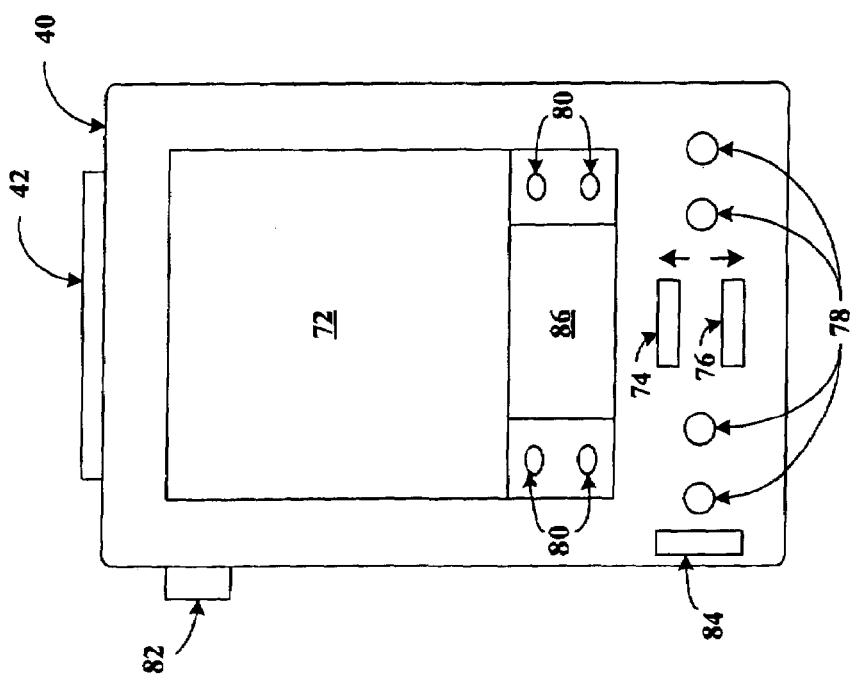
FIG. 3A is a front elevational view of a preferred embodiment of the portable terminal of the present invention.

The system also includes a portable terminal 40. It will, of course, be appreciated that normally there will be many such terminals for the different users of the system. However, only a single terminal 40 is shown in the drawings in order to clearly illustrate the principles of the present invention. Referring now to FIGS. 3A and 3B, another preferred embodiment of portable terminal 40 includes a two-way data interface 42, such as a laser or CCD bar code reader, which is configured to read bar codes associated with items 44 related to shopping. The items 44 can be, for example, empty packages of items which it is desired to re-stock; items from a catalog representing goods or services; and the like. Portable terminal 40 also includes a memory 46 coupled to the two-way data interface 42 for storing data associated with the bar codes from the items 44. Memory 46 could include RAM and also identification ROM circuitry discussed below. Thus, the memory would be used to store lists of products desired for purchase. Terminal two-way data interface 42 is configured for data exchange with the kiosk data interface 28 when the portable terminal 40 is received in the kiosk portable terminal-receiving station 26. Terminal data interface 48 is also configured for data exchange with the home data interface 34 when the portable terminal 40 is received in the home portable terminal-receiving station 32. Items 28, 34 & 44 are all depicted schematically by a single rectangle in FIG. 3B; it will be appreciated that they are in fact separate items which are merely illustrated in this fashion for convenience.

Portable terminal 40 can further optionally include a wireless transceiver 50 which is coupled to memory 46 and which is configured for wireless communication with the optional at least one wireless multi-access point 18 when a user of the system takes the portable terminal 40 into the shopping establishment 14. Optional transceiver 50 may be provided with a suitable antenna 52 which is compatible with an antenna 54 of wireless multi-access point 18 (as shown in FIG. 1). In a preferred embodiment, the wireless transceiver is either a direct sequencing or frequencing shopping communication scheme working at ranges at or above 900 MHZ. One example of such a wireless network is the Spectrum 24™ system sold by Symbol Technologies, Inc., the assignee of the present invention. Optionally, an initialization procedure can be carried out on terminal 40 when entering a shopping establishment 14, by swiping a special bar code or otherwise, to set an appropriate frequency for wireless communication and to enter an appropriate code for security and identification purposes.

In still another further preferred embodiment of the present invention, a "free association" of the terminal 40 with a corresponding communications network is performed when the user enters the shopping establishment 14. This free association is performed using a service channel or dedicated frequency which the terminal 40 utilizes to determine whether the user can logon to the shopping establishment's communications network. As the shopper enters the store, the terminal 40, which includes a radio receiver, periodically scans for a signal or "ping" on the service channel. When the signal is received, a network protocol is used for automatically determining whether that particular terminal is authorized for use in the shopping establishment. If so, the terminal 40 is authorized and processing begins using a store protocol. This method of "associating" the terminal 40 with a corresponding communications network is especially advantageous in that no customer card or card reader is required.

Further, for security reasons, the above-described "free association" system is preferably designed to have a very limited access points located at the or just within the entrance(s) to the shopping establishment. By limiting the physical range of the access points, the shopping establishment is better protected against unauthorized access of the communications network occurring outside the physical boundaries of the store.

In operation, home data transfer circuit 36 supplies host computer 16 with the data associated with the bar codes of the shopping-related items 44 when the portable terminal 40 is received in the home portable terminal-receiving station 32. Shopping establishment kiosk cradle 24 accepts the data associated with the bar codes of the shopping-related items 44 from the portable terminal 40 through the kiosk data interface 28 and the terminal two-way data interface 42 when the portable terminal 40 is received in the kiosk portable terminal-receiving station 26, and then downloads the data associated with the bar codes of shopping-related items 44 to the host computer 16. Host computer 16 receives the data associated with the bar codes of the shopping-related items 44 and stores the data in a shopping list database.

Figure 4:
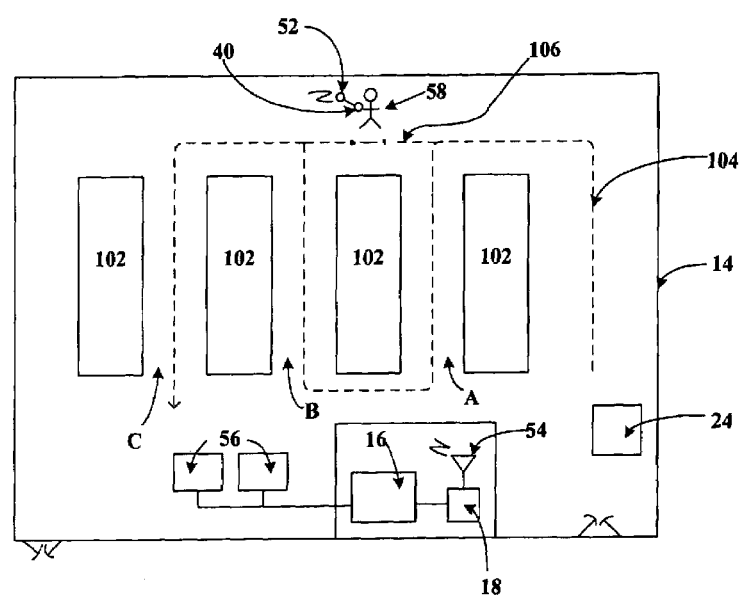
FIG. 4 is a semi-schematic plan view showing use of the portable terminal in a shopping establishment.

With reference to FIG. 4, the system 10 can also include at least one point-of-sale checkout terminal 56 associated with the shopping establishment 14 and coupled to the host computer 16. Point-of-sale checkout terminal 56 can be employed by a user 58 to pay for purchases made with system 10 (optionally, with assistance from a sales clerk). Alternatively, the checkout terminal could be an automatic payment center for receiving payment, bagging material and removing/detaching electronic surveillance tags, such as RFID tags, magnetic tags or ink tags. The area would also be monitored by an attendant serving multiple registers 56, a video surveillance camera and/or a "smart" video surveillance system utilizing video cameras and object identification software.

The portable terminal 40 can further include intrinsic identifying indicia (not amenable to further illustration) to identify the bearer to the host computer 16 as an authorized user 58. Such indicia can include a unique identification code which can be "burned in" to circuitry (e.g., ROM, PROM, EPROM, EEPROM and the like) of the portable terminal 40 or which may be set, for example, by dip switches or stored in a secure manner in RAM or in any other convenient manner. Thus, once the user 58 receives authorized possession of the portable terminal 40, he or she need not have a separate ID card. Terminal 40 can thus function as an "identifying token" or "electronic key." A personal identification number (PIN) can be used instead, or as a supplement, for added security (to guard against theft of terminal 40). The terminal 40 can also include a so-called "fingerprint chip", which can be used for fingerprint identification of the user. Such "fingerprint chips" are commercially available and known in the art. Yet further, terminal 40 can be used in conjunction with a credit or debit card of the user and can have identical identifying indicia (and an identical PIN); interface with the magnetic strip reader could be provided for entering credit card information into terminal 40 or directly into host 16.

Figure 5B:
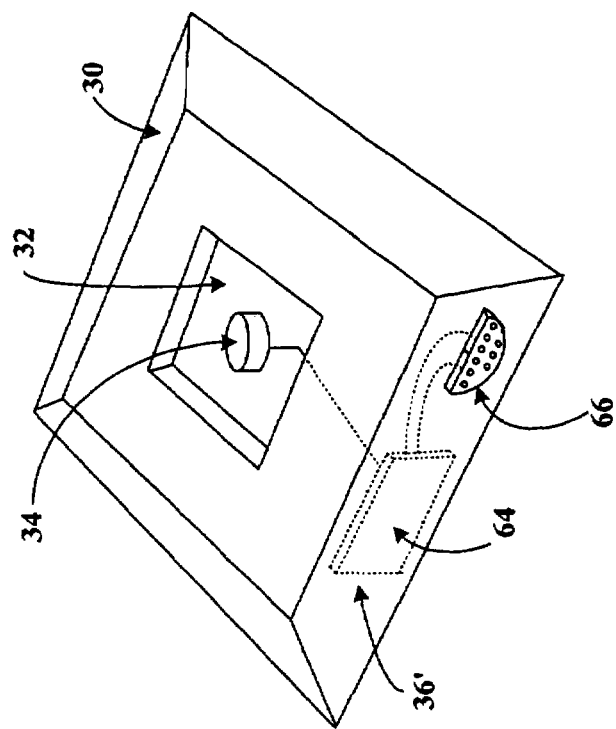
FIG. 5B is a another preferred embodiment of the home cradle for use with the portable terminal of FIG. 3A.
Figure 5A:
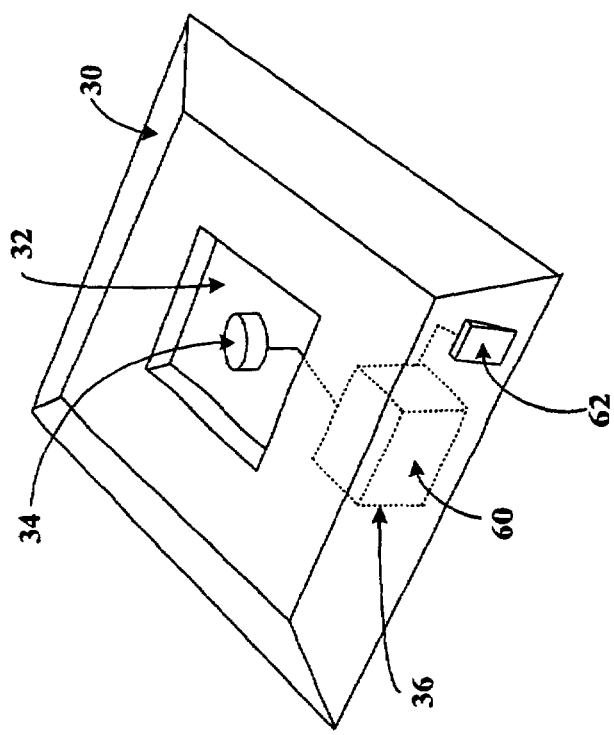
FIG. 5A is a preferred embodiment of the home cradle for use with the portable terminal of FIG. 3A.

With reference now to FIGS. 1 and 5A, home data transfer circuit 36 can simply be a home modem 60 or network adapter which communicates with host modem adapter 20. Alternatively, the data exchange can be performed over a telephone line using DTMF communication for accessing a voice response system that confirms the user's order over the telephone. A suitable telephone jack 62 can also be provided.

Figure 2:
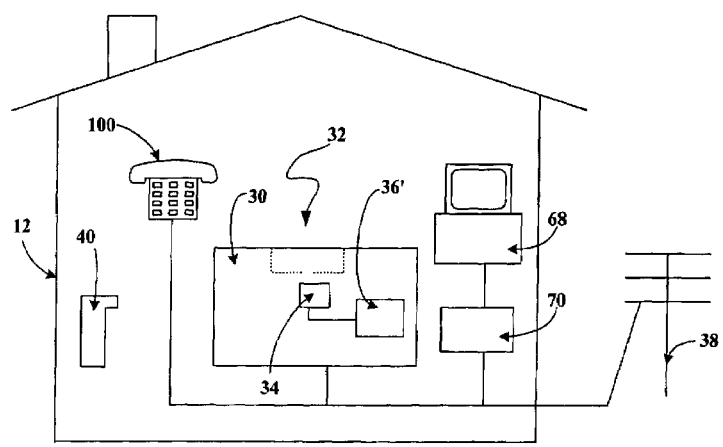
FIG. 2 is an alternative embodiment of a home portion of the system of FIG. 1.

Reference should now be had to FIGS. 2 and 5B which illustrate a system with an alternative data transfer circuit and wherein like parts have received the same number. Alternative data transfer circuit 36' includes an interface card 64 for coupling the home cradle 30 to a separate home personal computer 68 and home modem 70, which in turn communicate with host modem 20. Card 64 can be coupled to home computer 68 through a suitable computer cable connector 66, for example. It should be appreciated that kiosk data interface 28 and home data interface 34 can be any type of suitable interface, for example, optical, electrical plug, radiophone, inductive transfer (such as used in heart rate monitors), and the like, including combinations thereof. Optical interfaces are illustrated for convenience. Similarly, any type of suitable interface can be employed for two-way data interface 42 of terminal 40: optical, infrared, electrical plugs, radiophone, inductive transfer, and the like. A two-way optical interface is illustrated in FIGS. 3A and 3B for convenience. In such a system, a stationary laser is normally employed and item 44 must be passed ("swiped") through the field of view of the scanner.

Preferably, the personal computer 68 of FIG. 2 executes a ring suppression software routine for suppressing telephone rings when the host computer 16 attempts to access the portable terminal 40 in the home. This is especially advantageous during the middle of the night, when most shoppers are asleep and the host computer may be performing data base updates needed by the portable terminal 40 for the following day's transactions. In a preferred embodiment of the present invention, ring suppression is performed by checking the Caller Line ID (CLI) at the modem before the first ring. When a CLI is detected, the ring suppression routine compares the CLI to a database of "ring suppress" telephone numbers stored in the personal computer 68. If the CLI matches a "ring suppress" number, then the modem is operated to suppress the ring and answer the phone. Otherwise, the modem is operated to allow the telephone to ring in a normal manner.

Figure 9B:
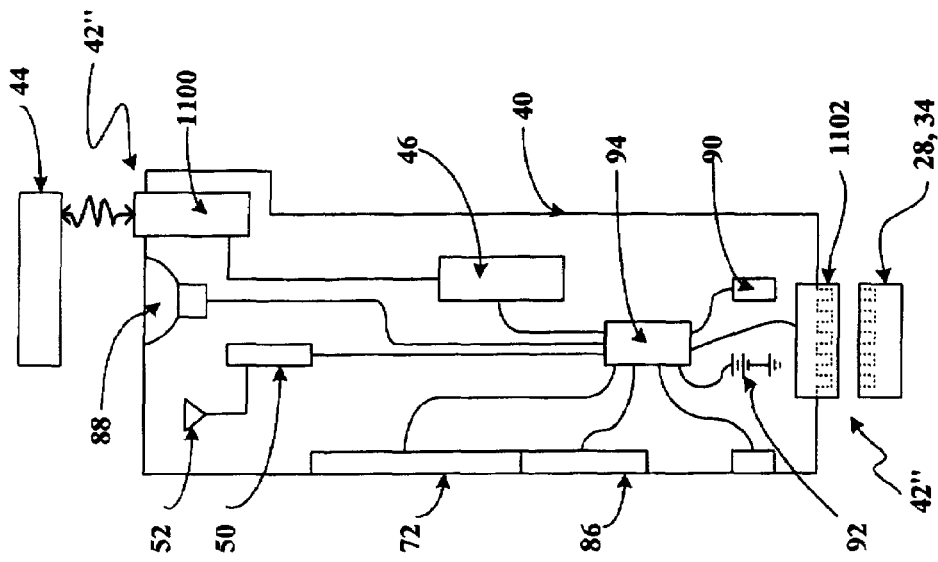
FIG. 9B is a side semi-schematic cross-sectional view depicting another preferred embodiment of the portable terminal of the present invention.
Figure 9A:
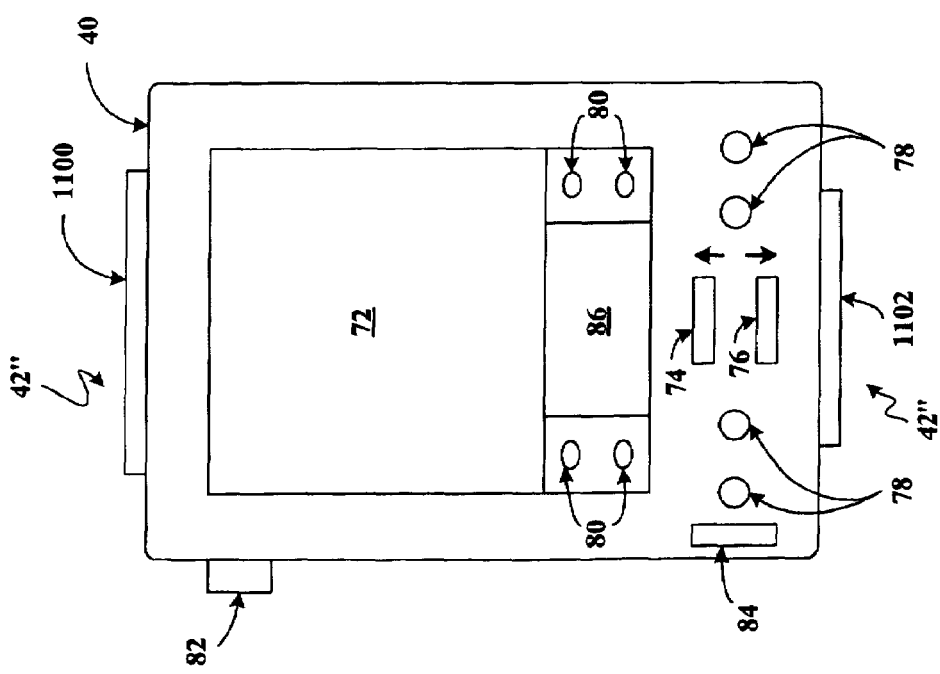
FIG. 9A is a front elevational view depicting another preferred embodiment of the portable terminal of the present invention.

Reference is now made to FIGS. 9A and 9B, which are similar to FIGS. 3A and 3B except for a different two-way data interface 42" which is formed by a bar code scanner such as conventional moving laser bar code scanner 1100, and a separate electrical plug-type connector 1102 (or other interface discussed above) for communication with the other data interfaces of the system, which in this case would also be electrical plug (or other corresponding) types. Thus, a nominally "one-way" bar code scanner, such as item 1100, and the plug-type connector 1102 (or other interface) together enable two-way communication and form two-way data interface 42".

With reference now again to FIGS. 3A and 3B, portable terminal 40 can optionally include a display 72 for displaying information to the user and a plurality of control keys for permitting the user to interact with the display 72. The control keys can include, for example, up and down scroll keys 74 and 76, respectively. "Hard" function keys 78 can be included, for example, to call up a calendar, telephone list, shopping list, and notes associated with the shopping list. "Hard" function keys are understood to be dedicated or "hardwired" function keys that are not programmable. "Soft" function keys are understood to be programmable function keys.

In addition, one or more touch keys can be provided for purposes of custom applications to allow a "soft" function approach to interactive program inputs. A separate bar code activation button 82 can be used to trigger bar code reading while an additional button 84 can be provided to initiate data transfer on docking in either of cradles 24,30. A region 86 can be provided for purposes of communication via optical character recognition, for example, using the so-called "Graffiti Alphabet" of the Palm Pilot™ computing device.

Portable terminal 40 can also include a speaker 88 for supplying audible messages to the user. Speaker 88 can also beep when a bar code has been successfully read, and can beep a different tone or pattern of tones when scanning has not been successful. Terminal 40 can further include a position-sensing module 90 for sensing the position of the user within the shopping establishment 14 and for communicating with the user via the display 72 (or otherwise) when the user has deviated from an optimal shopping path in the shopping establishment 14. Module 90 can also be used to alert the customer to specials in their area to alert customers to list items in their area. When speaker 88 is present, the communication with the user can be audibly through speaker 88. Module 90 can interface, for example, with a GPS or similar system. Alternatively, various receivers can be located throughout shopping establishment 14 to sense the presence of user carrying terminal 40, as is known in the art of patient monitoring for hospitals. Further details will be provided below regarding the user's path through the shopping establishment, in a discussion of the method of the present invention.

Terminal 40 can include a suitable power source 92, for example, suitable dry cell batteries. Further, a control module 94 can be provided to drive the display 72 and to control the operation of the various other components of terminal 40.

The above-described portable terminal 40 can be formed by adding a suitable two-way data interface 42 (and optional buttons 82, 84), as well as other herein-described components, to the well known Palm-Pilot device manufactured by Palm Computing.

Figure 6:
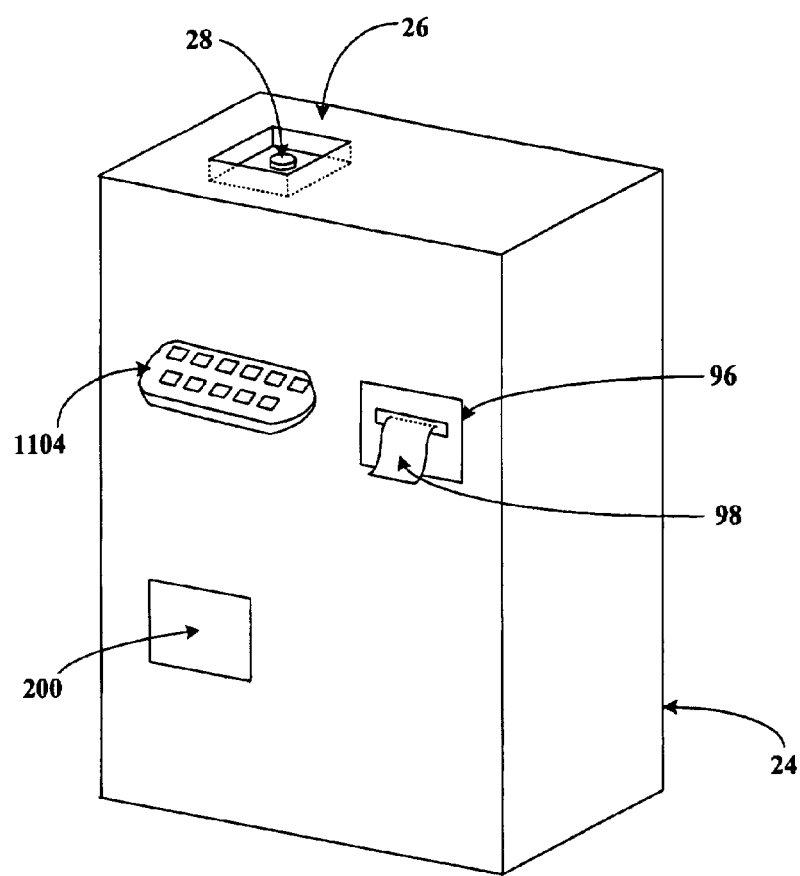
FIG. 6 is a perspective view of a shopping establishment kiosk cradle of the present invention.

Referring now to FIG. 6, kiosk cradle 24 includes kiosk portable terminal-receiving station 26 and kiosk optical interface 28. A printer 96 may be provided and can be used to print out a hard copy shopping list 98 in response to information in the shopping list database. Printer 96 can also provide recipes, nutritional information and/or coupons. A display 200 can also be provided. A keyboard 1104 can be provided for entering a PIN.

It will be appreciated that the present invention can comprise the assembly of all the aforementioned components. However, the invention also contemplates a home station comprising the above-mentioned home cradle 30 and portable terminal 40 only. Home cradle 30 would normally remain within the home of the user, while portable terminal 40 is portable between the home and shopping establishment 14. Yet further, the present invention also contemplates the personal shopping system portable terminal 40 by itself.

The present system can be employed with a telephone 100 of a user, having an ordinary touch-tone key pad, and associated with the user's home 12, for purposes which will be discussed fully below.

With reference to FIGS. 7A, 7B, 8A and 8C, an alternative embodiment of portable terminal 40' in accordance with the present invention will now be described. Items similar to those described above for the preferred embodiment 40 have received the same reference character but with a "prime" following it; item 36" corresponds to item 36 and item 36'" corresponds to item 36'. Alternative portable terminal 40' is generally pen-shaped, and has an elongate pen-shaped housing 201 having an end 203 with an optically transparent passage 205 therethrough. The memory 46' and the two-way terminal data interface 42' are arranged in the housing 201 with the two-way terminal data interface 42' positioned for communication (preferably optical) through the transparent passage 205. In any of the embodiments of the present invention, the two-way terminal data interface 42, 42' can include a light emitting diode 207 and a photodetector 209, employed in a manner well-known in other optical communication systems. Other types of data interfaces as discussed above can also be used in terminal 40'.

In a preferred alternative embodiment, the two-way terminal includes a laser bar code reader such as the SE-900 available from Symbol Technologies, Inc. The user scanner is less than 0.3 inches wide and includes a scanning laser and a photodetector. Alternatively, other "miniaturized" scanners can be employed depending on the preferred size and economic preferences.

Alternative embodiment 40' can also include a trigger 82' for triggering reading of bar codes located on shopping-related items 44'. The trigger can be an inductive switch, push button or pressure sensitive pad area. This function can also instead be automatic, e.g., upon "swiping" an item 44, wherein the swiping can be automatic or user performed. A speaker 211, or other "beeping" device, can also be provided as above. Note that the kiosk data interface 28', home data interface 34', and shopping-related items with bar codes 44' are all represented by the same rectangle in FIG. 7A, as shown above with respect to the embodiment of FIG. 3B. Alternative embodiment 40' of FIG. 7A can also include a power source 92' and control module 94' as described above. The alternative embodiment 40' can have diameter of about ⅜ inches and a length of about 5–6 inches to permit convenient carrying and storage by a user, for example, in a pocket or purse like an ordinary pen, and can thus be configured for easy gripping by a user of the system. An example of such a pen is the "CyberPen" available from Symbol Technologies, Inc.

Figure 7A:
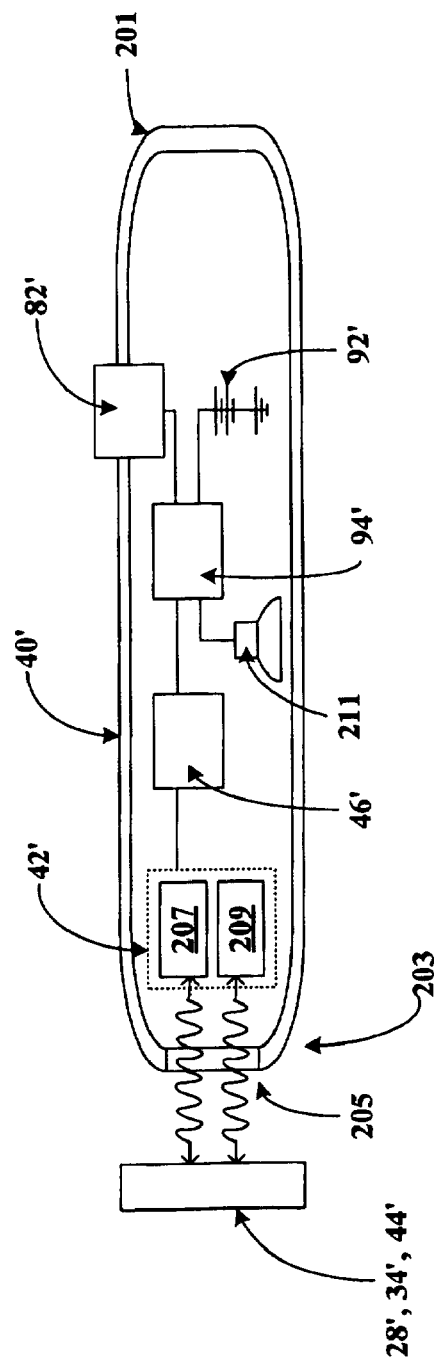
FIG. 7A is a side semi-schematic cross-sectional view of another preferred embodiment of the portable terminal of the present invention.
Figure 7B:
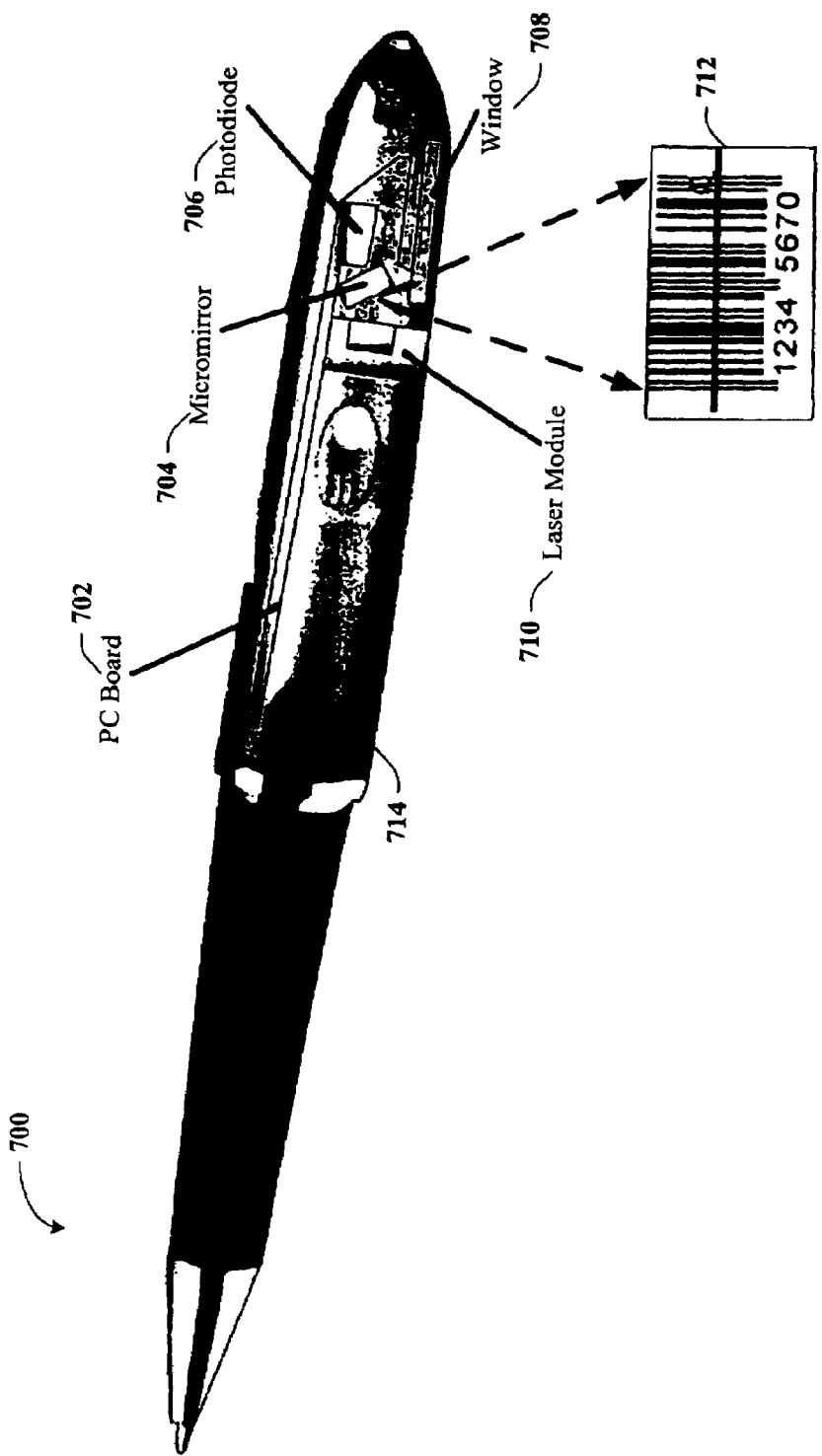
FIG. 7B is a side semi-schematic cross-sectional view of another preferred embodiment of the portable terminal of the present invention.

FIG. 7B shows still another alternative embodiment of a portable terminal in accordance with the present invention. The portable terminal 700, which is a miniaturized optical scanner, includes an elongated pen-shaped housing 714 containing a laser module 710, micro-mirror 704 and a photodiode 706 all mounted on a printed circuit (PC) board 702. Light emitted by the laser module 710 is directed onto the micro-mirror 704, which in turn reflects it through an optically transparent window 708 disposed on the pen-shaped housing 714. A reflected pattern representing the bar code 712 is then detected by the photodiode 706. An example of such a pen is the "AutoPen" available from Symbol Technologies, Inc.

Figure 8B:
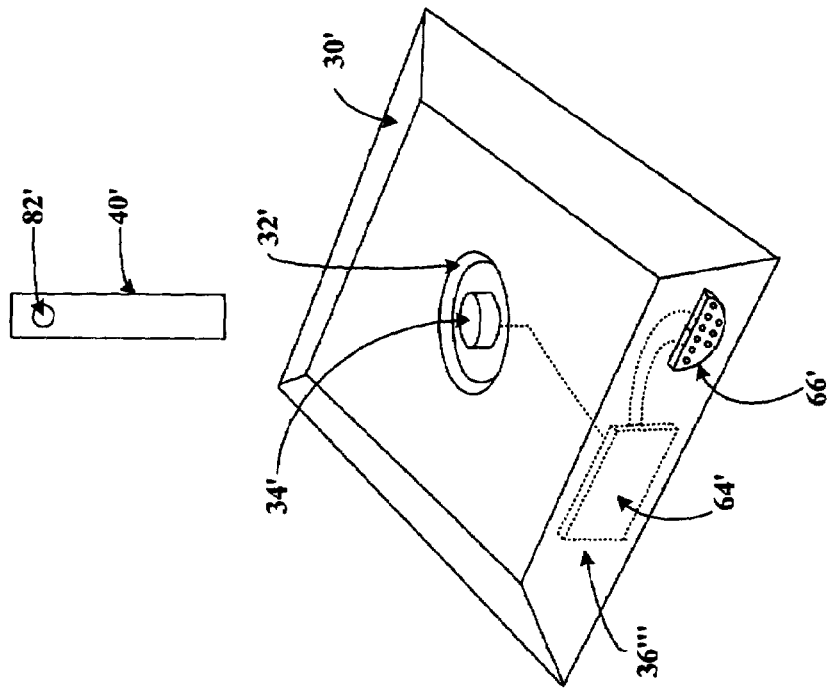
FIG. 8B is another preferred embodiment of a home cradle for use with the portable terminal of FIG. 7A.
Figure 8A:
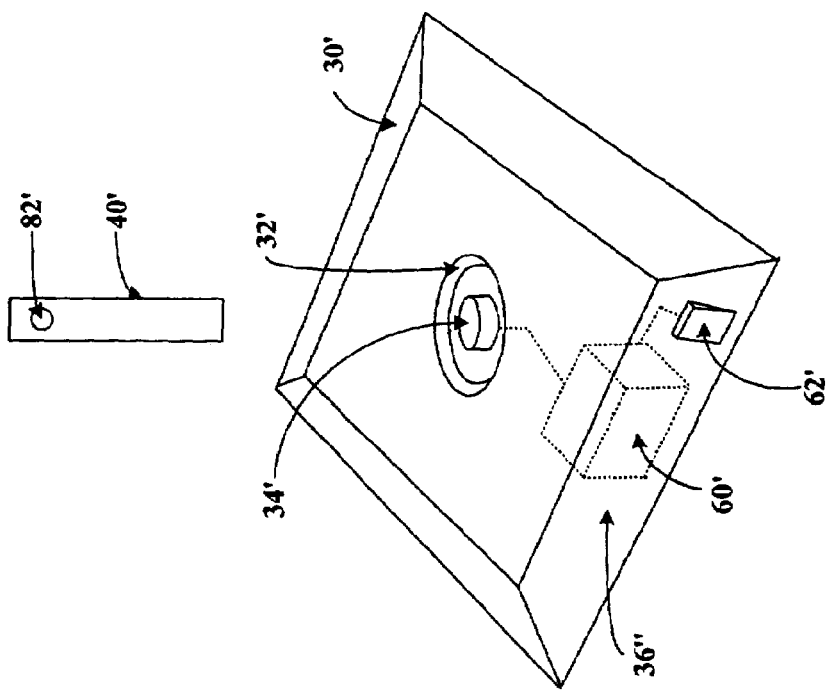
FIG. 8A is another preferred embodiment of a home cradle for use with the portable terminal of FIG. 7A.
Figure 8C:
FIG. 8C is another preferred embodiment of a home cradle for use with the portable terminal of FIG. 7B.

FIGS. 8A, 8B and 8C are entirely similar to 5A and 5B above, except that the portable terminal-receiving station is shaped to receive the alternative embodiments 40' and 700 of the portable terminal. It should be noted that wherever portable terminal 40 is discussed in this application, the discussion also includes the alternative embodiments 40' and 700. Certain features of portable terminal 40, such as the display, may not be most conveniently incorporated into the portable terminals 40' and 700 due to their more compact shape; this will be apparent when reading the appropriate passage in this application.

Either embodiments 40, 40' and 700 of the portable terminals of the present invention can be combined with a cordless telephone as a convenience and also to use the wireless communication circuitry of the cordless phone for data interface purposes.

A method, according to the present invention, of placing an order for items including at least one of goods and services will now be described. The method includes the step of reading bar codes associated with the shopping-related items (i.e., goods and/or services) with a two-way data interface 42 of a portable terminal 40. The method further includes the step of storing data associated with the bar codes in a memory 46 of the portable terminal 40. The method yet further includes the step of transferring the data associated with the bar codes to a host computer 16 for storage in a shopping list database. The transferring step includes the sub-steps of transferring the data associated with the bar codes from the memory 46 of the portable terminal 40 to the two-way terminal data interface 42 of the portable terminal 40; and then transferring the data associated with the bar codes from the two-way terminal data interface 42 to an data interface of either the kiosk portable terminal-receiving station 26 or the home portable terminal-receiving station 32; and then to the host computer. As described above with respect to the apparatus, the kiosk portable terminal-receiving station is part of the shopping establishment kiosk cradle 24 which is coupled to the host computer 16.

The home portable terminal-receiving station is part of the home cradle 30 which is associated with the home 12 of the user and is also coupled to the host computer 16. When the portable terminal 40 is used in the home, the data associated with the bar codes will be transferred to the data interface 34 of the home portable terminal-receiving station 32. In this case, the inventive method can include the additional steps of reading a bar code on a shopping-related item 44 which is a special bar code associated with a shopping establishment 14, using the two-way data interface 42 of the portable terminal 40. In response to the reading of the special bar code, home cradle 30 can automatically contact the shopping establishment 14 when the portable terminal 40 is placed in the home portable terminal-receiving station 32 of the home cradle 30. The contacting is done on the basis of information encoded in the bar code associated with the shopping establishment 14.

The method of the present invention can also include the step of transmitting identifying indicia, for example, intrinsic identifying indicia which may be contained in the terminal 40, from the portable terminal 40 to the host computer 16 to identify the user to the host computer, as discussed above with respect to the apparatus. The method can also include the additional step of displaying relevant portions of the shopping list database, discussed above, on the display 72 of the portable terminal 40.

When portable terminal 40 is used in the home 12, and the data associated with the bar codes is transferred to the data interface 34 of the home portable terminal-receiving station 32, host computer 16 can send at least one verification query to home cradle 30 in order to verify at least one of correctness and validity of an order which is based on the shopping list database. The step of sending the verification query can include sending the verification query as a human language audible query to the telephone 100 which is coupled to the home cradle 30. Additionally or alternatively, the step of sending the verification query can include sending the verification query as a signal which triggers visual display of the verification information on display 72 of portable terminal 40. The verification query process can also include caller identification to prevent theft of goods and/or services. If the "caller ID" does not match the telephone number associated with the authorized user's home phone, e.g., the transaction could be denied. The home phone would normally in turn be associated with the authorized user's home portable terminal-receiving station. Further, the user can be prompted to enter a personal identification number (PIN) to supplement, or in lieu of, identifying indicia in the terminal 40 itself. The PIN can be entered on the keypad of telephone 100, separate home PC 68, or a keypad (not shown) on home cradle 30. A display could also be provided on home cradle 30 for use with terminals 40', e.g., which might not have a display.

Still referring to use of terminal 40 in the home 12, when using the alternative embodiment of data transfer circuit 36' discussed above, the data associated with the bar codes is transferred from the home portable terminal-receiving station 32, through a suitable interface card 64, to a separate home personal computer 68 of the user, and then through a home modem 70 to the host computer. In this case, the method can include the additional steps of sending at least one verification query from the host computer 16 to the separate home personal computer 68, and then responding to the at least one verification query with at least one response emanating from the separate home computer 68.

In an alternative preferred embodiment, the home personal computer 68 includes a price lookup table, prior shopping lists, recipes including UPC or other scanning data for ordering, and other functionality. The home personal computer 68 is assumed to have greater memory and peripheral devices, such as a compact disk (CD) reader, that in turn enables a retailer to provide catalog information, image data and other related data in various formats that can be stored at home personal computer 68. This approach is advantageous in that it increases the number of applications available to the consumer while reducing the bandwidth and data manipulation requirements of the shopping system.

It will be appreciated that the audible and computer related approaches are preferred when using the portable terminal 40' which may be too small to have a display. Or in special uses, large screens with large fonts could be used to aid impaired consumers.

Method steps associated with use of portable terminal 40 in shopping establishment 14 will now be described. It is to be appreciated that when portable terminal 40 is used in shopping establishment 14, data associated with the bar codes scanned in the home 12 of the user is transferred to the data interface 28 of the kiosk portable terminal-receiving station 26. With reference to FIG. 6, the method can include the additional step of printing a hard copy shopping list 98 from the kiosk cradle 24, for example, with printer 96, in response to the data associated with the bar codes which were read in the home 12. It will be appreciated that a user of the system can simply check off data items listed on the hard copy shopping list 98 with a conventional ink pen as the items are picked up off the shelves 102 (see FIG. 4) of the shopping establishment 14 and scanned with the portable terminal 40. Thus, it will be appreciated that the method according to the present invention can include the method step of scanning new items required to be purchased, in the shopping establishment 14, with the portable terminal 40. The scanning can be in response to the hard copy list, or in response to one or more embodiments of electronic list. When an electronic list is employed, the method can include the additional step of updating the electronic list in the memory 46 of the portable terminal 40 to indicate that a given one of the required new items has been obtained. By "new items" is meant goods or services in the shopping establishment 14 which are desired by the user of the system. "New" is used to distinguish these items from the (presumably) old items which were scanned at home and which require renewal or replacement. A PIN can be entered on keyboard 1104 of kiosk cradle 24.

In a further method, a consumer generates a list of prepackaged items and downloads the information onto a kiosk. These goods are confirmed for purchase and subsequently collected either in the back room warehouse or by an attendant within the store for pick up by the consumer. The consumer may, in the meantime, collect perishable goods which might be subject to product variation, customer preference or simply selective customer shopping, i.e., meats, vegetables, fruits and candies. The customer would be provided a customer order of completion time and location by either a public address system, beeper, or if equipped with a wireless radio, through his or her terminal. The customer would then proceed to a payment register and pay for new items, which could be prescanned with the terminal and automatically downloaded to the register, and previously ordered items. Such an ordering process could also be implemented from home with the proviso that a customer would need to include pickup/drop-off requirements.

In yet another preferred method, a host or home computer generates a list of ingredients. i.e., shopping list, according to one or more recipes and downloads the list onto a kiosk and/or a portable terminal. Goods corresponding to the ingredients are confirmed via a portable terminal for purchase and subsequently collected either in the back room warehouse or by an attendant within the store for pick up by the consumer. The consumer may also modify the list of ingredients at the portable terminal, for example, to add perishable or seasonable goods which might be subject to price variation, customer preference or simply selective customer shopping, i.e., meats, vegetables, fruits and candies. In addition, the list can be further modified by a servings multiplier, which would modify the quantity of certain or all of the ingredients according to anticipated quantities to be served. Again, such an ordering process can also be implemented from a home personal computer.

When using a portable terminal such as pen-type terminal 40', which may not have a display, a user can simply periodically re-dock terminal 40' in kiosk 24 to check the updated electronic list, for example, to print a revised list with scanned items "crossed off," or to view a revised list on optional display 200 of kiosk 24. Alternatively, the user inserts the portable terminal into a "viewer" device for displaying the shopping data on a screen. If the list is presented it could also include bar codes (or a single high density code) for automatic reprocessing into another kiosk or register.

Either the hard copy or electronic shopping list can be produced as an optimized shopping list in response to the shopping list database and information contained in the host computer 16 about location of the items within the shopping establishment 14. The optimized shopping list can be ordered to direct the user through the shopping establishment 14 in an efficient path. For example, with reference to FIG. 4, user 58 can be directed along the path 104 symbolized by dashed lines so as to move sequentially through shelves 102 of establishment 14. Items on the shopping list can be printed out in an order in which they will be encountered when user 58 travels efficient path 104. The optimized shopping list can also offer specials pertaining to items on the list.

To further enhance the efficiency of the user's shopping experience, the method can include the additional steps of sensing the location of the portable terminal 40 with the position-sensing module 90. This position presumably corresponds to the position of user 58 within the shopping establishment 14. In this case, the method can include the additional step of communicating a message advising the user 58 when the user 58 has deviated from the efficient path 104. This message could be generated by wireless communication from host computer 16 to portable terminal 40, or could be generated otherwise; for example, within terminal 40 in response to downloaded information regarding location of goods. Still referring to FIG. 4, when user 58 embarks upon an inefficient path 106, symbolized by dash-dotted lines, a message can be sent to the user 58 to indicate that he or she should traverse to one of the shelves 102 which would have been missed in taking inefficient path 106. More preferably, the list can be re-optimized with new directions based on the user's new location. The communicating step can optionally include an audible communication using speaker 88 of portable terminal 40. One of the previously-discussed keys on portable terminal 40 can be programmed as an interactive marketing help key to alert shopping establishment personnel to the customer's location.

Memory 46 and control module 94 of portable terminal 40 can be suitably programmed such that memory 46 remembers the one hundred (for example) most frequently purchased products of the user. These one hundred most frequently purchased goods or services (or any other desired number) can be stored in the memory 46 as, for example, a "customer preference file" and can be updated on a continuous basis as the user's preferences change. Further, the user can also have the capability of generating a custom list of frequently-ordered or other desired items. Price and other information associated with the frequent items can be updated, for example, whenever portable terminal 40 is in communication with host computer 16. Different lists can be maintained for each of a variety of shopping establishments. Further, customer preference files can be uploaded to host 16 at any convenient time, e.g., automatically whenever terminal 40 and host 16 communicate (downloads, to update price (for example) could also be performed at this time). Many of a wide variety of customer preferences could be stored (e.g., vegetarian, health food). Additional details on database management are provided in the aforementioned U.S. patent application Ser. No. 08/866,690 the disclosure of which has been previously incorporated herein by reference.

The aforementioned verification queries can include, for example, final price and confirmation of the user's order including price, delivery or pick-up, and desired time. While this information can be sent by voice to telephone 100, it can instead be sent in written form to display 72 of portable terminal 40, or to separate home computer 68, in order to save time for the user.

The storing step of the method can include storing data pertaining to a given shopping establishment, and can include the additional steps of repeating the reading step for items associated with another given shopping establishment, and repeating the storing step for the items associated with the other given shopping establishment, such that multiple lists of items for at least two different shopping establishments are stored in the personal/portable terminal. The shopping establishment can be further equipped with an encryption system so that only retailers with the correct encryption/decryption key can read customer lists or other data associated with their shopping establishments or group of shopping establishments. As such, an alternative method of the present invention includes the additional step of encrypting the data to be transferred from the personal/portable terminal, wherein the data storing step further includes the steps of decrypting the data received from the personal/portable terminal and storing the decrypted data associated with a single or group of shopping establishments.

It will be appreciated that shopping establishment 14 could be, for example, a retail store or a warehouse. Telephone lines 22, 38 can be employed for DTMF communication among any of the components of the system. As noted, the phone lines 22, 38 can be public or private or a satellite system.

The user can scan the bar codes of shopping-related items 44 in home 12 all at one time, or as items are used up and thrown away. When ordering from home, the consumer can order just the goods scanned, or can edit information in memory 46 of terminal 40 to customize the order. Portable terminal 40 can then be placed in the portable terminal-receiving station 32 of home cradle 30. Before this placement, as noted above, a shopping-related item 44 containing a special bar code with information about an establishment from which the order is to be placed can be scanned. This could be a card with a bar code and there could be separate cards for each given shopping establishment, such as the drug store, flower shop, grocery store, auto parts store, etc. The card for each of these locations could also include an identification and/or password. As noted, the identification could also be permanently stored in portable terminal 40. For a portable terminal 40 with no display, such as, e.g., 40', editing can be carried out with terminal 40' docked in home cradle 30 via interaction with home computer 68. Separate files for each of a number of shopping establishments can be created in the memory 46 of portable terminal 40. Memory 46 can thus be configured to store multiple lists of data associated with the bar codes, as multiple shopping lists corresponding to multiple shopping establishments. Communication with the appropriate shopping establishment can be indicated by first "swiping" the id card for that shopping establishment. Other files in the memory would not be affected (e.g. florist file not affected by auto parts order). Alternatively, the customer card could be a credit card which the customer may associate with a single or multiple retailers.

Once the user has scanned the appropriate card for the given location where the order is to be placed, portable terminal 40 is placed in home cradle 30 and cradle 30 then "dials up" the appropriate shopping establishment 14. At this time, if desired, the user can also pick up the handset of telephone 100. Portable terminal 40 can download the entire shopping list to the host computer 16 at once, or can send one item at a time. In the item-by-item mode, the host computer 16 can respond to each item with a digitized voice setting forth the quantity of the item to be ordered and its description and size, and can then prompt the user to, for example, push the pound sign (on the telephone keypad) to confirm or the star sign to enter another number. This can be repeated until the entire shopping list is downloaded to host computer 16. Further, host computer 16 can also prompt the user to enter the desired delivery time, complete a survey, and the like via the key pad of telephone 100. This interaction could also instead be carried out using the display 72 of portable terminal 40 or using the home computer 68.

When the user instead wishes to travel to shopping establishment 14 to shop, they can dock the portable terminal 40 in the kiosk cradle 24 or "free associate" with the in-store communications network. The appropriate shopping list in memory 46 is then downloaded and stored in the database in host computer 16. As noted in the discussion of the method, the user can print the hard copy of the order and check items off with an ink pen as they are scanned with portable terminal 40 and deposited in, for example, a shopping cart of the user. Again as noted, the list can be imported as an electronic list with items automatically checked off as they are scanned, as discussed above. Further, the aforementioned optimized shopping list, either in electronic or hard copy form, can be generated. It should be noted that the user can be provided with the option to scan additional items not on the list, for example, in response to impulse purchases and the like.

When the position-sensing module is employed, the message sent to the user could be as specific as prompting the user to go back to a given shelf and to remind them which product on that shelf they forgot to purchase or to otherwise delete the item from the list.

Once the user has finished picking up the items they wished in shopping establishment 14, they can be "checked out" at one of the point-of-sale (POS) check out terminals 56 in a manner similar to current computer-aided shopping systems. That is, they can present the computerized list and simply tender payment, with occasional auditing to ensure integrity of the system. The shopping list can be up-loaded to terminal 56 and printed.

The present invention can also be employed by store personnel who are "picking up" a home-placed or kiosk-based order which is already in the database of the host computer 16. An appropriate billing transaction can then be completed at any point in time by any associate in the shopping establishment 14, whether it be when the user/customer comes to pick up the order, or before or after the order is shipped to the user. Further, a full or partial audit of the transaction can be performed when the user/customer picks up the order.

Figure 10A:
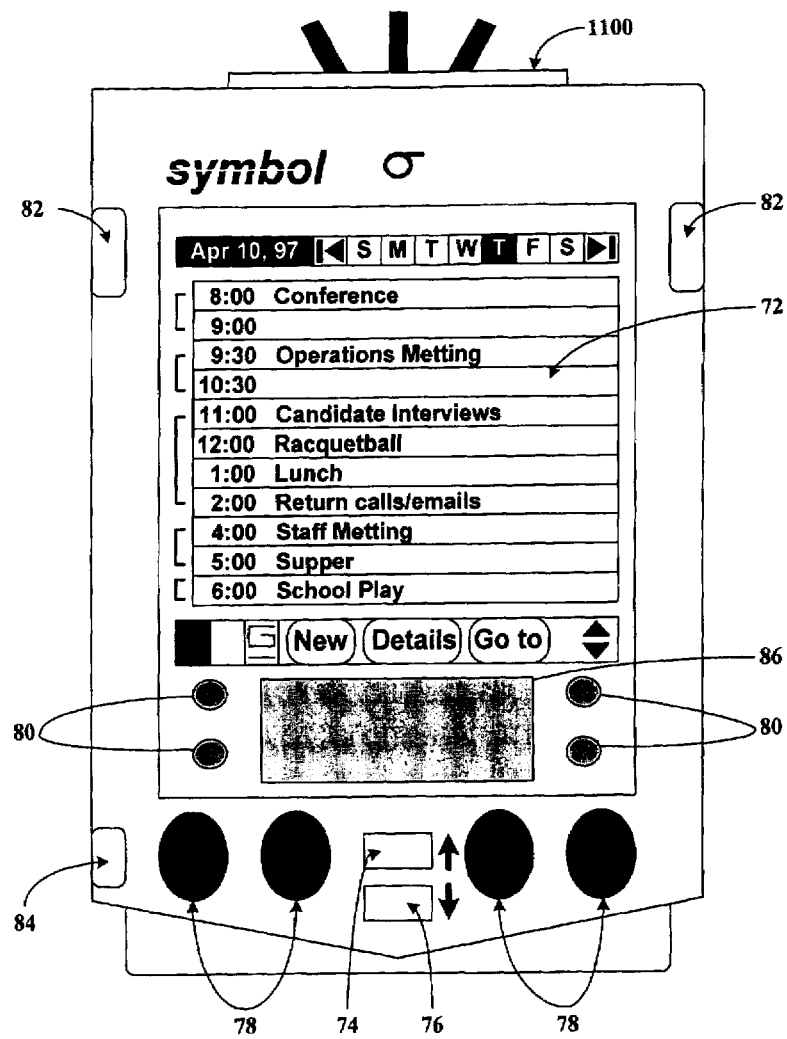
FIG. 10A is another preferred embodiment of the portable terminal of the present invention.

FIG. 10A shows another embodiment of the portable terminal of the present invention. This embodiment is similar to the embodiment of FIG. 9A, but in addition includes two bar code activation buttons 82 disposed on the left and right of the terminal each for triggering bar code reading by the user. As shown, two bar code activation buttons 82 disposed on the two sides of the terminal housing allow the user to simultaneously view the terminal display while viewing the visible light source upon activation of the bar code scanner.

Figure 10B:
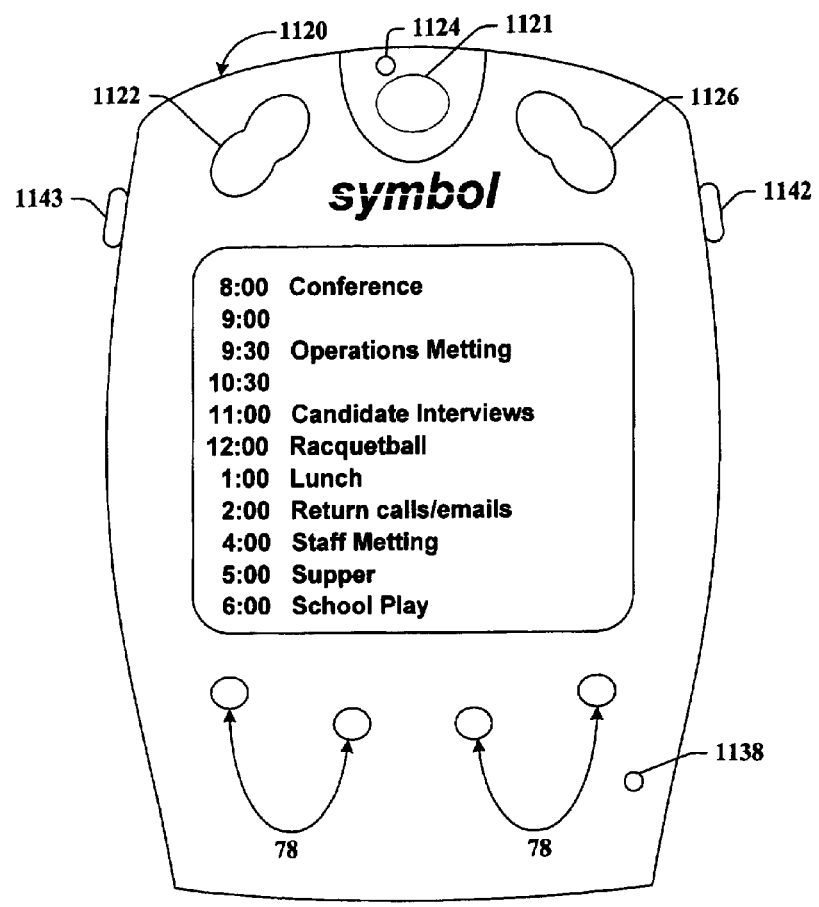
FIG. 10B is yet another preferred embodiment of the portable terminal of the present invention.

FIG. 10B shows an alternative embodiment 1120 of the portable terminal of FIG. 10A. This alternative embodiment 1120 features a rugged, ergonometric design having right and left scrolling buttons, 1122 and 1126 respectively, for scrolling up and down on the terminal display. As with the embodiment of FIG. 10A, a bar code activation button 1121 is disposed on the top side of the portable terminal for scanning bar codes. A bar code activation indicator light 1124 is further provided for indicating the status of the bar code reader. The location of the bar code activation indicator light 1124 allows the user to simultaneously view the terminal display while viewing the indicator light 1124. The alternative embodiment of FIG. 10B also includes bar scanner activation buttons 1142 and 1143 located on the left and right sides of the terminal, and hard or soft function keys 78 that can be used, for example, to call up a calendar, telephone list, shopping list, and notes associated with the shopping list.

The alternative embodiment of FIG. 10B further includes an "info key" 1138 for allowing a shopper to display information about the product being scanned or the last item scanned. The product information can include, for example, nutritional data, dietary information, pricing and information regarding special offers and alternative products. The "info key" can be used simply for displaying information about a product (without selecting it for purchase), and also can be used to develop a shopper profile by tracking the use of the "info key" and other keys, such as the "+" and "−" keys, and subsequent actions by the shopper. The shopping profile in turn can be utilized by the a retailer or manufacturer for providing products and product services specifically tailored to one or a group of consumers.

Preferably, the above-mentioned shopper profile is compiled over a predetermined period of time based on a transaction history and subsequent actions associated with the "info key." The transaction history and subsequent actions are used to construct a customer "inference engine," which in turn is used to predict and/or monitor customer preferences as to product placement, content, display location, etc. For example, consider a customer pressing the "info key" to display the fat contents of A-brand and B-brand potato chips. The customer then selects or scans the B-brand potato chip, i.e., the brand with the lower fat content. Thus, it can be inferred from the use of the info key and subsequent actions that the customer is concerned about fat content.

Figure 10C:
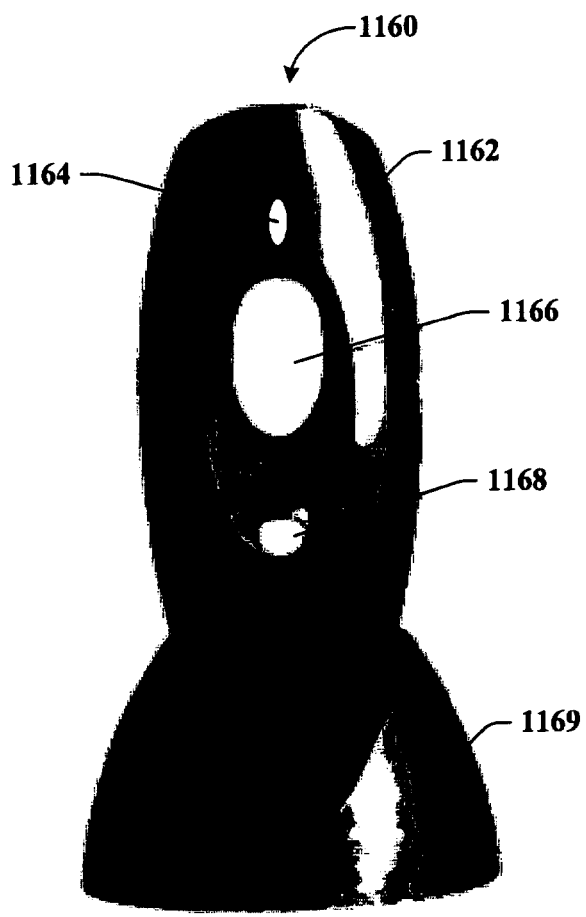
FIGS. 10C and 10D are front and perspective views, respectively, of a preferred embodiment of a portable terminal for use with the Internet.
Figure 10D:
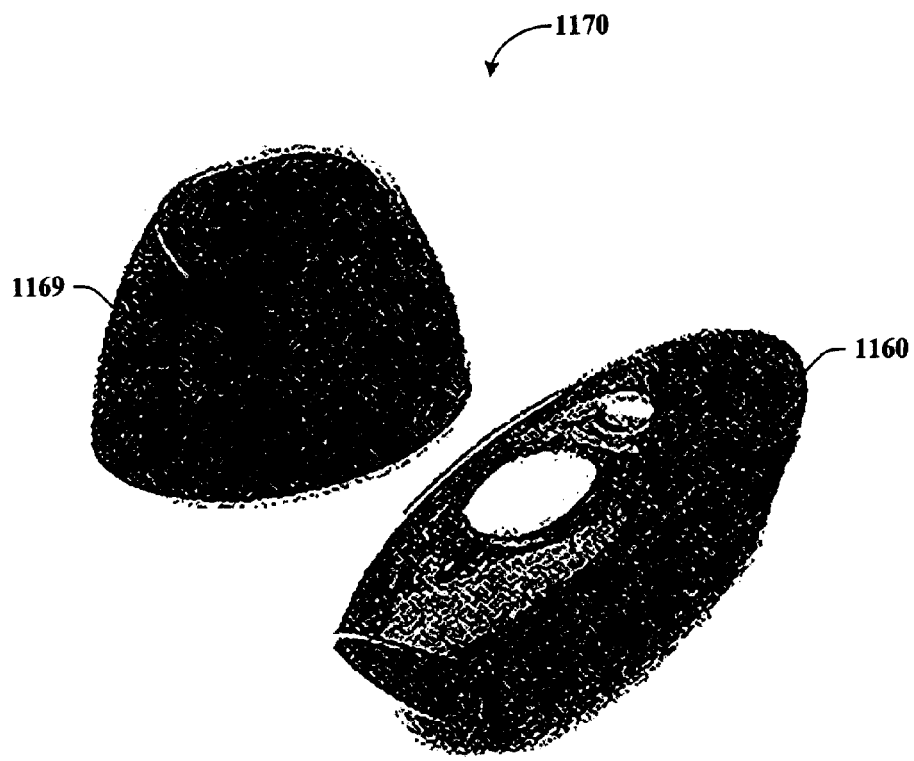

FIGS. 10C and 10D show front and perspective views, respectively, of another preferred embodiment of a portable terminal 1170 according to the present invention. The portable terminal is designed for use over an on-line ordering or consumer electronic retailing system. The portable terminal 1170 is a lightweight, laser-based memory scanner having a rugged, ergonometric housing, a bar code activation pushbutton 1166, a bar code withdrawal pushbutton 1168 for "unscanning" already scanned in items, a bar code activation indicator light 1164, and a non-volatile memory (not shown) for storing a plurality of scanned bar codes. The portable terminal 1170 further includes a receptacle 1169 and an RS-232 interface (not shown) for connecting to a host computer. In a preferred embodiment, the portable terminal 1170 stores up to 200 bar codes and is used to establish an on-line ordering system that offers products directly to consumers via the Internet. The portable terminal 1170 is battery powered and capable of decoding a variety of bar codes, including Code 128, Code 39, and UPC/EAN/JAN.

The portable terminal 1170 can be used for example for scanning bar codes directly from printed catalogues, advertisements, or other documentation that the consumer browses at home or at work. Using any suitable web browser, the consumer then logs onto the Internet and the bar code information stored in the portable terminal 1170 is downloaded and used to link the consumer to the relevant information on the Internet. Instead of searching through web pages, or incorrectly keying in the URL, the consumer is quickly brought exactly to the webpage for the corresponding product or products thus eliminating frustration and the possibility of the retailer losing the sale. An example of such a device is the CS 2000 Consumer Memory Scanner available from Symbol Technologies, Inc.

Figure 10E:
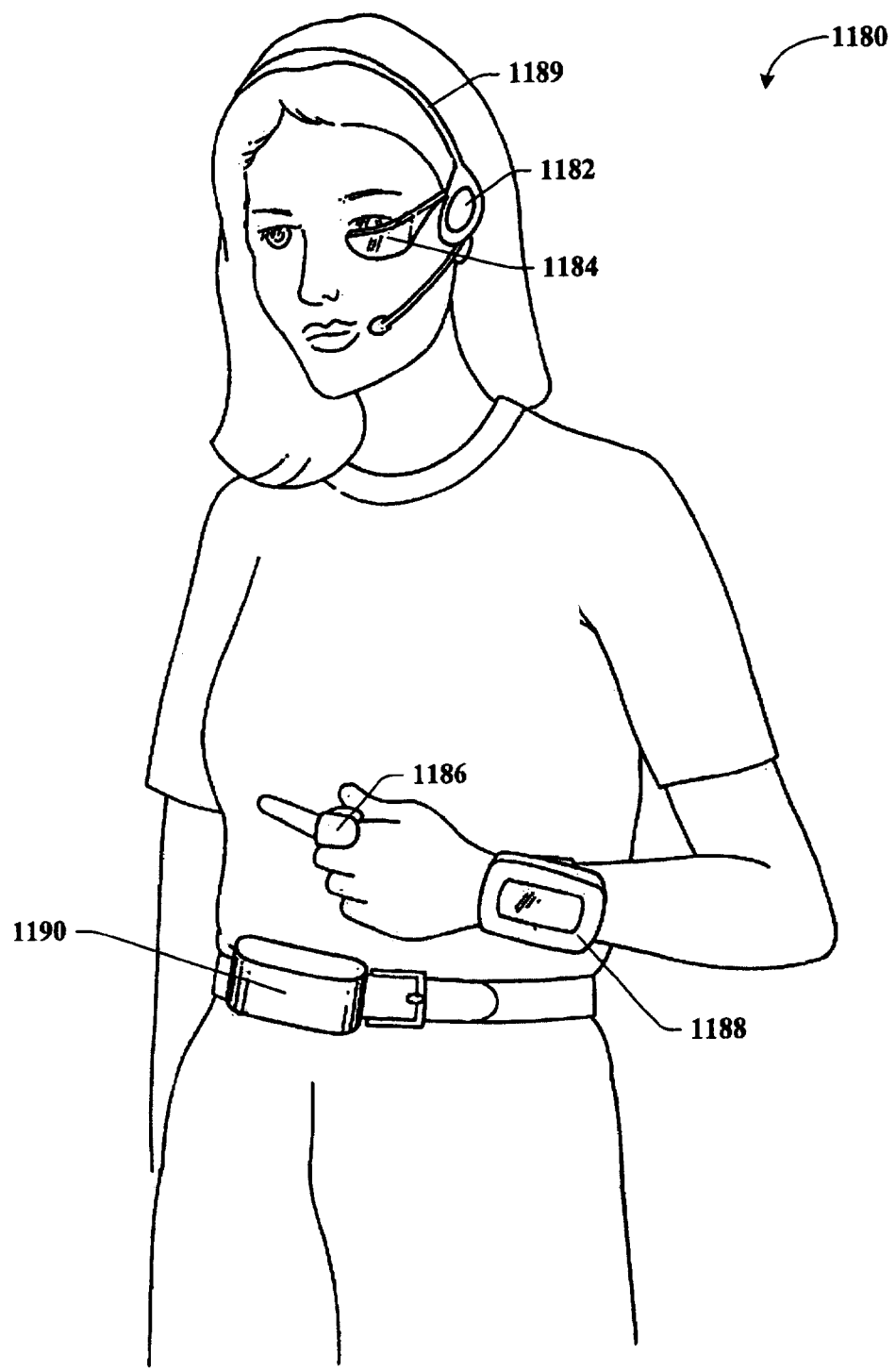
FIG. 10E is preferred embodiment of a "wearable" portable terminal of the present invention.

FIG. 10E is a "wearable" portable shopping terminal. The system 1180 includes a lightweight "wrist" computer 1188 connected to a miniaturized ring scanner 1186. An example of such a system is the WSS 1000 available from Symbol Technologies, Inc. Preferably, the wrist computer 1188 includes an alphanumeric programmable keyboard, a display, and a RF link for wireless communications. The wrist computer 1188 is connected to the ring scanner 1186 via an unobtrusive, lightweight cable so as to allow for fast "aim-and-shoot" bar code scanning. The combination of the miniaturized ring scanner 1186 and the wrist-mounted computer 1188 thus allows a user to keep his or her hands free for moving, picking, packing or receiving packages, products or materials. Optionally, the wearable portable shopping terminal includes a wearable headset 1189, the headset 1189 in turn having a speaker 1182 and a miniature display 1184 for providing a audio, graphical and video information about a product.

Figure 11:
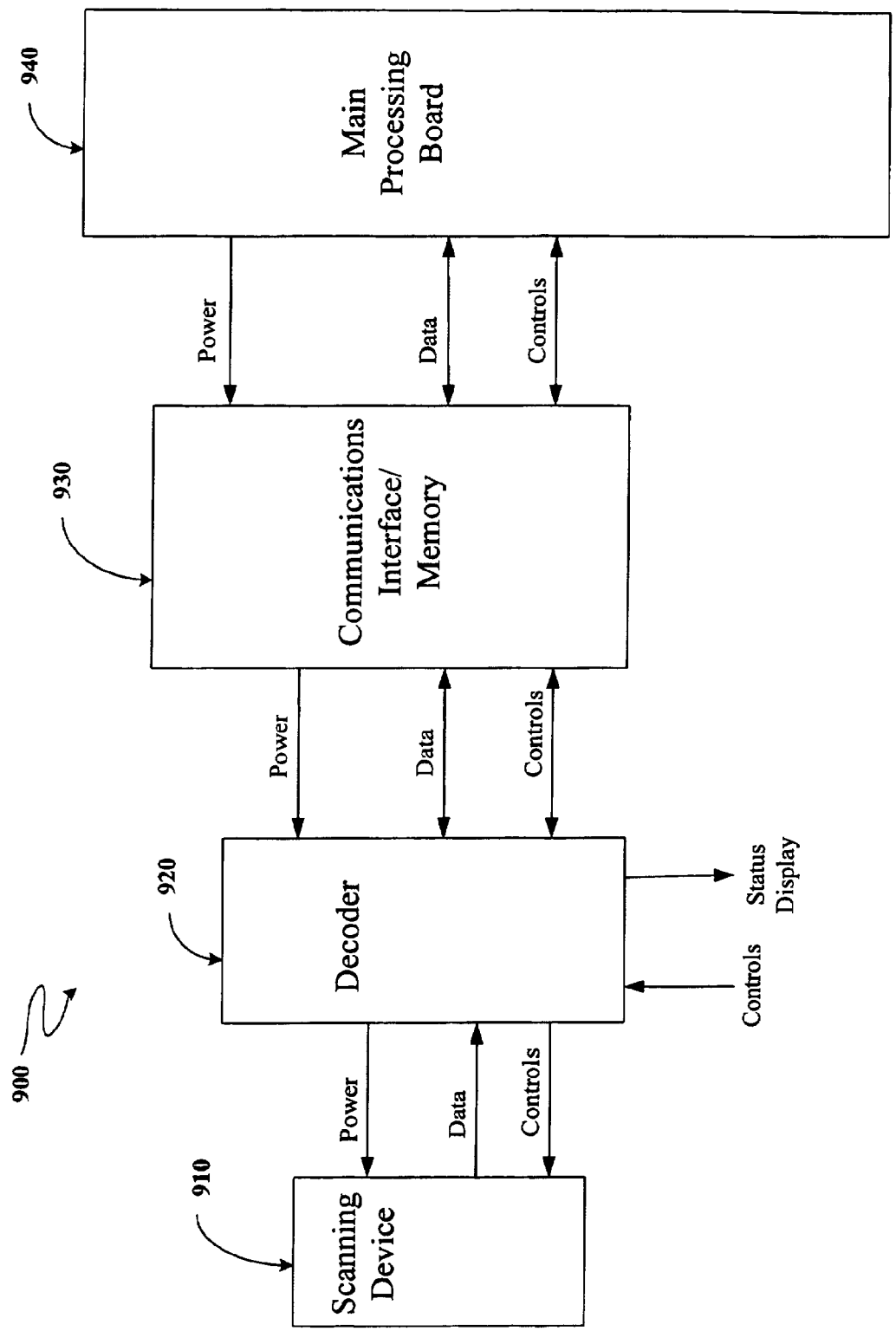
FIG. 11 is a block diagram showing a preferred embodiment of a portable terminal hardware architecture in accordance with the present invention.

FIG. 11 shows a high-level block diagram of the hardware architecture for the portable terminal of the present invention. The portable terminal includes a scanning device 910 for reading bar code, a scanner decoder 920 coupled to the scanning device 910, a communications interface/memory board 930 coupled to the scanner decoder 920, and a main processing board 940 coupled to the board 930. Further details of the hardware architecture are described with reference to the detailed architecture 901 shown in FIG. 12.

The scanning device 910 is used for reading bar code data from any coded product or item, and for generating a corresponding digital bar code pattern. According to the present embodiment, the scanning device can be any suitable laser or CCD scanner, for example, and is preferably the SE-900 laser scanner available from Symbol Technologies, Inc. The scanning device outputs Digital Bar Code Pattern (DBP) and a Start of Scan (SOS) signals to the scanner decoder 920. Further, the scanning device is activated and configured into various modes of operation in accordance with control data provided by the decoder 920. Typical control data may include the Laser Enable, Scan Enable and Configuration commands shown in FIG. 12.

Figure 12:
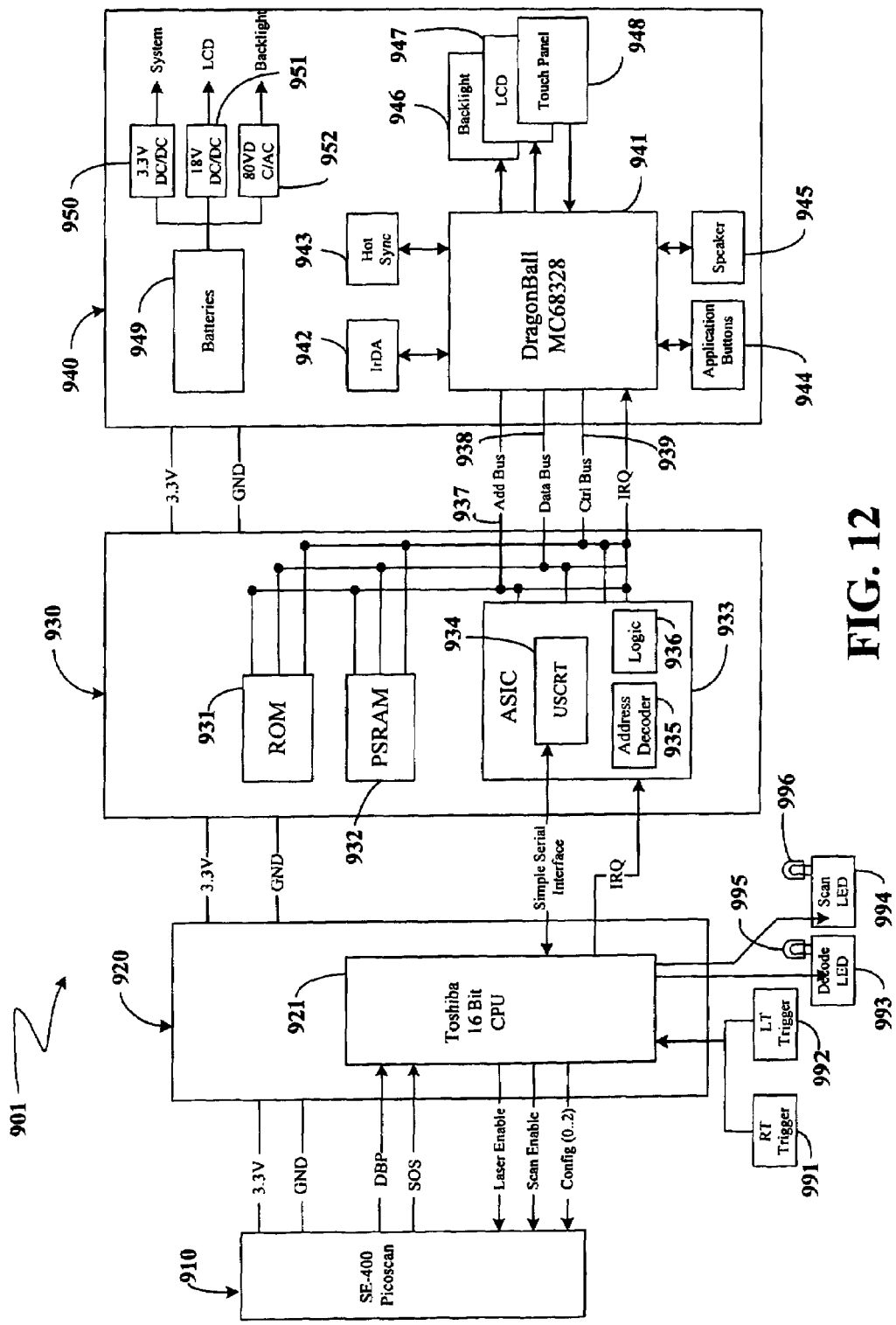
FIG. 12 is a block diagram showing in detail the hardware architecture of FIG. 11.

The scanner decoder 920, which interprets the DBP and the SOS data and generates corresponding serial decoded data, is capable of interpreting any number of bar code types, and may be any suitable processor such as the Toshiba 16-bit processor shown in FIG. 12. Right and left trigger buttons, such as the bar code activation buttons 82 of FIG. 10A, or proximity scanners (for "hands-free" operation) are used to generate the necessary control signals to initiate scan by the scanning device 910. Signals indicating the "decode" and "scan" status are in turn provided so as to illuminate indicator devices such as LED's 993 and 994. Interrupt signal IRQ is also provided by the decoder 920 to the communications interface 930.

Communications interface 930 is used to convert the decoded bar code data for further processing by a microprocessor included in the main processing board 940. Preferably, as shown in FIG. 12, the communications interface 930 includes an Application Specific Integrated Circuit (ASIC) or gate array 933 that includes a serial-to-parallel converter for converting the serial data stream provided by decoder 920 to parallel data for processing by the microprocessor 941 of the main processing board 940. The ASIC includes a Universal Synchronous Asynchronous Receiver-Transmitter (USART) 934, an address decoder 935 and a logic device for selecting the interrupt for the USART. In accordance with the preferred embodiment of FIG. 12, the communications interface 930 further provides an interrupt signal IRQ to the microprocessor 941 and includes ROM, PSRAM or equivalent memory devices for storing a terminal operating system, terminal application programs and related data.

Microprocessor 941, preferably a DragonBall MC68328 microprocessor, is provided for processing the converted decoded bar code data, executing the terminal operating system and terminal applications, e.g., personal organizer/calendar, Internet browser, etc., and generally for controlling the overall operation of the terminal device. The microprocessor 941 further includes in turn an interface for coupling to a touch sensitive display, which itself includes a backlight 946, LCD 947 and touch panel 948. One or more interfaces 944 are further provided for receiving user-activated function commands, along with a synchronization port 943 for automatically synchronizing the terminal to a host computing device. The microprocessor 941 also includes an infrared link 942 and interface to a speaker device 945.

Figure 13:
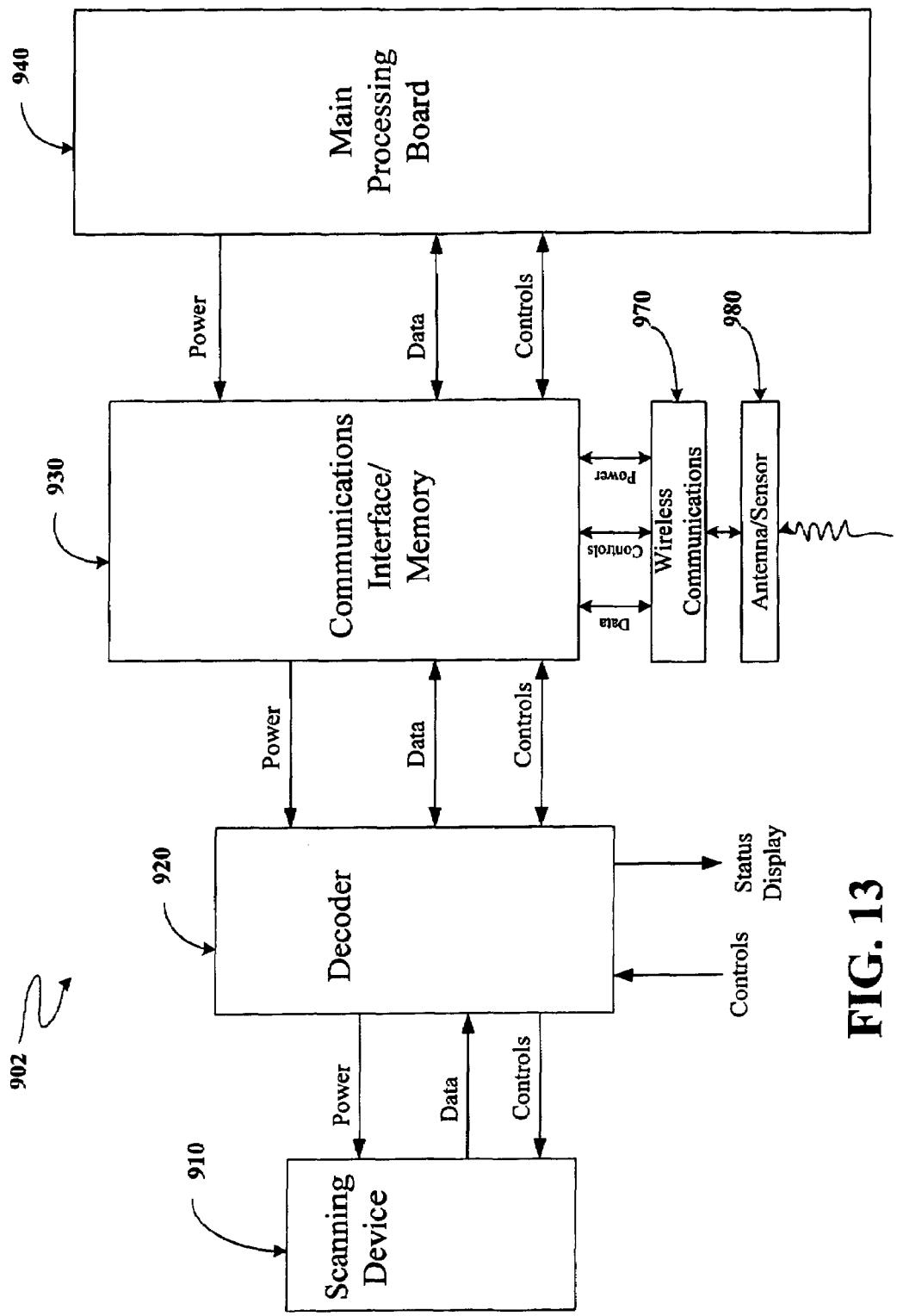
FIG. 13 is a block diagram showing another preferred embodiment of a portable terminal hardware architecture in accordance with the present invention.
Figure 14:
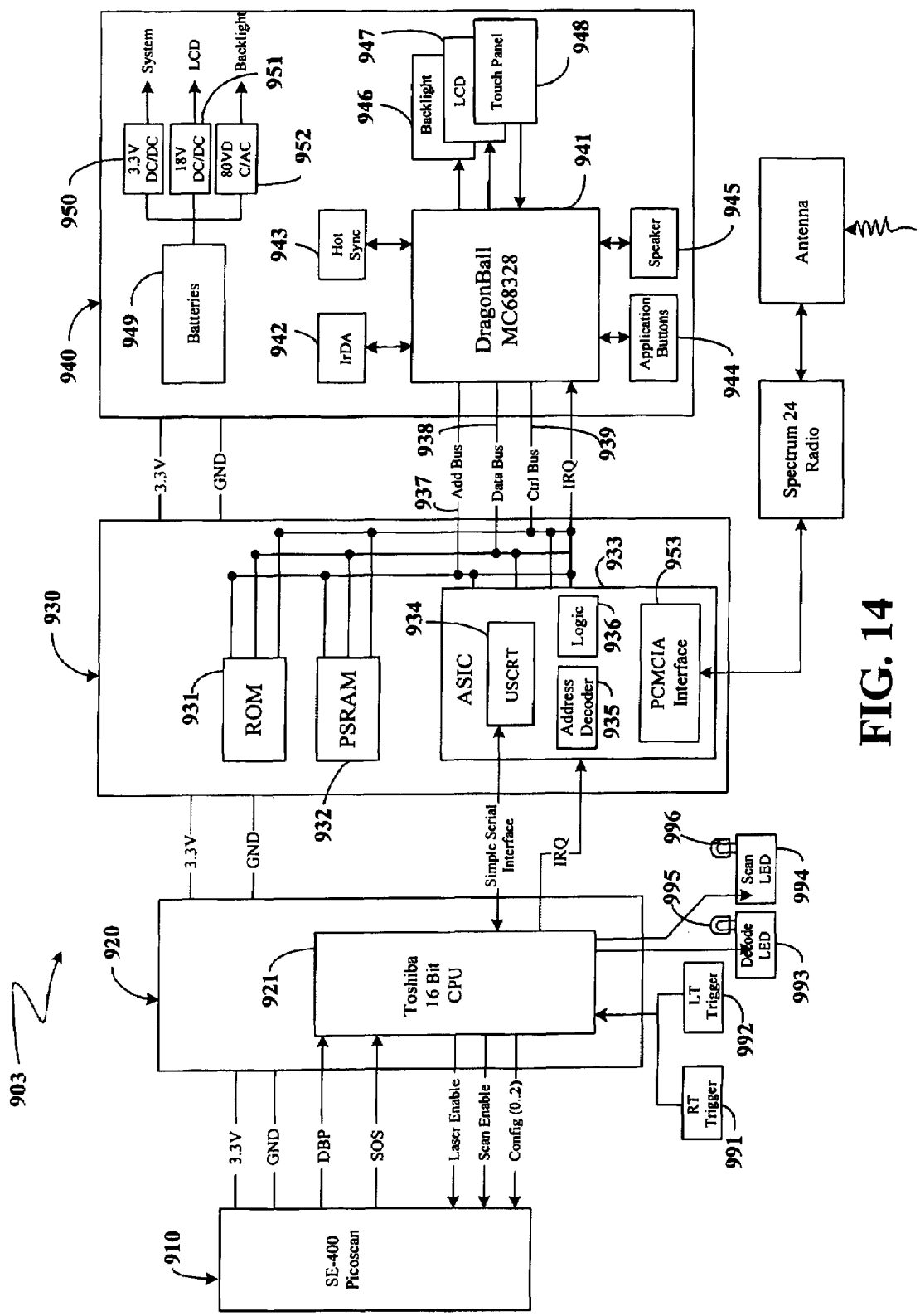
FIG. 14 is a block diagram showing in detail the hardware architecture of FIG. 13.

FIG. 13 is a block diagram showing another embodiment of a portable terminal hardware architecture in accordance with the present invention. The embodiment of FIG. 13 is a modified version of the embodiment of FIG. 12 wherein a wireless communications device 970 is coupled to the communications interface 930 and a corresponding antenna. As further shown in FIG. 14, the communications device 970 is the Spectrum 24™ radio, available from Symbol Technologies, Inc., which is coupled via a PCMCIA or equivalent interface 953 included in the ASIC 933. In an alternative embodiment, the portable device is inserted into a sled (not shown) that mates to the synchronization port 943.

In the event multiple users of terminals exist, it may be preferable to provide multiple cradles which are networked together or otherwise connected to a destination host.

Figure 15:
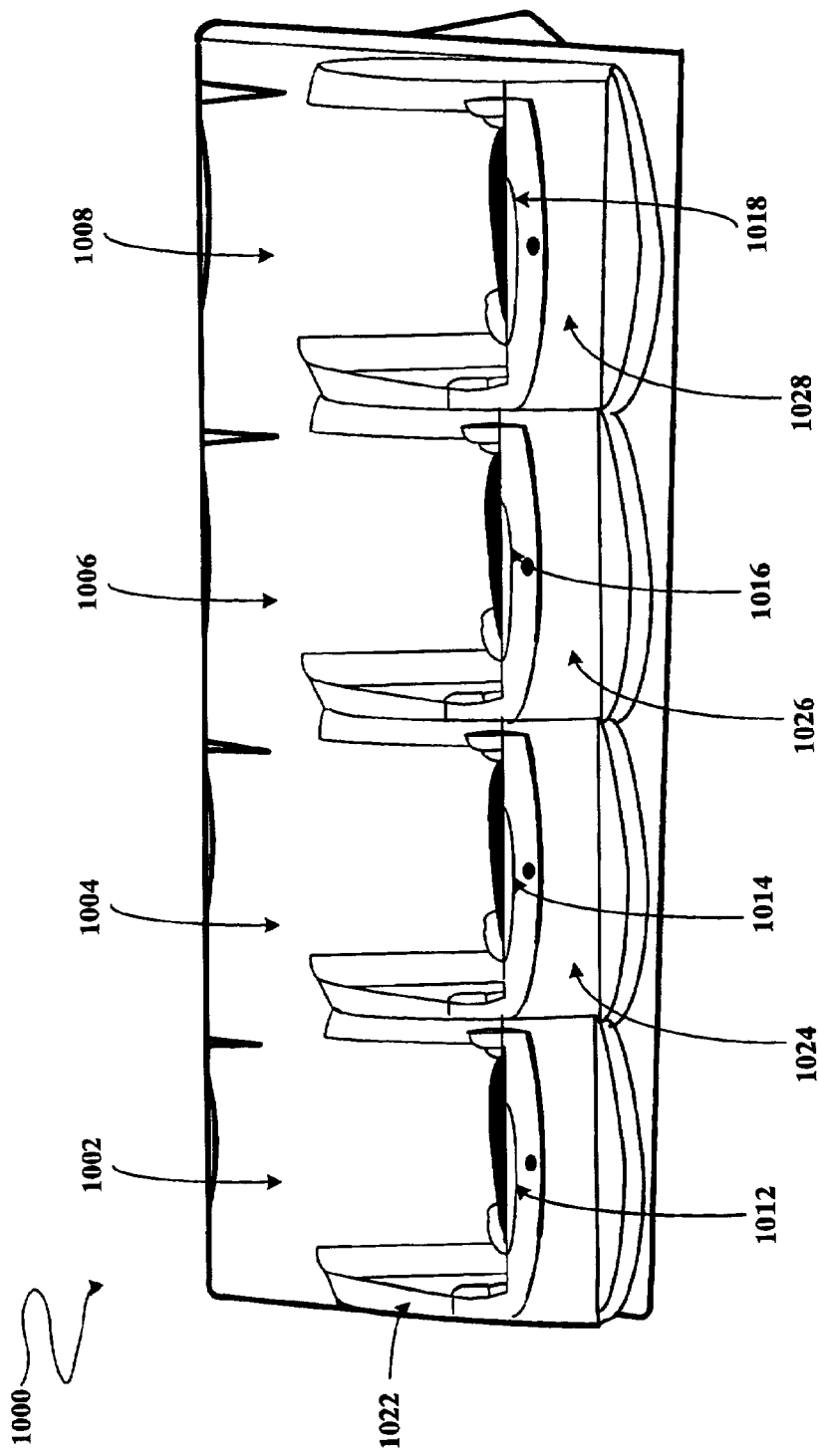
FIG. 15 is a front view of a preferred embodiment of a stackable cradle assembly of the present invention.

FIG. 15 shows a perspective view of a stackable cradle assembly 1000 according to a preferred embodiment of the present invention. As shown in FIG. 15, the present embodiment of the cradle is arranged and constructed for docking with one or more of the portable terminals of FIGS. 9A and 9B. The cradle 1000 of FIG. 15 is stackable and especially adaptable for use in shopping, warehousing, health care, service centers and packaging/trucking establishments.

Figure 16:
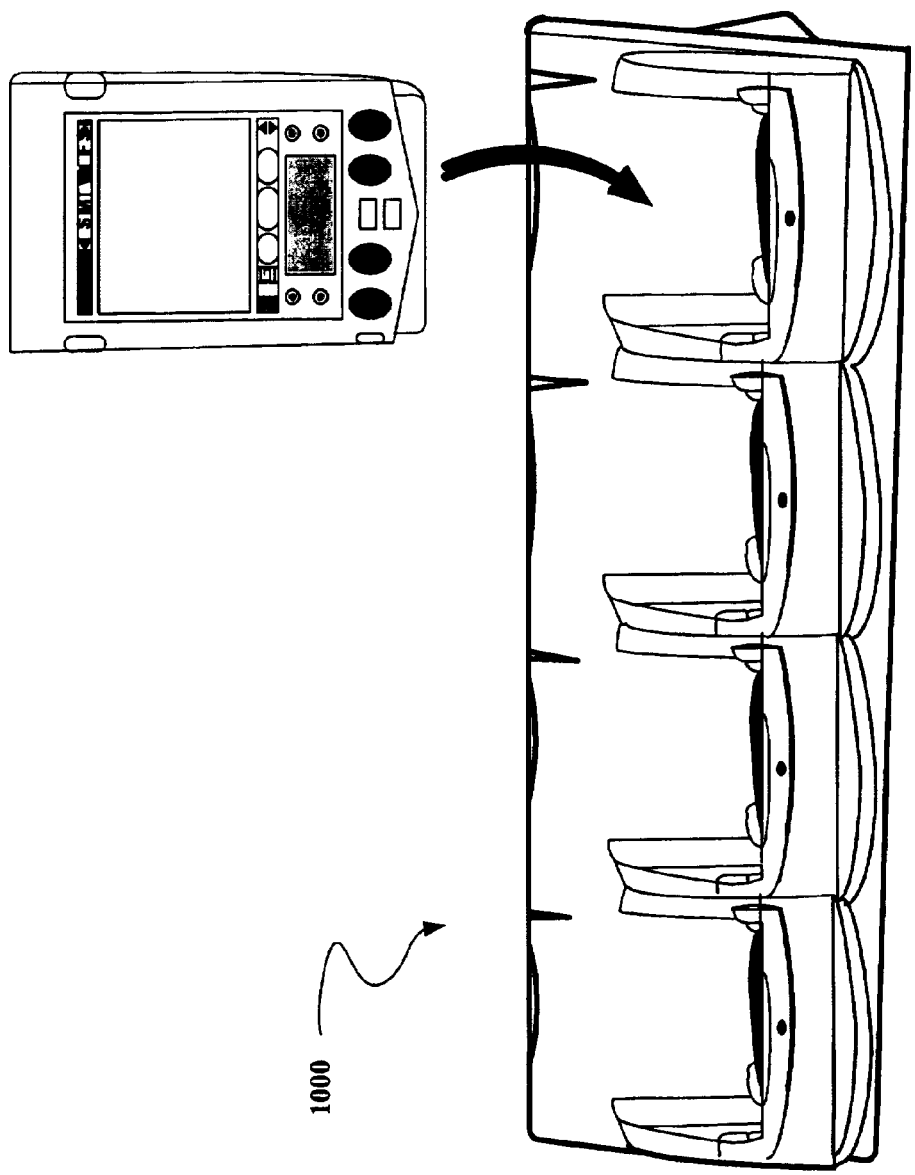
FIG. 16 illustrates the docking of a portable terminal with the stackable cradle of FIG. 15.
Figure 18:
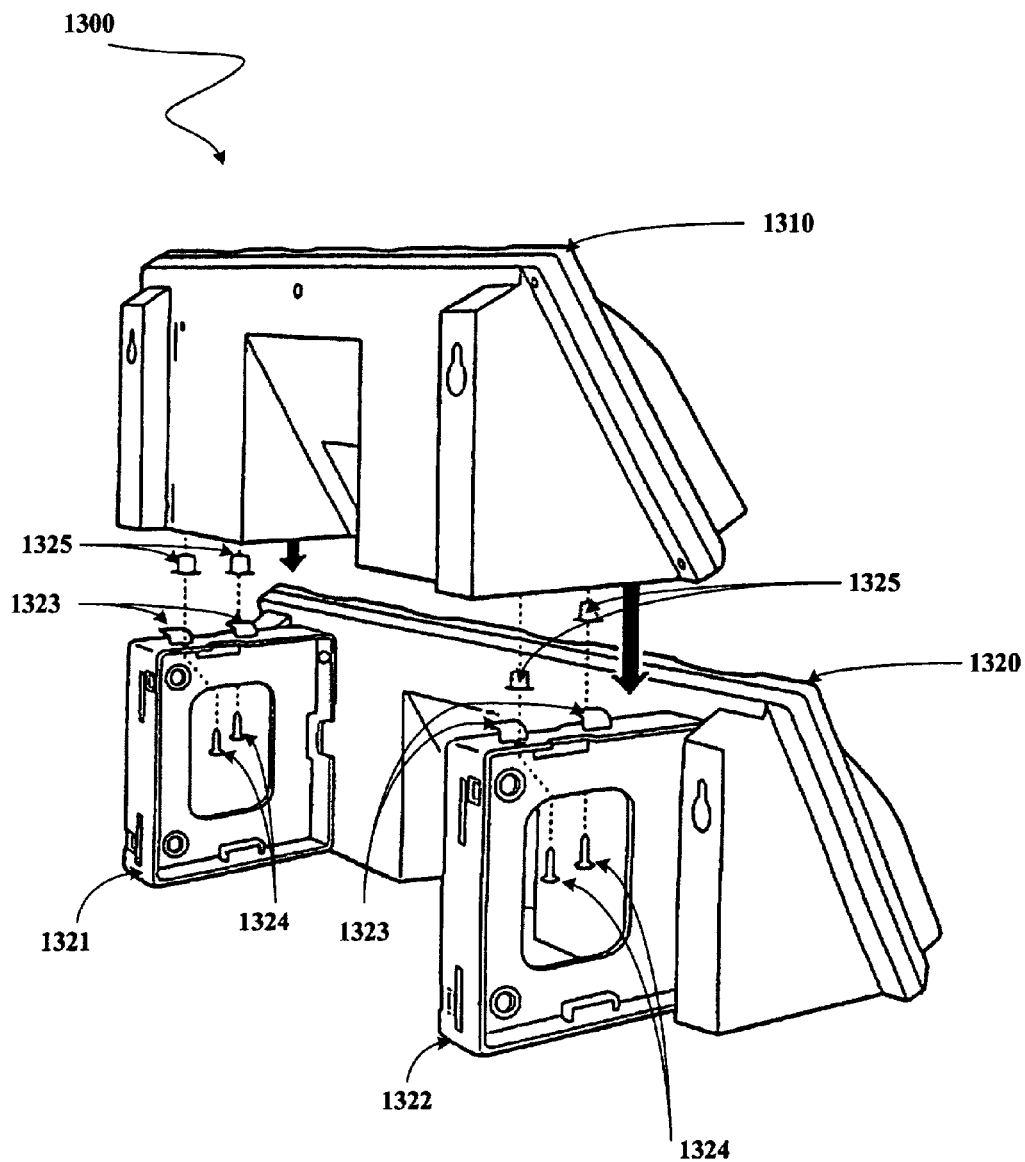
FIG. 18 illustrates a two-cradle configuration in accordance with the stackable cradle embodiment of FIG. 15.
Figure 19:
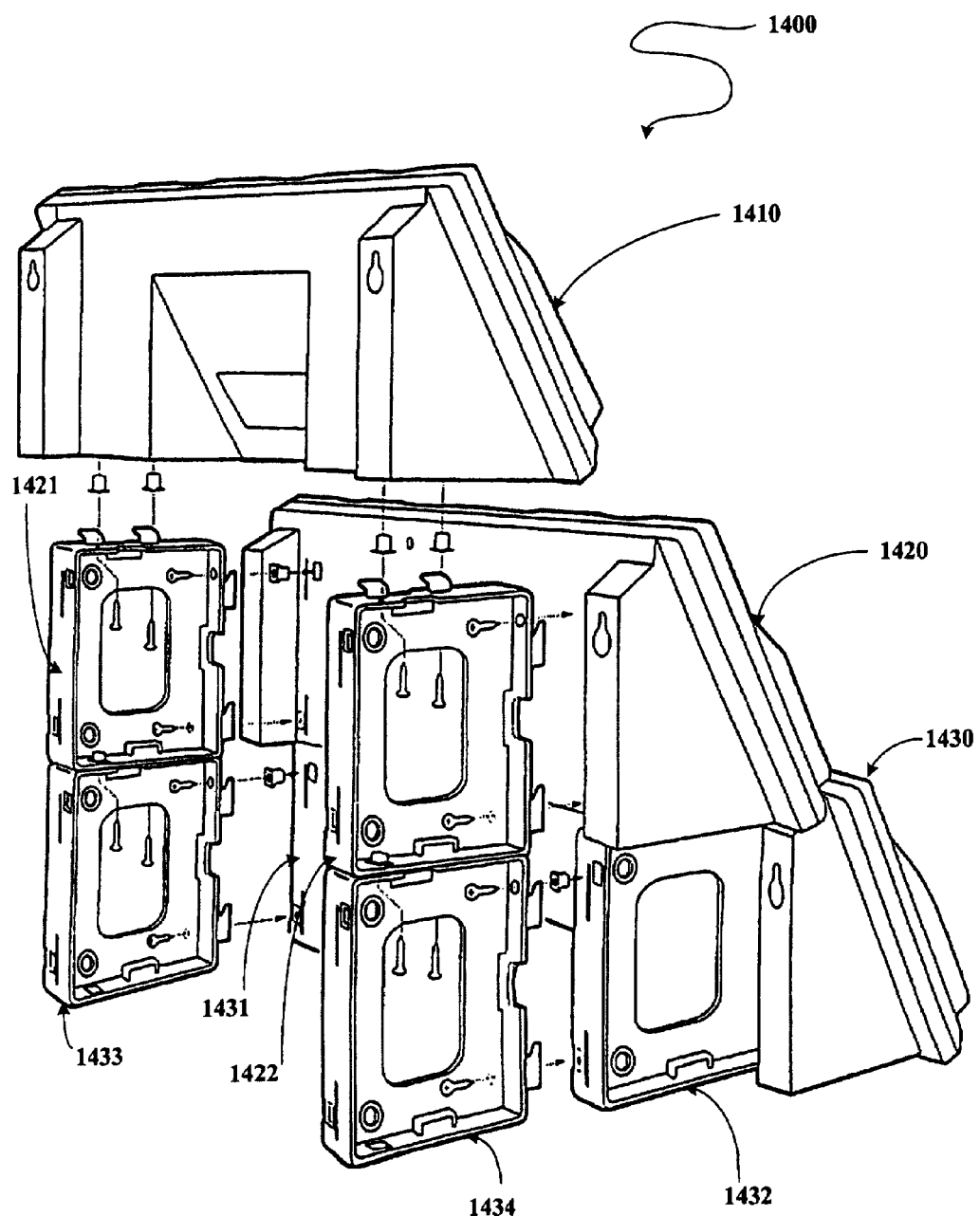
FIG. 19 illustrates a three-cradle configuration in accordance with the stackable cradle embodiment of FIG. 15.
Figure 20:
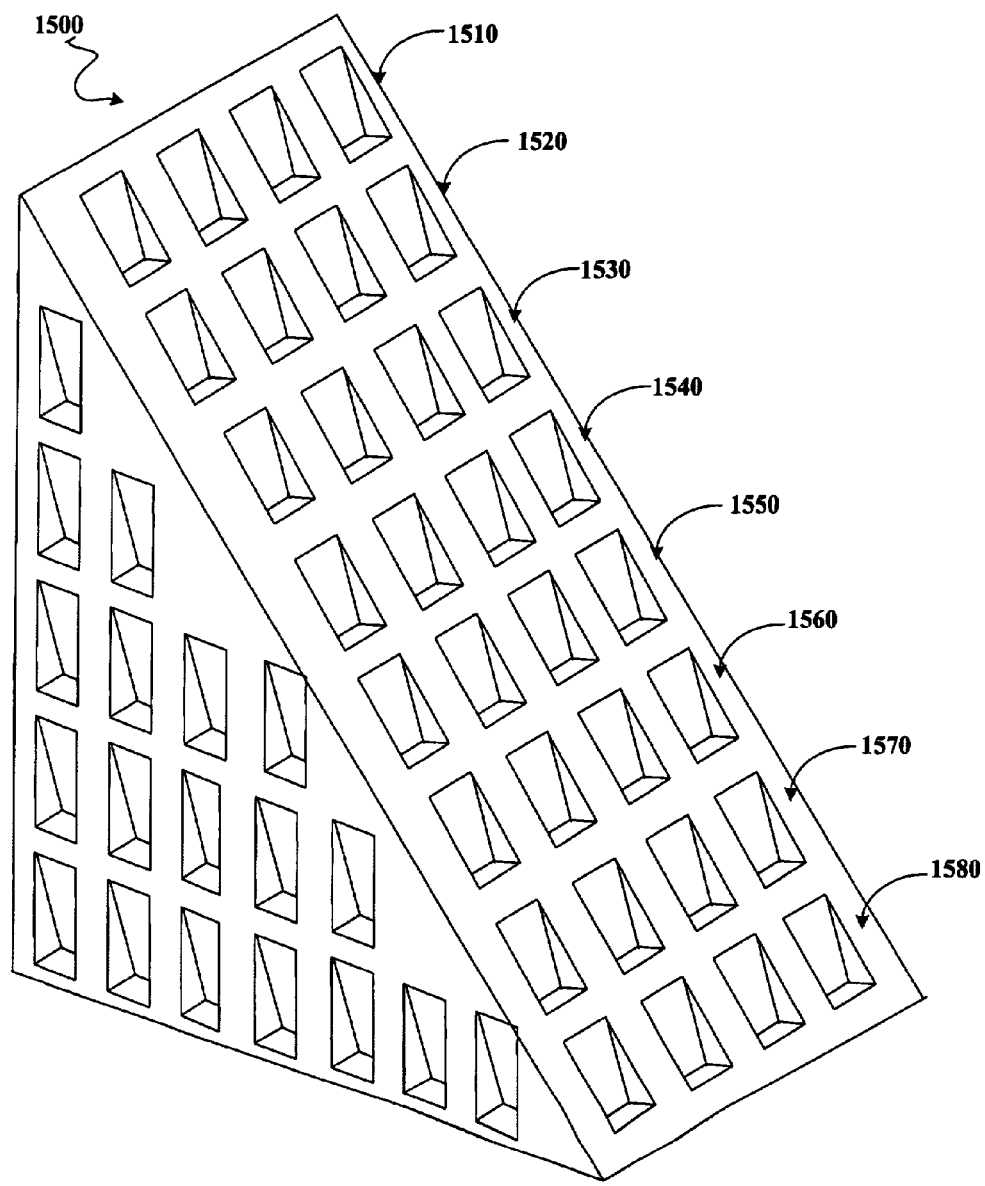
FIG. 20 illustrates an eight-cradle configuration in accordance with the stackable cradle embodiment of FIG. 15.

The present embodiment of the cradle 100 includes one or more docking stations 1002 through 1008 for linking one or more portable terminals to a host computer so that data may be transmitted between the terminals and the host computer. The number of docking stations in FIG. 15 is shown by way of example and not limitation. Each docking station 1002, 1004, 1006 and 1008 includes a cradle data interface 1012, 1014, 1016 and 1018, and means for supporting the portable terminals 1022, 1024, 1026 and 1028. Preferably, the cradle 1000 is constructed of sturdy, high impact plastic material which is molded at station to receive the portable terminals as shown in FIG. 16. The cradle 1000 may also include a communications interface board, a power supply interface, visual indicators and wall-mounting means. As shown in FIGS. 18–20, multiple cradles can be stacked, for example to a wall or on a table top or counter, to interconnect many portable terminals to a host computer.

Figure 17:
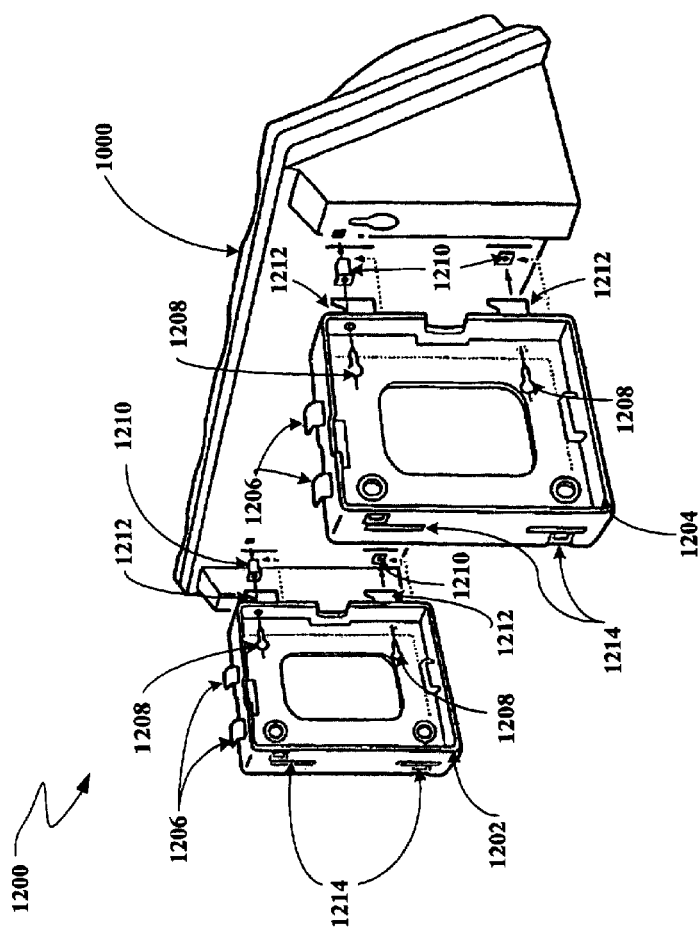
FIG. 17 is a rear view of the stackable cradle assembly of FIG. 15.

FIG. 17 shows the back side of the cradle 1000 of FIG. 15 with stacking elements 1202 and 1204 attached thereto. Each of the stacking elements 1202 and 1204 include horizontally facing attachment hooks 1212 and fastening means 1208 and 1210. The stacking elements 1202 and 1204 also include vertically facing attachment hooks 1206 for securing an additional cradle as shown in FIG. 18, and attachment slots 1214 for attaching additional stacking elements.

FIG. 18 shows a plurality of cradles 1310 and 1320 stacked on top of each other using stacking elements 1321 and 1322. Each of the stacking elements include horizontally (not shown) and vertically facing attachment hooks 1323 and slots (not shown) and fastening means 1324 and 1325 for interconnecting the upper cradle 1310 and the lower cradle 1320. In the two-cradle configuration 1300 of FIG. 18, for example, the two stacking elements 1321 and 1322 are attached to the backside of the lower cradle 1320 via the horizontally facing attachment hooks (not shown). The upper cradle 1310 is then mounted via the vertically facing attachment hooks 1323 disposed on the top side of the stacking elements 1321 and 1322, thus securing the lower and upper cradles 1310 and 1320.

FIG. 19 illustrates another multi-cradle configuration 1400 in accordance with the stackable cradle embodiment of FIG. 15. The multi-cradle configuration 1400 includes a lower cradle 1430, a middle cradle 1420 and an upper cradle 1410. With such a configuration, a two sets of stacking elements 1421, 1422 and 1431, 1432, 1433, 1434 are connected to the cradles 1410, 1420 and 1430 via the corresponding attachment hooks, slots and fastening means. Similarly, FIG. 20 shows another multi-cradle configuration comprised of eight stacked cradles 1510, 1520, 1530, 1540, 1550, 1560, 1570 and 1580. Thus, as shown by FIGS. 19 and 20, the stacking elements of the present invention are constructed and arranged such that in a stacking arrangement of n cradles, wherein the first cradle is the lowest cradle (cradle 1) and the topmost cradle is the n-th cradle (cradle n), each cradle i for cradles i to n requires n–i sets of stacking elements attached to the backside of thereof, and each cradle i for i=1 to n requires i–1 sets of stacking elements attached thereunder.

Figure 21:
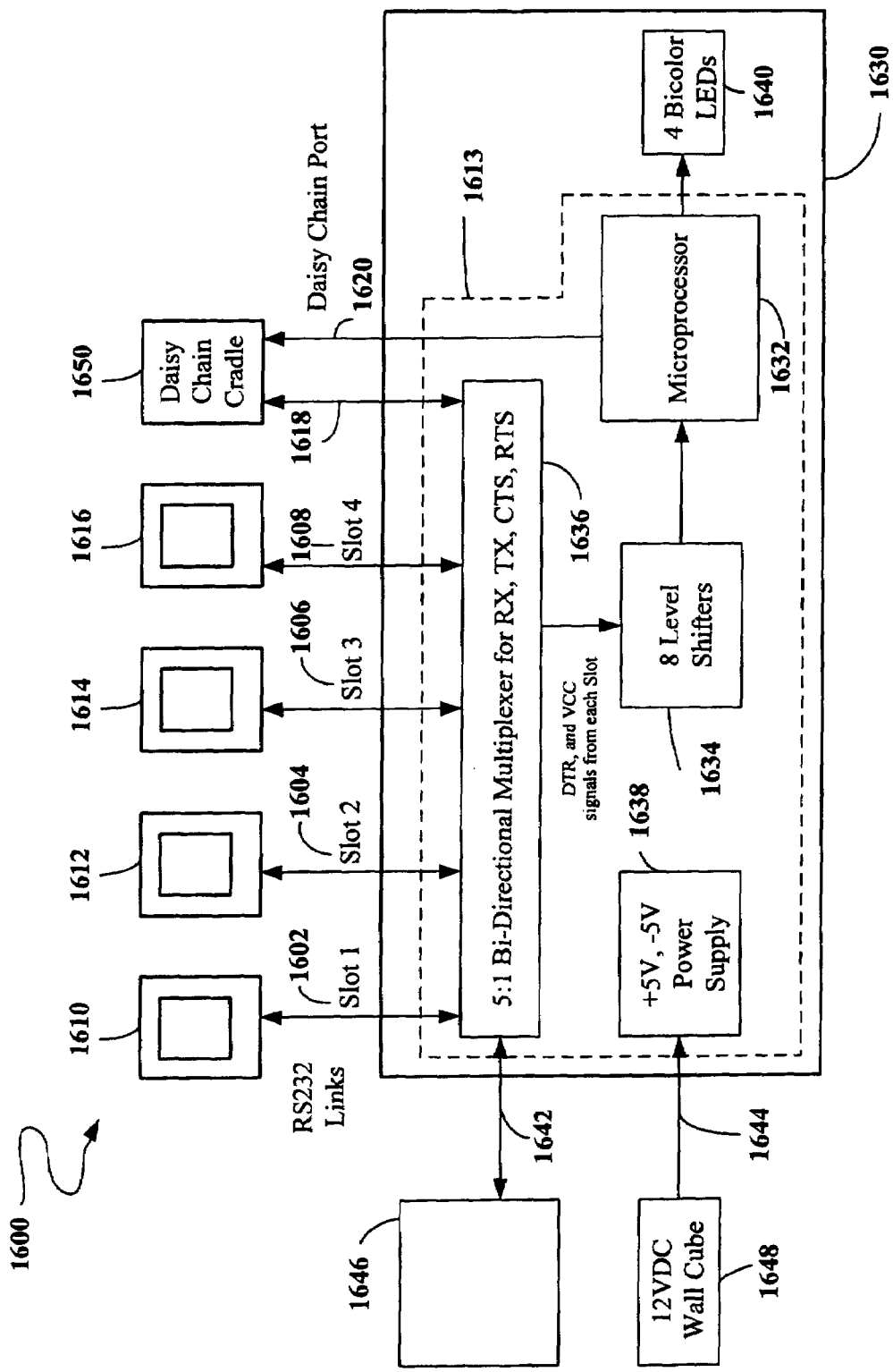
FIG. 21 is a circuit schematic for a 4-slot serial cradle according to a preferred embodiment of FIG. 15.

FIG. 21 shows a circuit schematic for a 4-slot serial cradle 1630 according to the preferred embodiment of the cradle shown in FIG. 15. Again, the number of slots or docking stations denoted by reference numerals 1602, 1604, 1606 and 1608 is shown by way of example and not limitation. The serial cradle 1630 includes a printed circuit board housing a data transfer circuit 1631. The data transfer circuit 1631 includes a microprocessor 1632 for managing communications between the a plurality of portable terminals 1612, 1614, 1616, 1618 and a host computer 1646 and other interconnected cradles 1650, a multiplexer 1636 for serial communications between each of the portable terminals 1612, 1614, 1616, 1618 and the host computer 1646, and a corresponding shift register 1634 coupled to multiplexer 1636 the for sending status signals from each of the portable terminals 1612, 1614, 1616, 1618 to the microprocessor 1632. The data transfer circuit 1631 is powered by a DC power supply 1648 and provides the appropriate electrical signals to visual indicators 1640 mounted on the cradle 1630 for displaying the operational status for each of the portable terminals connected to the cradle 1630.

According to a preferred embodiment of the present invention, each docking station of the serial cradle 1630 includes a corresponding cradle data interface (not shown in FIG. 21) for providing serial data communications between the portable terminals. Preferably, as shown in FIG. 21, the cradle data interface are RS-232 ports for providing serial communication. The multiplexer 1636 is thus capable of processing RS-232 control signals, such as Request to Send (CA) and Clear to Send (CB) signals, and routing transmitted data signals to and from the appropriate portable terminals, i.e., Transmit Data (BA) and Receive Data (BB).

The serial cradle 1630 further includes a daisy chain port 1620, e.g., another RS-232 port, for serially connecting one or more additional cradles. When the daisy chain port 1620 is used, the serial cradle firmware recognizes the daisy chain port 1620 as a fifth slot and uses the normal procedures to arbitrate and issue clearance for communications with the host computer 1646. Further, via the daisy chain port 1620, the serial cradle 1630 is capable of being a slave cradle to an Ethernet cradle and thus is capable of providing Ethernet connectivity in a round robin fashion to portable terminals inserted into the docking stations of the serial cradle.

As best shown by FIGS. 15 and 21, each serial cradle 1630 is provided with a plurality of visual indicators 1640 for displaying the operational status of each of the portable terminals connected to the serial cradle. For the 4-slot serial cradle corresponding to FIG. 21, for example, there are four LEDs 1 through 4 corresponding to each terminal slots or docking stations 1602, 1604, 1606 and 1608. In a preferred embodiment of the present invention, each of the LED's has four associated color states: OFF, RED, ORANGE and GREEN. When an LED is OFF, no portable terminal is presently connected to the corresponding slot. RED indicates the presence of a portable terminal, but with no established communication session. ORANGE at a 2 Hertz blink cycle, for example, indicates that a communication session has been established and is in progress. GREEN indicates the presence of portable terminal with a completed communication session.

Figure 22:
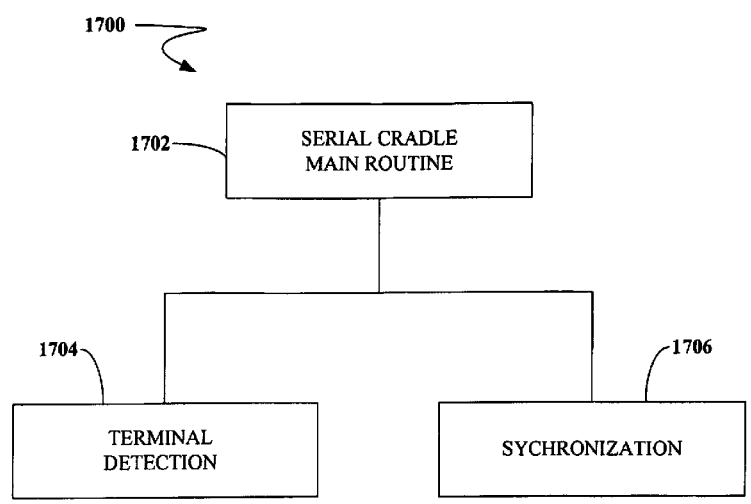
FIG. 22 shows the firmware architecture for the serial cradle of FIG. 21.

FIG. 22 shows the firmware architecture for the serial cradle of FIG. 21. The firmware 1700, which is executed by the microprocessor 1632, includes a main module 1702, a terminal detection module 1704 and a synchronization module 1706.

The terminal detection module 1704 of FIG. 22 is used to determine whether portable terminals are connected to one or more terminal slots of the serial cradle. When a portable terminal is connected, a voltage VCC is sensed from the portable terminal and detected by the module 1704 and associated hardware. The appropriate logic level is then forwarded to the microprocessor 1632.

The synchronization module 1706 provides means for automatically synchronizing data between the portable terminals and the host computer. Automatic terminal synchronization is performed to synchronize various entries in the portable terminal, such as for example datebook, address book, "to do" lists, memo pad and expense entries, with entries in the host computer. Synchronization is used to manage individual or multiple portable terminals with the host computer, and to automatically backup data from the portable terminal each time synchronize operations are performed. Terminal synchronization can be performed either locally by physically connecting the portable terminal to the corresponding terminal slot, or remotely via a modem.

Changes to data made on the portable terminals or the host computer thus appear at all locations after the synchronization operations are performed. Synchronization is managed by a synchronization manager, which runs in the background and monitors a communications port of the host computer for a synchronization command from a portable terminal. The synchronization command can be provided by physically connecting the portable terminal to the corresponding terminal slot, or by user command. Synchronization commands are processed by the host computer on a first in, first out (FIFO) basis.

Figure 23:
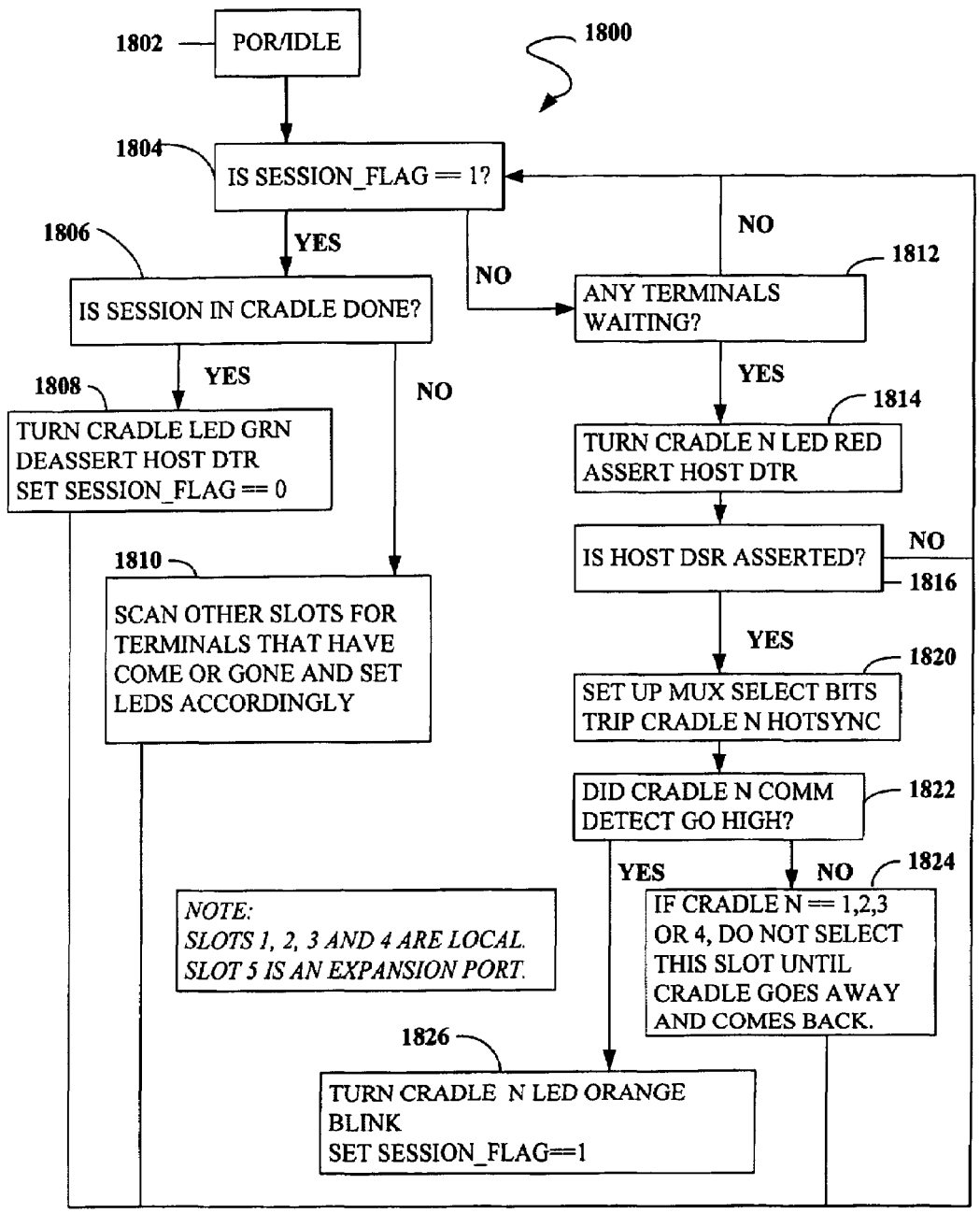
FIG. 23 is a flow diagram corresponding to the firmware of FIG. 22.

FIG. 23 is a flow diagram for the serial cradle main module 1702. First, a check of the docking stations is performed to determine whether any of the portable terminals are connected there to (Step 1802). When a terminal is detected at a docking station, a check is performed to determine whether a communication session is in progress (Step 184). If the session is done, the indicator light is set accordingly and a scan is done of the remaining cradles (Steps 1808 and 1810).

When the cradle firmware detects that a portable terminal has been inserted and that a communication session has been established, the firmware checks to determine whether any other terminals are waiting and if not the microprocessor launches a synchronization operation on that unit and sets the indicator lights appropriately (Steps 1812 through 1820). The status of a synchronization status line determines whether the synchronization is to be performed in a local mode or a remote or "modem" mode. A voltage greater the 0.7 volts on the synchronization status line causes the portable terminal to initiate a remote synchronization. If the synchronization status line is left floating or tied to ground, the portable terminal will initiate a local synchronization. When the serial cradle is daisy chained to an Ethernet cradle, the Ethernet cradle drives the synchronization status line of all slots and forces synchronization in a remote configuration.

If another portable terminal is inserted into a different slot while a communication session is in progress, the serial cradle will not allow a presently running communication session with a portable terminal to be interrupted. Instead, the serial cradle firmware remembers to establish a communication session with the newly connected portable terminal and executes synchronization thereof after completion of the currently running session.

Otherwise, each of the terminal slots of the serial cradle are serviced in a round robin fashion. An error in synchronization of one portable terminal will not affect synchronization of other portable terminals. In addition, there is appropriate debounce time between insertion of a portable terminal and the start of synchronization. Additional processing is provided if an error is detected (Steps 1822 through 1826).

Figure 24:
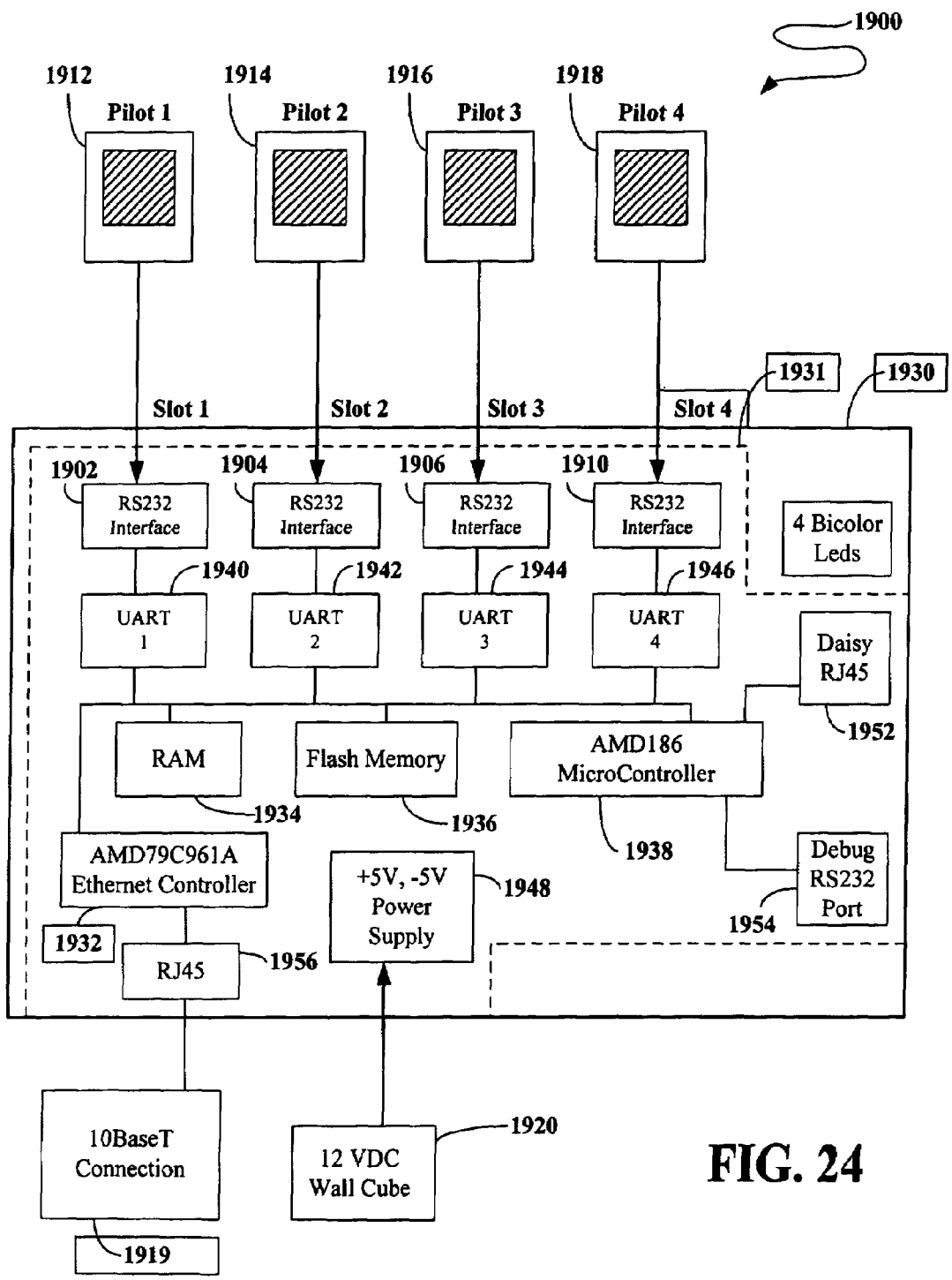
FIG. 24 is a circuit schematic for an Ethernet cradle according to a preferred embodiment of FIG. 15.

FIG. 24 shows a circuit schematic for a 4-slot Ethernet-based cradle 1930 according to a preferred embodiment of the present invention. As with the 4-slot serial cradle of FIG. 21, the number of slots shown is not intended to limit the invention in any way. The Ethernet cradle 1630, which can be adapted for a variety of Ethernet media types including 10BASE-T, 10BASE-F, and 100BASE-T, etc., includes a printed circuit board housing a data transfer circuit 1631, which includes: an Ethernet controller 1932, such as an AMD79C961A, for buffering data and processing data packets; a RAM memory device 1934 for temporarily storing packetized data; a programmable memory device 1936, such as FLASH or EEPROM memory, for storing executable code; a micro-controller 1938, such as an AMD186, for executing the stored executable code; a plurality of serial data communications devices 1940, 1942, 1944 and 1946 (UARTS) corresponding to a plurality of portable terminals 1912, 1914, 1916, 1918 for converting the parallel data provided by the micro-controller 1938 into serial data for transmission to the portable terminals 1912, 1914, 1916, 1918; a plurality serial data interfaces 1902, 1904, 1906 and 1908 for providing a serial data link between the each of the portable terminals 1912, 1914, 1916, 1918 and the corresponding serial data communications devices. Each Ethernet board also has the appropriate connector interfaces for 10BASET connection 1919, DC power 1920, debug 1954 and daisy chain connections 1952.

Mounted on the front face of the Ethernet cradle 1930 are a plurality of visual indicators for displaying the operational status of the portable terminals connected to the Ethernet cradle 1930. For the 4-slot Ethernet cradle corresponding to FIG. 24, for example, there are four LEDs 1 through 4 corresponding to each of the docking stations. In a preferred embodiment of the present invention, each of the LED's has six associated color states: OFF, Solid RED, Slow Flash RED, Fast Flash RED, Slow Flash GREEN and Solid GREEN. When an LED is OFF, no portable terminal is presently connected to the corresponding slot. A solid RED indicates the presence of a portable terminal, but with no established communication session. The flashing RED states both indicate error conditions with the communications link to the portable terminal: a slow flash RED indicates that communication to the portable terminal did not start and a fast flash RED indicates that communication did not end. A slow flash GREEN at a 2 Hertz blink cycle, for example, indicates that a communication session has been established and is in progress with a connected portable terminal. A solid GREEN indicates the presence of a portable terminal with a completed communication session.

Figure 25:
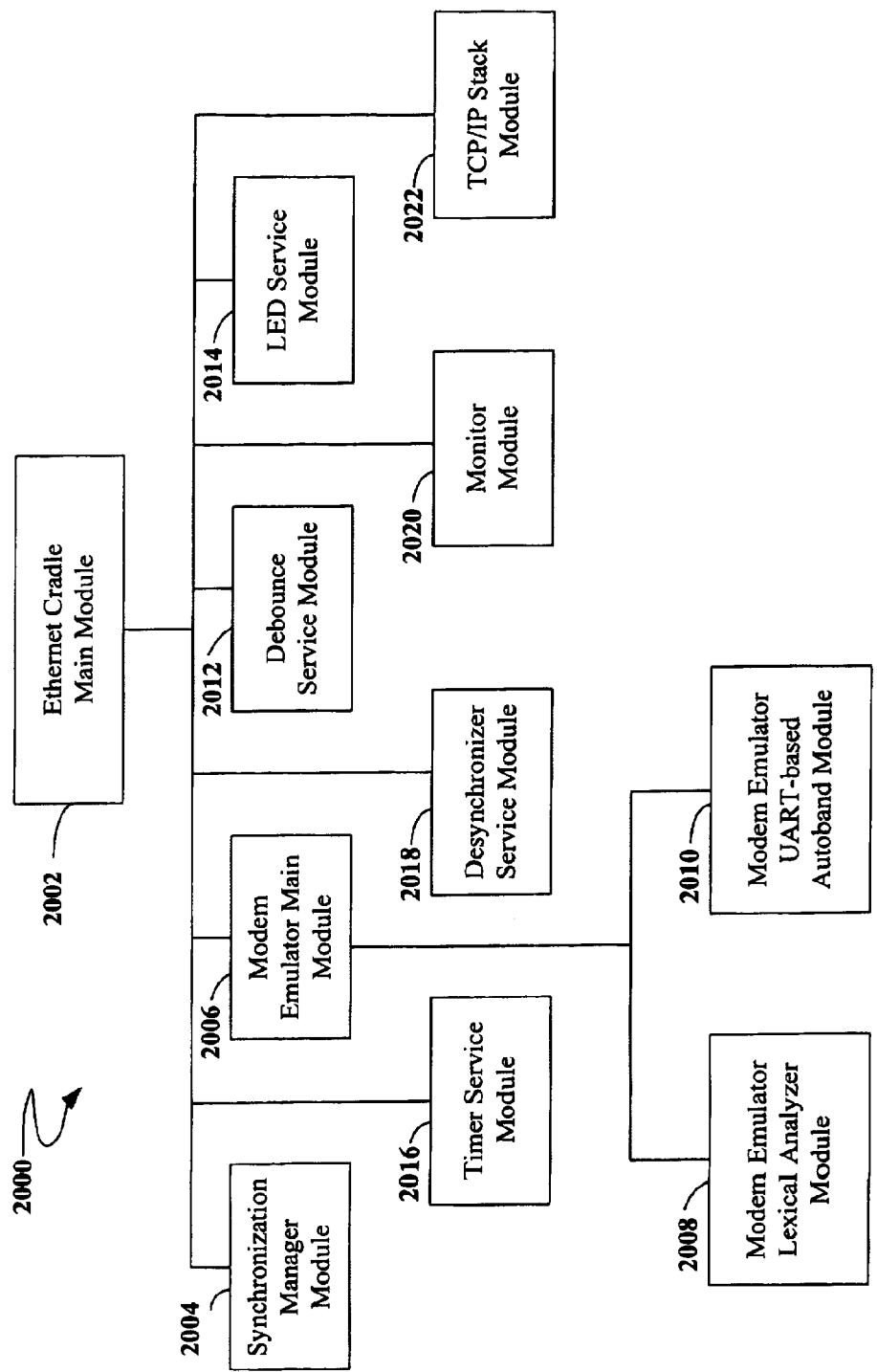
FIG. 25 shows the firmware architecture for the Ethernet cradle of FIG. 24.

FIG. 25 shows the firmware architecture for the Ethernet-based cradle of FIG. 24. The software includes: an Ether cradle main (ECR) module 2002; a synchronization manager module 2004; modem emulator modules 2008 through 2010; a debound service (DEB) module 2012; an LED service (LED) module 2014; a timer service (TMR) module 2016; a desynchronizer service (DSY) module 2018; a monitor (E86) module 2020; and a TCP/IP stack (EBSNET) module 2022. The software modules shown in FIG. 25 are stored in the FLASH or EEPROM memory 1936 and executed by the micro-controller 1938 of FIG. 24.

The firmware of FIG. 25 allows the Ethernet cradle to act as a router/bridge between Internet Protocol (IP) packets from the Ethernet micro controller and the various serial data interfaces. To supply network IP address assignment, the Ethernet cradle provides IP NAT translation between the IP address of each serial data interface and the IP address assigned to the corresponding portable terminal. This strategy allows the cradle to use the host computer to assign addresses to each serial data interface. When a portable terminal are is connected to a serial data interface, the terminal's IP address is used only for the PPP link between the terminal and the Ethernet cradle. The IP address assigned by the host computer is used for all network communication.

In addition, the Ethernet cradle firmware allows the cradle to "fake out" a portable terminal into believing that it is attached to a modem in a dial-up network. Upon detecting a new portable terminal being inserted into a slot, the Ethernet cradle automatically initiates a "Modem: Synchronization Operation". The portable terminal then attempts to dial a host. The Ethernet cradle thus emulates a modem, responding to the AT dialing commands as required. Since no real phone system is involved, the "dialing" and "connection" phases are instantaneous. After a PPP session is established, the Ethernet cradle "bridges" the link between itself and the portable terminal by moving the data to Ethernet queues for transmission across the network. As part of the bridging, the cradle translates the IP address from that used on the PPP link to the host computer assigned link for the slot.

In accordance with a preferred embodiment of the present invention, the ECR routine 2002 is responsible for initializing the cradle hardware, and creating and activating all subordinate hardware and software components and starting the main event processing. The ECR routine 2002 further collects IP addresses from the host server, maintains PPP links and outputs debug information to the expansion port. If requested, the ECR routine 2002 can also process packet data for the synchronization manager module 2004.

Referring again to FIG. 25, the synchronization manager module 2004 is used for initializing synchronization operations for portable terminals connected to the Ethernet cradle. The synchronization operations are described above in more detail with reference to the serial cradle embodiment of FIG. 21. Module 2004 is responsible for all functions relating to starting, stopping, and tracking synchronization operations related to the portable terminals inserted in the local or expansion cradle slots. These functions include controlling the status LEDs, implementing watchdog timeouts on the starting and finishing of the synchronization operations, and restarting the synchronization routine on all slots and the expansion port if requested.

Modem emulation modules include a modem emulator lexical analyzer (MO_LEX) module 2008 and a modem emulator UART-based auto-baud (MO-MUA) module 2010. The modem emulation modules allow the portable terminals to establish PPP connections through a modem with a remote Internet Service Provider (ISP). Thus, the cradle takes the place of the ISP, forwarding IP packets received on the PPP connection to the Ethernet and via the Ethernet to the Internet, and vice versa. With such a link, the portable terminals then establish a TCP/IP connection with the host computer, and synchronization operations are performed over the link.

In a preferred embodiment of the present invention, the MO_MOE module 2006 emulates a Hayes compatible modem long enough to recognize the baud rate of the portable terminals and to provide a CONNECT <BAUD> message to the portable terminal so that a PPP session can begin. The MO_LEX module 2008 tokenizes the stream of modem setup and dial commands sent through the serial data interfaces by the portable terminals. The MO-MUA module 2010 automatically detects that baud rate at which the portable terminals are communicating.

The DEB module 2012 provides generic debounce service: for each debounce entry registered, this module will accept jittery UP and DOWN events and give callback with debounced UP and DOWN events to the registered owner of the debounce entry.

The LED module 2014 provides a generic 4-color (counting OFF) LED service. This service handles all LED logic including setting the color or turning the LEDs OFF, and allows setting 3 possible duty cycles, e.g., solid color, fast flash, and slow flash.

The TMR module 2016 is a generic timer service that provides users with either one-shot or periodic timers. When the timer times out, a callback is generated to the timer owner. This module service also multiplexes single timers into several timers wherein the resolution of the multiplexed timers is approximately 0.5 msec.

The DSY module 2018 is a generic event queue. However, it has been specialized to register an event dispatch task with the EBSNET stack. So, all events posted to it will eventually result in a dispatch via a callback to the component that posted the event. These messages are dispatched at application idle time.

The E86 module 2020 is a monitor that accepts downloads of new firmware for the cradle, including if necessary, upgrading the E86 module itself. The module monitors the expansion port of the cradle and is accessible for about three seconds after power-up. This module can also be used to configure the Ethernet cradle to run in diagnostic mode. In diagnostic mode, operation of the cradle proceeds normally, except that the expansion port is utilized to give diagnostic messages to a host PC, rather than as a data link to the serial chain.

The EBSNET module 2022 implements Ethernet and serial TCP/IP communication. The module also recognizes events from the UART and the modem emulator module.

Figure 26:
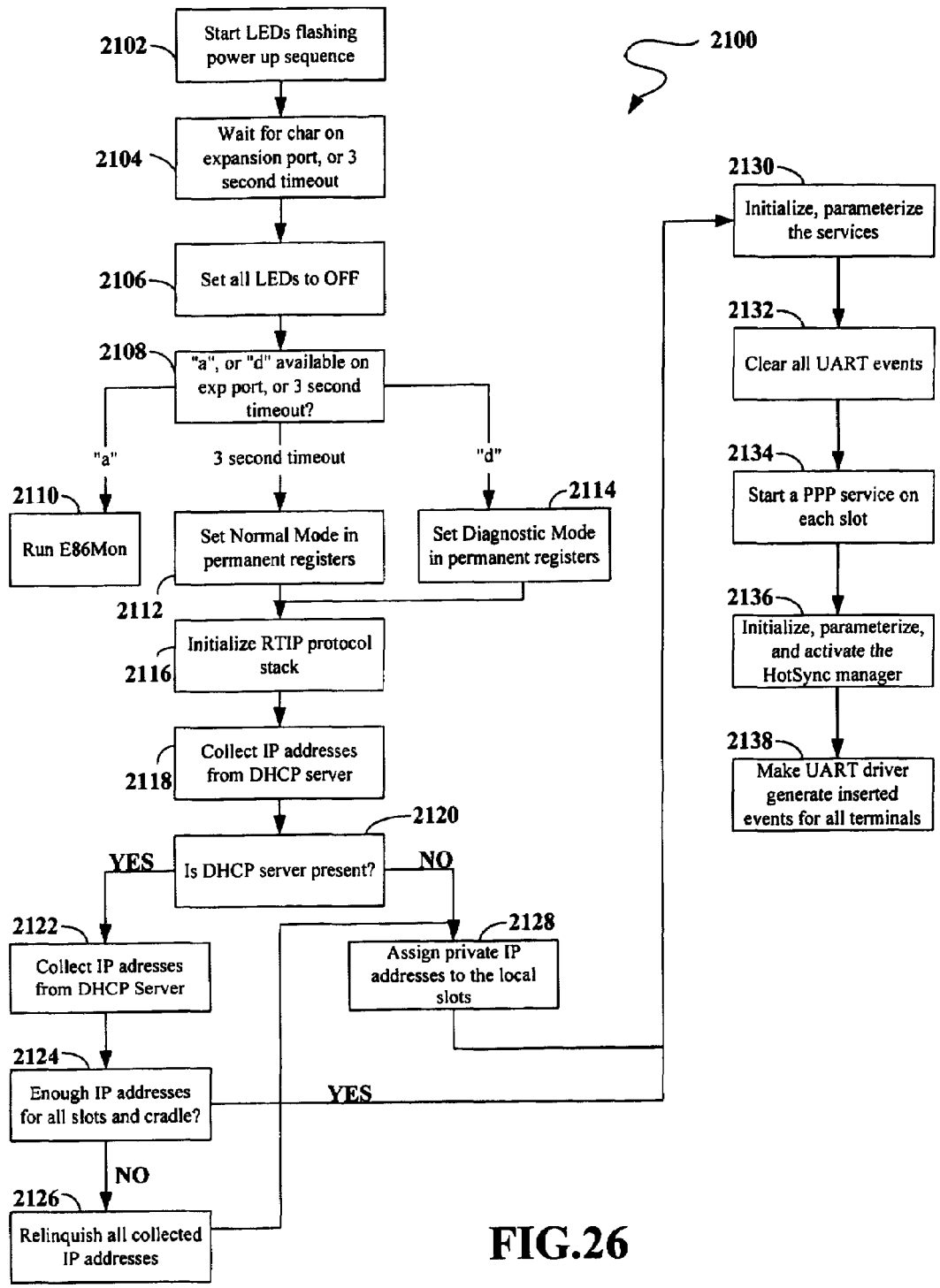
FIG. 26 is a flow diagram corresponding to the firmware of FIG. 25.

FIG. 26 is a flow diagram for the Ethernet cradle main module 2002. As shown in FIG. 26, the ECR module 2002 issues instructions to start the cradle LEDs flashing a power-up sequence (Step 2102). The ECR module 2002 then waits for a character input at the expansion port, or performs a three second timeout if none is present (Step 2104). All cradle LEDs are then turned off. (Step 2106). If an "a" character is detected at the cradle expansion port, the E86 monitor module is executed (Step 2110). If a "d" character is detected, all permanent registers of the cradle are set to diagnostics mode (Step 2114). If the ECR module 2002 performs a three second timeout, then the permanent registers are set to normal mode (Step 2112).

In normal mode, the ECR module 2002 then initializes the RTIP protocol stack and attempts to collect IP addresses corresponding to the cradle slots from the host server (Steps 2116 and 2118). If a server is present in accordance with Step 2120, then all IP addresses registered with the server are collected (Step 2122). If no server is present, then private IP addresses are assigned to the local slots and to the logical slot that represents the serial chain (Step 2128). Note, Step 2128 is executed only for debugging purposes, and is not intended for general use in that the privately assigned addresses may conflict with other private IP addresses.

Referring again to Step 2122, if enough IP addresses are available for all slots of the cradle, then the ECR module initializes and parameterizes the service modules shown in FIG. 25 (Step 2130). All UART events are then cleared (Step 2132), and PPP services are started on each slot (Step 2134). The synchronization manager module is then initialized, parameterized and activated (Step 2136), and the UART driver generates events for all portable terminals (Step 2138). If according to Step 2124 there are not enough IP addresses, all collected IP addresses are relinquished and processing continues according to Step 2128.

Figure 27:
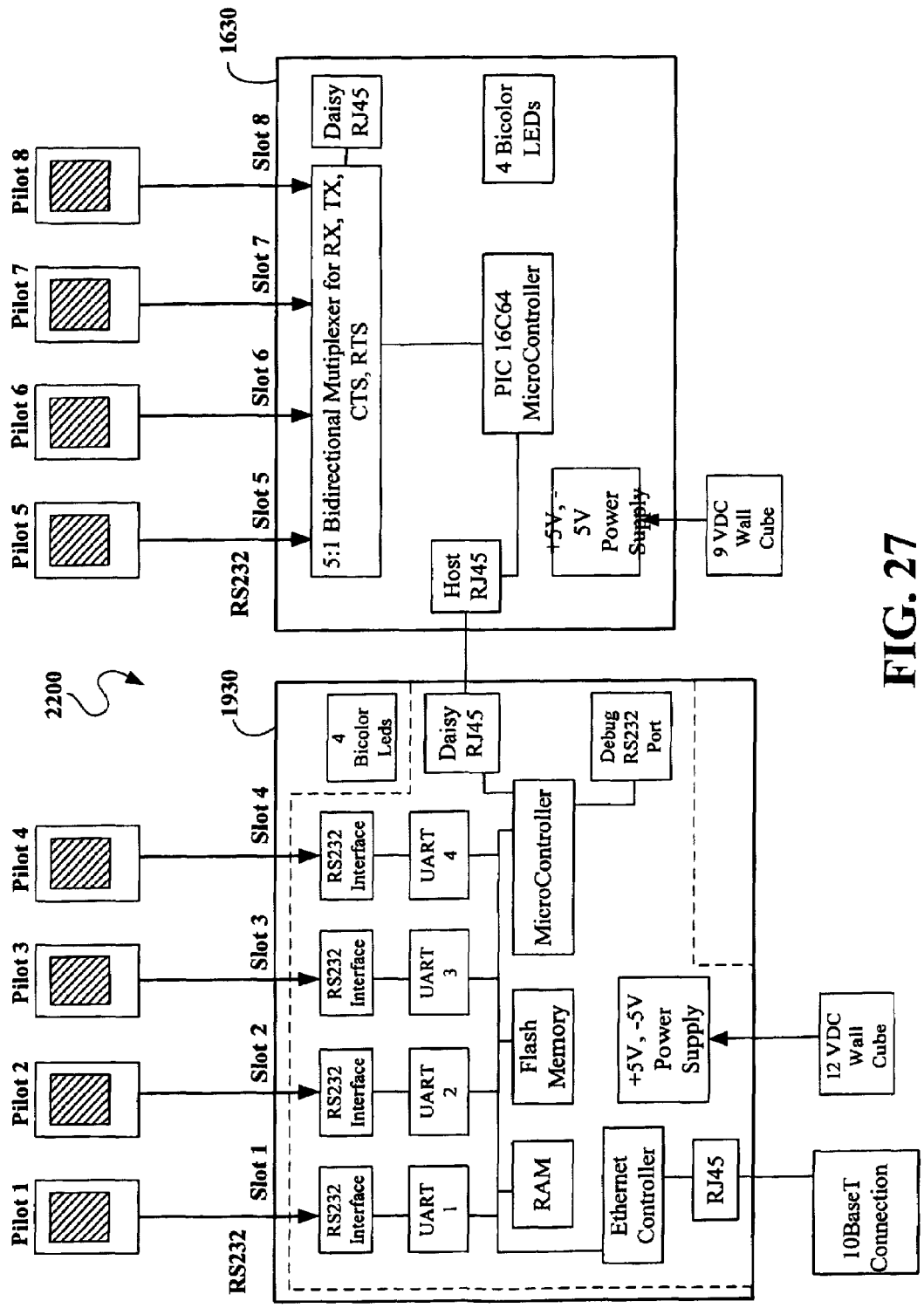
FIG. 27 is a circuit schematic for a daisy chained configuration utilizing the 4-slot serial cradle of FIG. 21 and the 4-slot Ethernet cradle of FIG. 24.

FIG. 27 shows another preferred embodiment of the present invention wherein the 4-slot serial cradle 1630 of FIG. 21 is daisy chained to the 4-slot Ethernet-based cradle 1930 of FIG. 24. With this configuration, simultaneous data communications is possible with five portable terminals at any given moment, i.e., the four Ethernet terminals and one of the serial terminals.

The aforedescribed embodiments of the present invention also feature a diagnostics utility in each of the portable terminals for ensuring that the portable terminals are operating properly and to assist in troubleshooting if necessary. The diagnostics utility tests the various features of the portable terminals, and reports to the user whether or not the terminal features are functioning properly.

Figure 28:
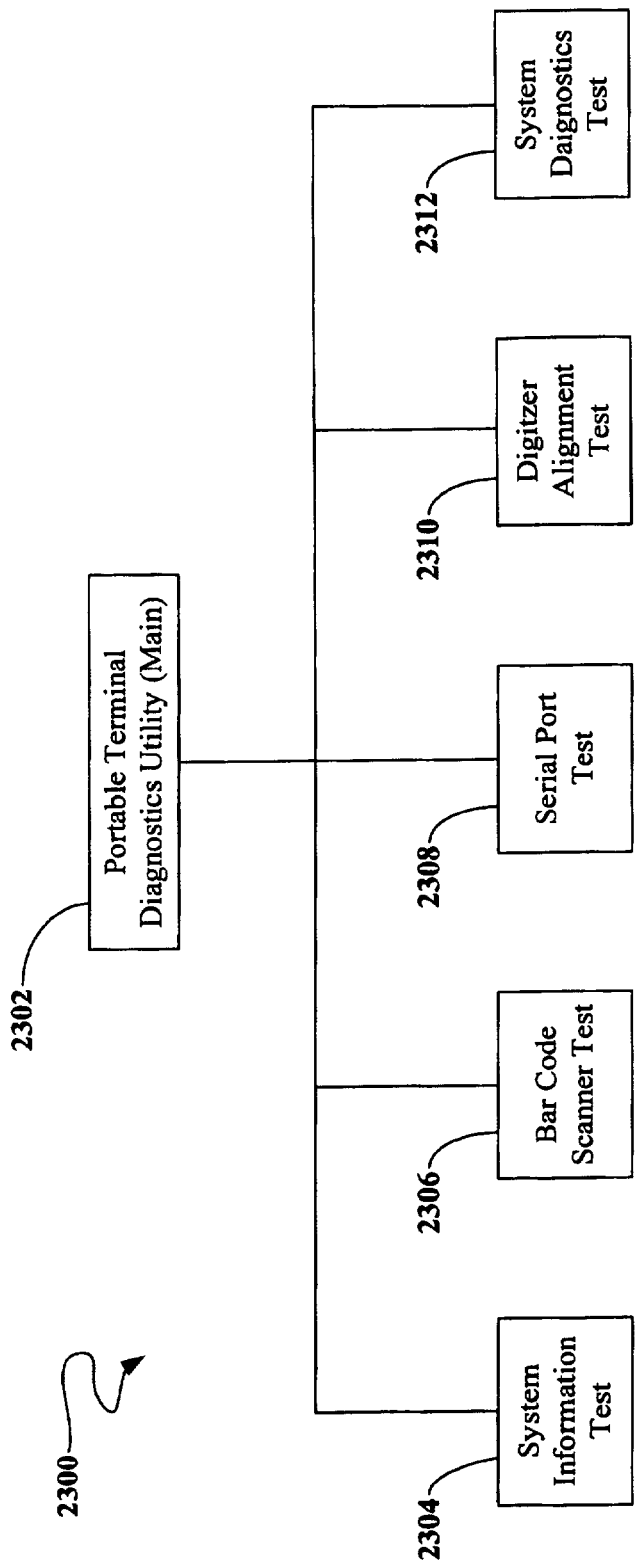
FIG. 28 shows the software architecture for a portable terminal diagnostics utility according to the present invention.

FIG. 28 shows the software architecture for the portable terminal diagnostics utility. The portable terminal diagnostics utility 2300 includes a main module 2302, a system information test module 2304, a bar code scanner test module 2306, a serial port test module 2308, a digitizer alignment test module 2310, and a system diagnostics test module 2312. Preferably, the diagnostics utility of FIG. 27 is implemented in software and stored in ROM in the each of the portable terminals. Corresponding graphical user interfaces, as shown in FIGS. 29–32 are also provided for executing the various tests. As shown, the diagnostics screens are written using the Satellite Forms™ software development tool.

Figure 29:
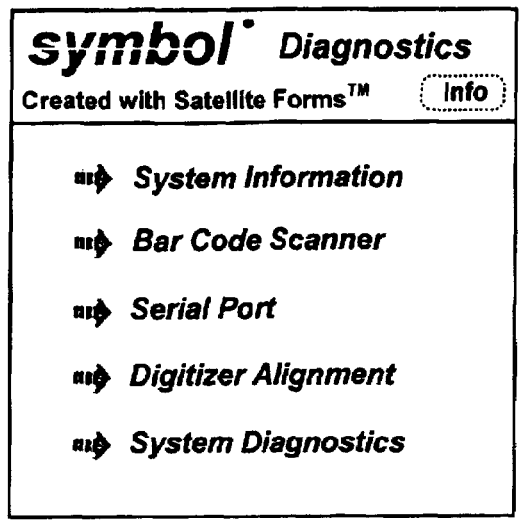
FIG. 29 shows an example of a main diagnostics screen corresponding to the diagnostics utility of FIG. 28.

FIG. 29 shows an example of a main diagnostics screen 2400 corresponding to the diagnostics utility of FIG. 28. When the diagnostics utility is run, the main diagnostics screen 2400 displays the above-referenced test module options to the user. Further selection of the displayed options generates the appropriate display of related information.

Figure 30:
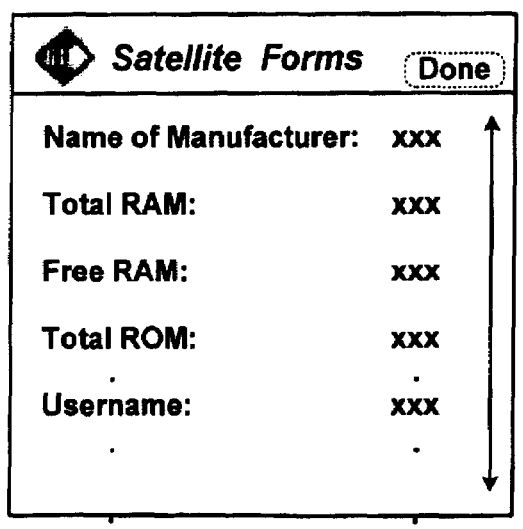
FIG. 30 shows an example of a screen corresponding to the system information test of FIG. 28.

FIG. 30 shows an example of a screen 2500 corresponding to the system information test 2304 of FIG. 28. The system information test is used to describe the attributes of the portable terminal, and is used along with the display screen 2500 to report information including but not limited to the following information about the portable terminals: name of manufacturer, the total amount of RAM, the amount of available or free RAM, the amount of ROM, the user name of the terminal, running version of the operating system and the voltage level or charge status of the batteries.

Figure 31:
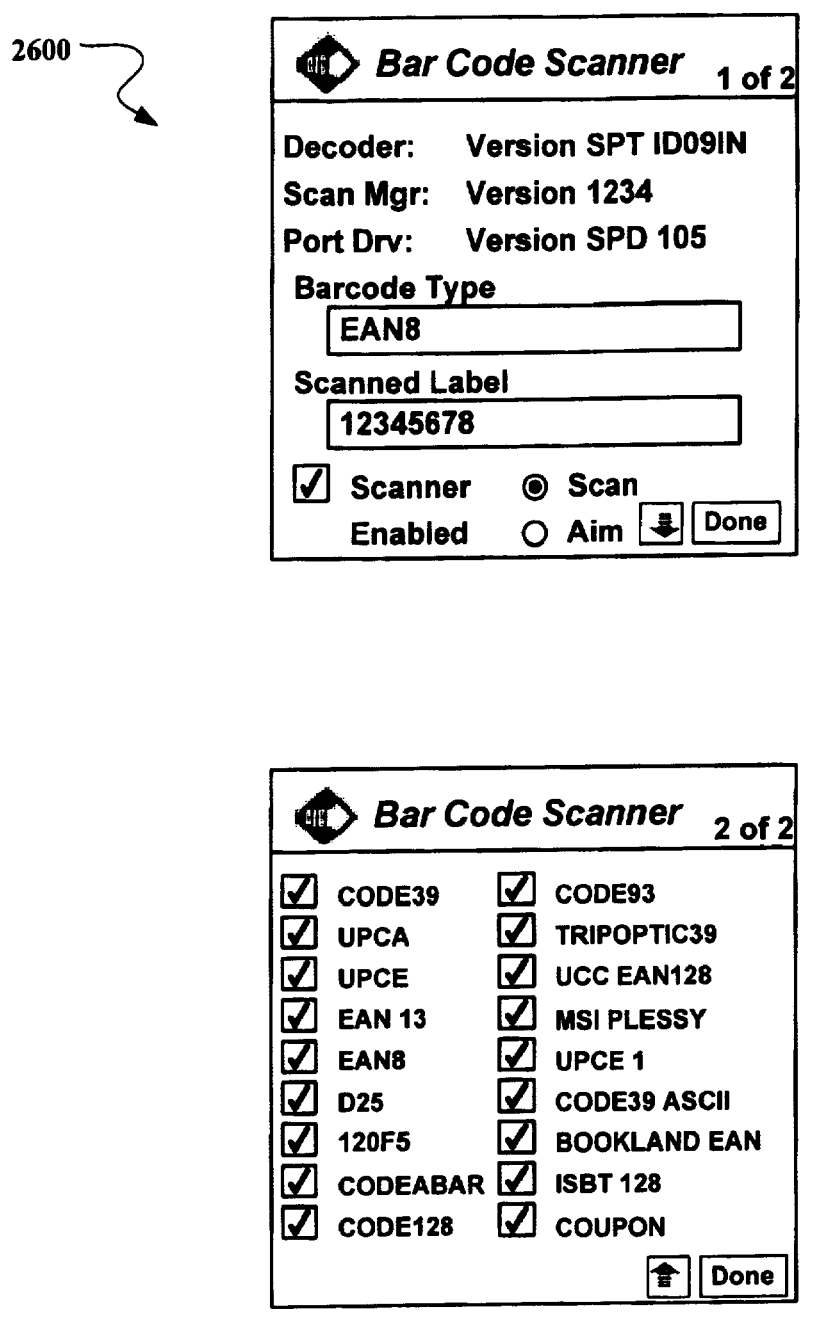

FIG. 31 shows an example of screens corresponding to the bar code scanner test 2306 of FIG. 28. The bar code scanner test verifies proper operation of the integrated scanner in the portable terminal, and the associated screens allow for the selection of bar code and label types.

Figure 32:
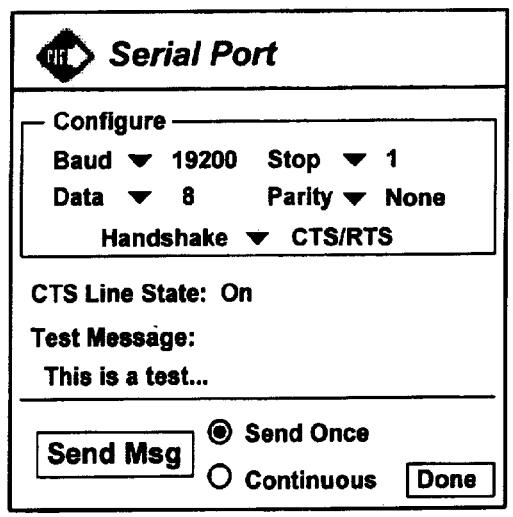
FIG. 32 shows an example of a screen corresponding to the serial port test of FIG. 28.

FIG. 32 shows an example of a screen 2700 corresponding to the serial port test module of FIG. 28. The serial port test is used to test the portable terminal's serial port by sending a test message. Test configuration and results are then displayed on screen 2700.

The digitizer alignment test is used to test the tracking of a stylus or comparable pointing device on the portable terminal display screen. To run this test, the pointing device is contacted in various places on the display screen and crosshairs appear under the pointing device. The crosshairs are then used to track the motion of the pointing device on the display screen.

The systems diagnostics test is an interactive test of all the terminal's system features. This test prompts the user to perform certain steps, which are verified via visual or audio indications and recorded in a systems diagnostic log.

Referring again to FIGS. 9A and 9B, a preferred embodiment of the present invention includes a bar code scanner such as conventional moving laser bar code scanner. Such a laser scanner includes a laser source and a motor device, which typically produces a large power surge if the laser source and motor device are simultaneously powered ON. Accordingly, the present invention also includes a method for minimizing power consumption of the power terminal by first powering the scanner motor and then the scanner laser source.

Figure 33:
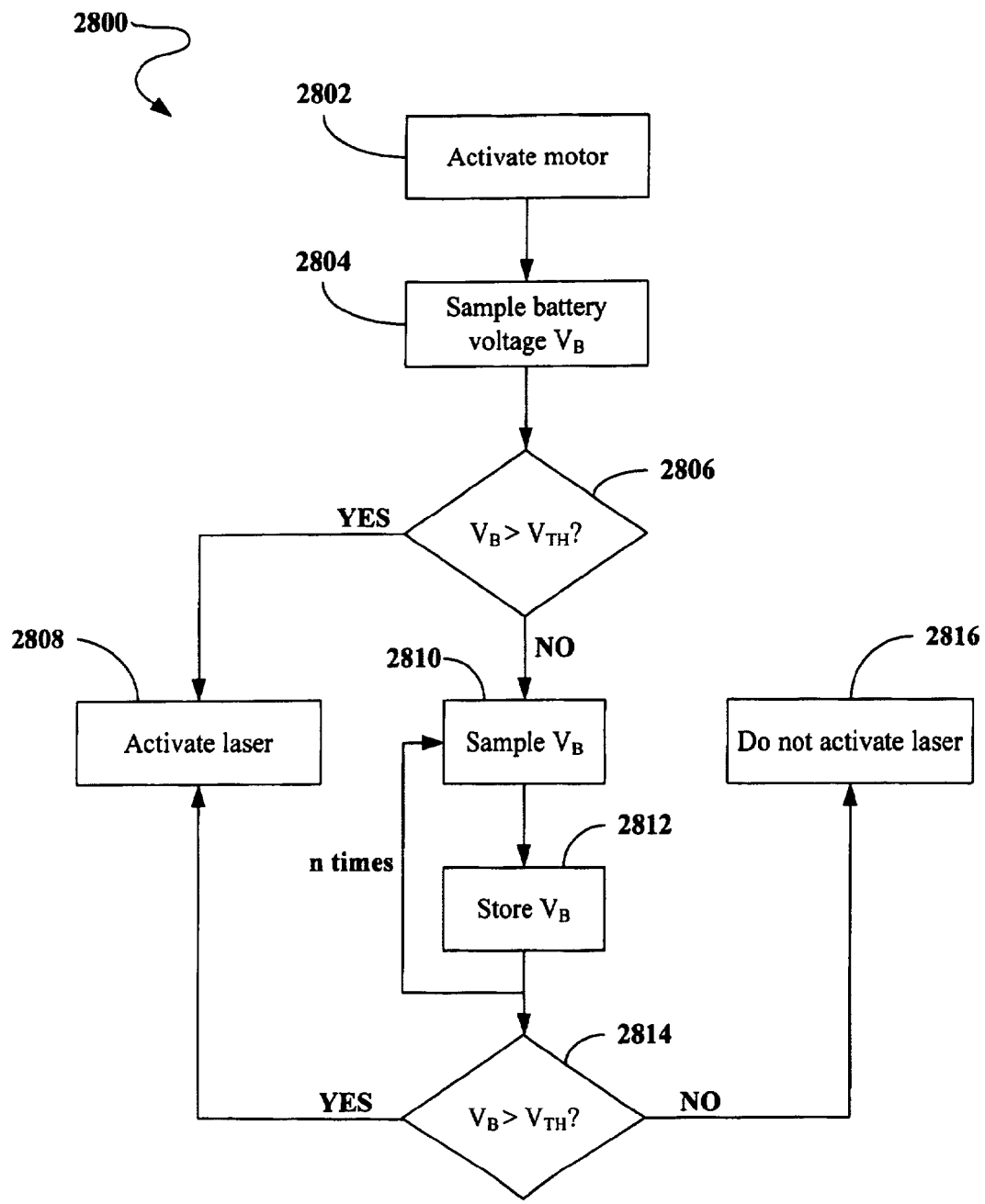
FIG. 33 shows a preferred method for powering on a bar scanner motor and corresponding laser source of a portable terminal.

FIG. 33 shows a preferred method for powering on a bar scanner motor and corresponding laser source of a portable terminal according to the present invention. The method includes the steps of: activating the bar scanner motor (Step 2802); sampling the battery voltage $V_B$ of the portable terminal (Step 2804); comparing the battery voltage $V_B$ to a threshold battery voltage $V_{TH}$ (Step 2806); and activating the laser source if the battery voltage exceeds the threshold battery voltage $V_{TH}$ (Step 2808). If the battery voltage $V_B$ equals or is less than the threshold battery voltage $V_{TH}$, the method further includes the steps of: sampling the battery voltage a plurality of times (Step 2810); storing readings corresponding to the plurality of sampling steps (Step 2812); determining whether a majority of the readings exceed the battery voltage threshold (Step 2814); and activating the laser source when a majority of the readings exceed the battery voltage threshold (Step 2816).

The above-described power management scheme may be critical in certain applications wherein data stored in the portable terminals would be difficult to reproduce. The above scheme thus ensures that the voltage is not drained to a point where the battery will no longer service the volatile memory addresses. Accordingly, prior to undertaking a procedure requiring relatively high battery usage, the battery voltage level can also be checked. The user is then notified of low battery power if the level is insufficient to complete the initialized action.

In addition, battery consumption is reduced by avoiding high current drain resulting from starting many components simultaneously. Then if a laser scanner such as the SE-900 is used, the motor for the mirror, LED and photodetector could be powered in a staggered manner, i.e., not simultaneously.

The terminal of the present invention further provides several other ergonomic advantages. For example, as shown in FIG. 10, keys 82 are provided at the top of the terminal in both the right and left sides of the terminal such that the terminal can be used by both left and right handed individuals. The keys 82 are also designed to activate by applying pressure to either the top or side of the keys. The translations are converted internally by guides and springs to active buttons notwithstanding the direction of the pressure applied.

In addition, the laser scanner is designed to release a visible light from the top of the terminal so that it is evident to the user what is being scanned by the terminal bar code reader. Upon use, the terminal rests comfortably in the hands of the consumer and both the screen and laser light coming out of the terminal should be clearly visible to the consumer upon undertaking a scanning action.

The laser scanner may also share a window with a IRDA port on the terminal thereby reducing component requirements. The combination of a housing including a touch sensitizing screen, a dedicated writing area with hand recognition and software buttons, hard buttons, and left/right bar code reading triggers with laser output away from and in the line of sight of the user extending forward from the hand holding. The terminal provides an improved economic and functional design which is intuitive in usage and feasible for extended usage in commercial environments.

In another aspect of the present invention, is it desirable to integrate the portable terminals of FIGS. 3A, 3B, 9A, 9B and 10A–10E into a seamless personal shopping system that can be used at the establishment location and from remote (i.e., home) locations via a telephone link or computer network such as the Internet.

Figure 34:
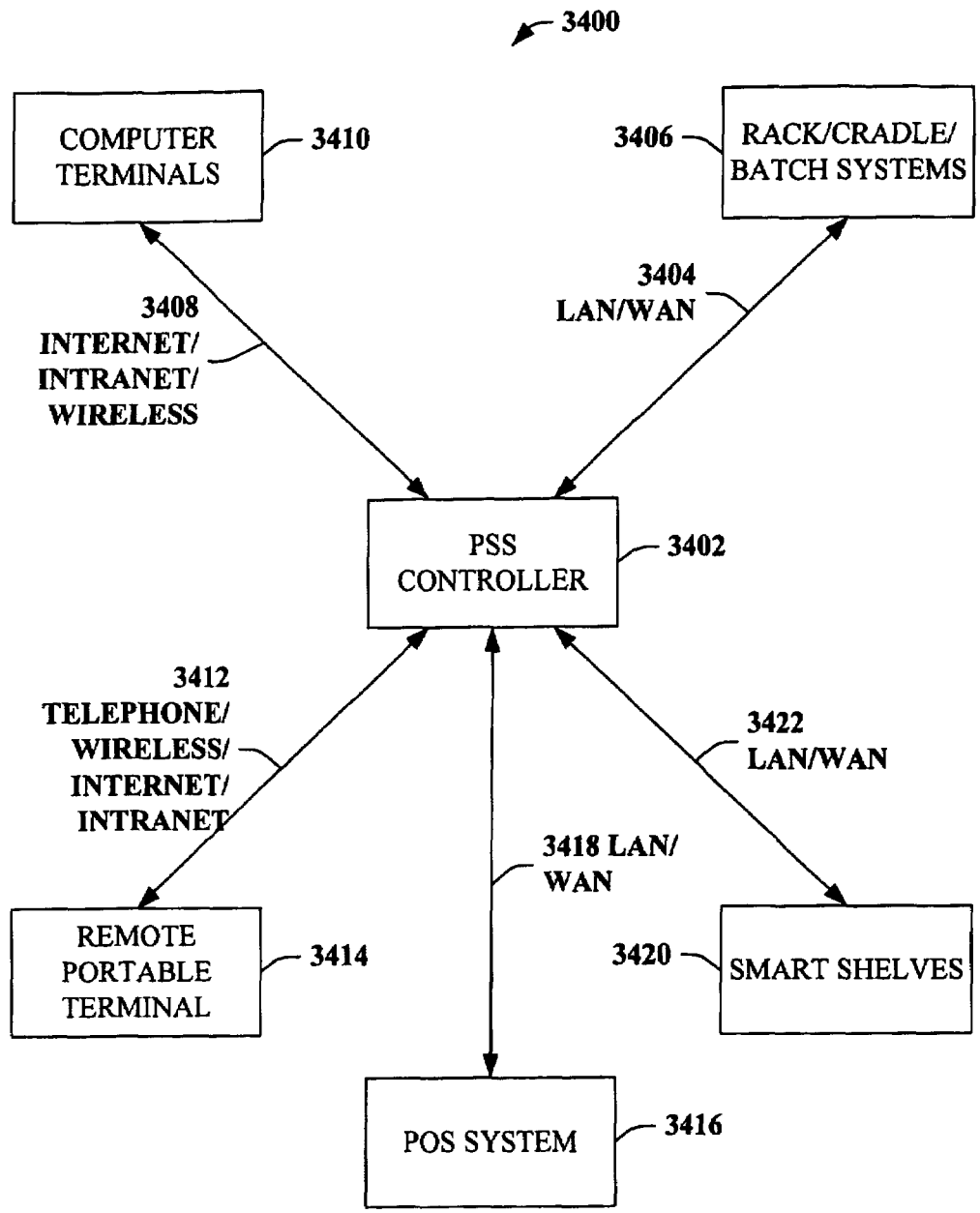
FIG. 34 is a hardware block diagram of a personal shopping system according to a preferred embodiment of the present invention.

FIG. 34 shows a hardware block diagram of a personal shopping system (PSS) 3400 for use at one or more shopping establishment and remote (e.g., home) locations. The PSS 3400 includes a PSS controller 3402, which can be any suitable computing platform such as Pentium™ class personal computer or generic server, located at a central location (e.g., shopping establishment) for executing PSS control software and communicating with one or more establishment and remotely located shopping terminals or subsystems. The computing platform, for example, can be a Pentium II™, 300 MHZ computer running Microsoft's Windows NT™ operating system having at least 256 MB of RAM, an 8 GB hard drive and appropriate network interface cards. As shown by the preferred embodiment of FIG. 34, the shopping subsystems can include, for example, batch portable terminals 3406 such as the stackable or cradle terminals discussed above; remotely located computer terminals 3414; portable remote terminals 3410 such as the radio or telephone-linked terminals described above; and a point-of-sale (POS) system 3416 having a POS controller and corresponding customer checkout terminals.

In accordance with the present invention, the batch portable terminals located in the shopping establishment can be used by customers to bar code scan the various items to be purchased, items that are later paid for at the customer checkout stations. Thus, there is normally no requirement for the items to be scanned by a cashier. An example of such as system is described in U.S. patent application Ser. No. 08/780,023, filed Dec. 20, 1996, which is assigned to Symbol Technologies, Inc., the assignee of the present invention, and hereby incorporated by reference. The portable shopping establishment terminals 3406 can be connected to the PSS controller via a hardwire or wireless LAN network, such as Symbol's Spectrum 24™ spread spectrum frequency hopping communications networks, or a WAN such as those employing a cellular digital packet data (CDPD) communication protocol, or a combination of both LAN and WAN systems. In the case of the cradle systems described above with reference to FIGS. 15–27, the cradle system can be a serial or Ethernet-based system wherein the host computer is the PSS controller.

Figure 35:
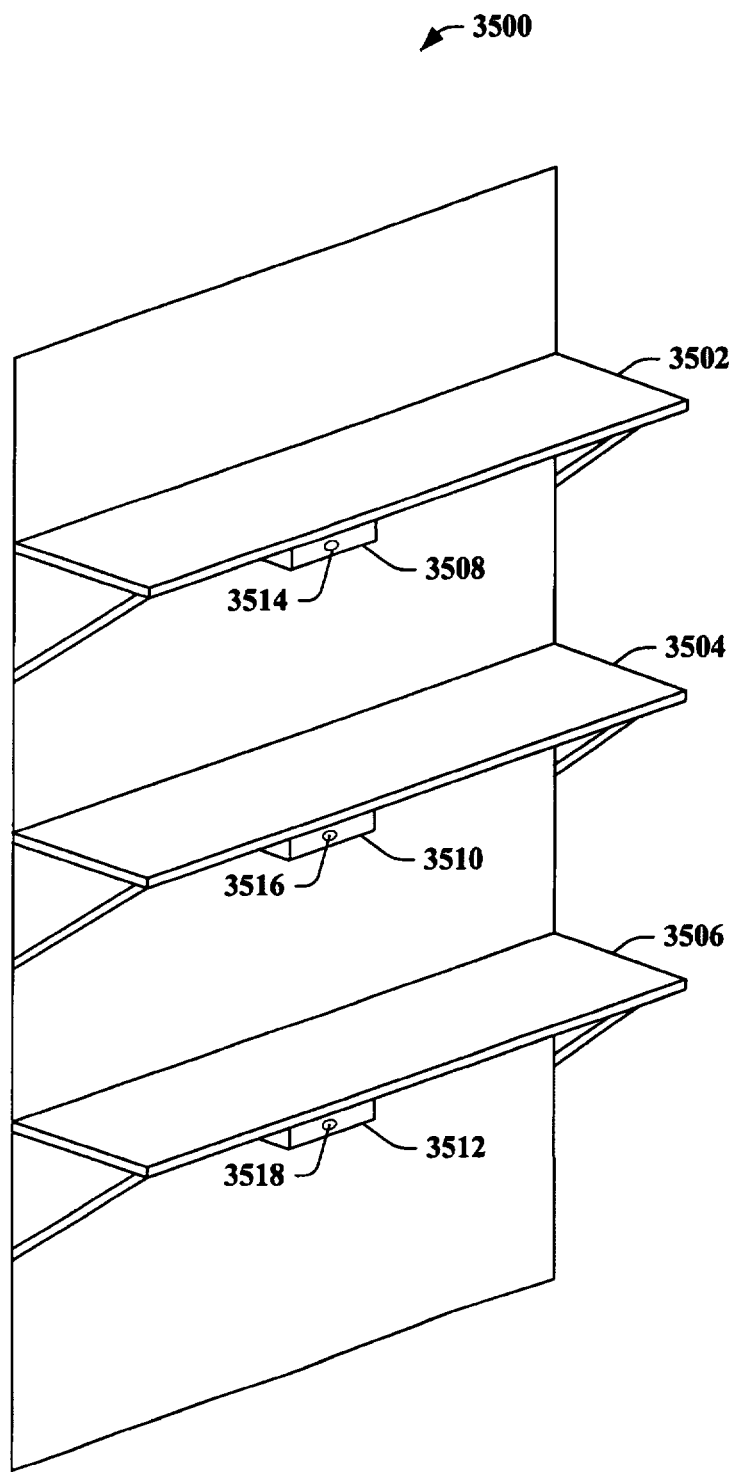
FIG. 35 is an illustration of a shelf assembly for use with the personal shopping system of FIG. 34.

As described with respect to FIG. 35, the so-called "smart" shelves are shelves, shelf sections, product areas or otherwise, 3502, 3504 and 3506, that are constructed and arranged with human proximity sensors 3508, 3510, and 3512 for sensing the presence or lack thereof of a shopper. By using proximity sensors, shoplifting can be reduced or at least deterred by creating the impression that the store is "smart" and that theft of the items on the shelf or product area is difficult if not impossible.

The proximity sensors 3508, 3510, and 3512, preferably the Q-PROX sensors available from Quantum, Inc., are coupled to the PSS controller 3402 of FIG. 34 and nominally configured to be "active". The sensors 3508, 3510, and 3512 are also coupled to corresponding "traffic" light indicators 3514, 3518 and 3516, which are used to indicate the proximity of the shopper. In a preferred embodiment, the "traffic" light indicators are normally green. When the corresponding sensor detects, for example, a hand removing a product from the shelf, the light changes to yellow, indicating that is waiting for the customer to scan the product. When the product is scanned, the scanner communicates with the shelf, via RF or otherwise through the PSS controller, set the indicator light to green. If the product is not scanned within a predetermined period of time, the yellow light times out and turns to red indicating a theft condition. The PSS controller, being notified of a theft condition, then activates an audio or visual alarm or camera as a response to the theft condition. Store employees returning un-scanned products, or shoppers not using a scanner, can use an issued "green light activator" to avoid the triggering of a theft condition.

Referring again to FIG. 34, the remotely located computer terminals 3410 can be any computing device, such as a personal computer or palmtop computing device having Internet capabilities. Preferably, the computer terminals 3410 include an Internet web browser and landline or wireless modems for communicating with the PSS controller via the Internet.

The remotely located portable terminals 3410 can be, for example, the portable systems described above with reference to FIGS. 3A and 3B connected to the PSS controller via a landline or wireless telephone network. Alternatively, the remotely located portable terminals 3410, which may for example be located at customer homes, can be telephone keypads for communicating with the PSS controller. Still another alternative uses a web server in communication with the terminals 3410 for downloading data via a WAN or other communications network to a POS controller.

Figure 36:
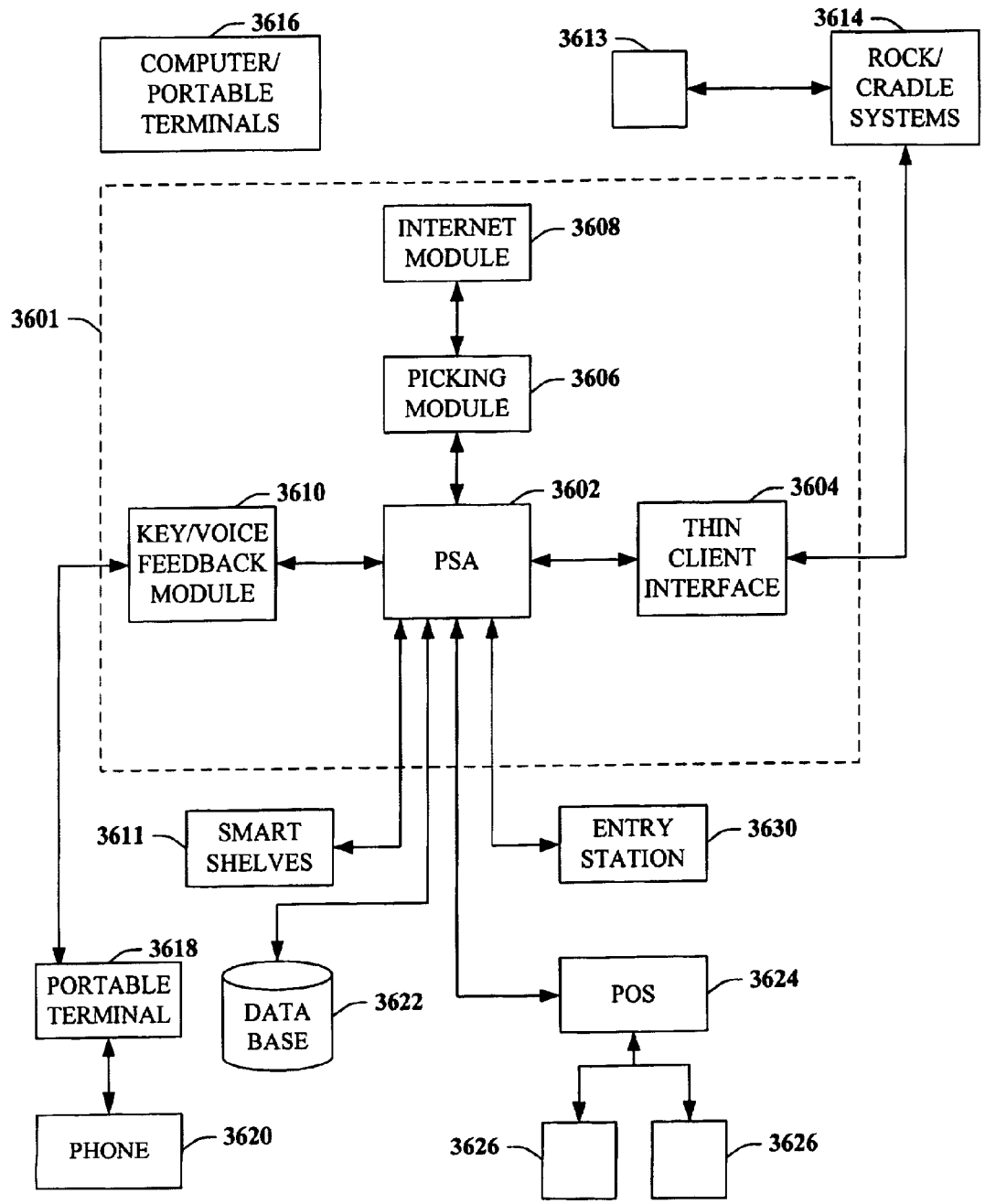
FIG. 36 is a system block diagram of a preferred embodiment of the personal shopping system of the present invention.

FIG. 36 shows a block diagram of a PSS 3600 in accordance with a preferred embodiment of the system of FIG. 34. The PSS 3600 includes: a PSS controller 3601; portable shopping terminals 3614 for use at a shopping establishment location; remotely located portable computing terminals 3616; "smart" shelves 3611, and a remotely located portable scanning device 3618 coupled via a telephone keypad 3620 to the PSS controller 3601. The PSS further includes a central database or price file 3622 coupled to the PSS controller for providing, receiving and storing pricing, product and consumer information through a communications network.

The preferred embodiment of the PSS shown in FIG. 36 can be used with any suitable "line" type or "batch" type portable hand held scanners having any suitable number of pushbutton or function keys. With a "line" type scanner, data is transferred by radio between the hand held scanner and the system controller while the scanner is being used by the customer. With a "batch" type scanner, data is transferred between the hand held scanner and the system controller only when the hand held scanner is in a rack or cradle device. While the hand held scanner is in use by a customer in the store, details for the customer's current transaction are stored on the hand held scanner, and are transferred to the system controller when the hand held scanner is returned to the rack. Preferably, the hand held scanners include a display having a plurality of lines, preferably at least 2 to 8 lines, and a plurality of characters, preferably at least 20-characters, for displaying messages to the customer, and a plurality of function keys, pushbuttons or icons, preferably at least 3 to 5, for performing scanning related functions.

FIG. 36 further shows blocks 3602, 3604, 3606, 3608 and 3610, which represent the software elements of the PSS controller. The controller software includes a personal shopping application (PSA) 3602, a thin client interface 3604 for communicating with portable shopping terminals for use within a retail establishment; a key/voice feedback interface 3610 for communicating with remotely located scanning devices and/or telephone keypad; an Internet interface 3608 coupled to the picking module 3606 for communicating with remotely located portable terminals over the Internet; and a "picking" module 3606 coupled to the PSA 3602 for receiving information over the Internet from the remotely located portable terminals 3616 and creating a formatted order or "shopping list" to be communicated to the PSA 3602. The "picking" module 3606 allows for in-store fulfillment of customer orders by store personnel.

Figure 37:
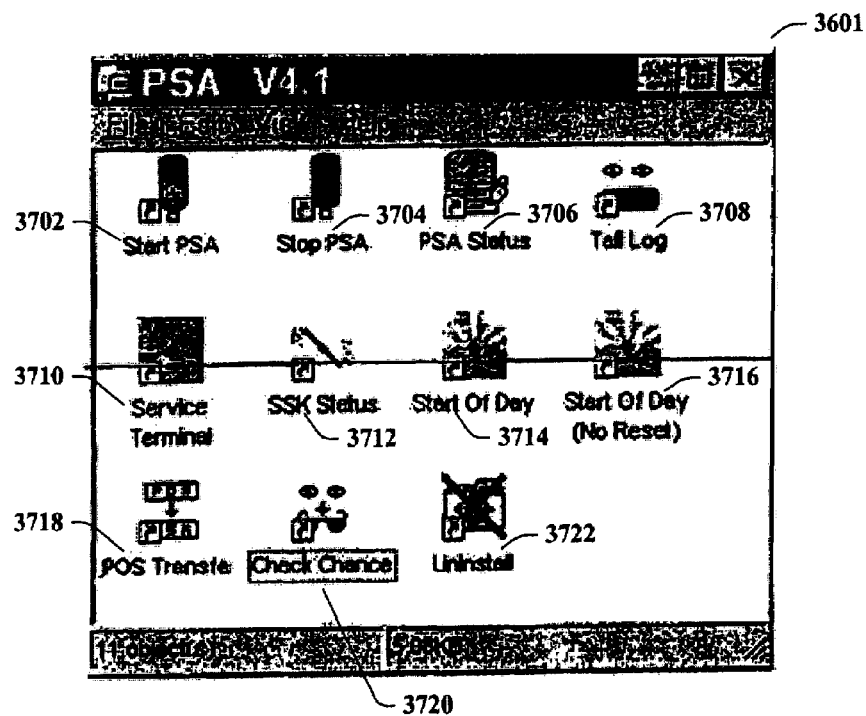
FIG. 37 is a graphical user interface for use with the personal shopping system of FIG. 36.

At the core of the PSS controller software is the PSA 3602. The PSA, which can be implemented to run using any suitable operating system such as Microsoft Windows NT™ or OS/2™, is a suite of computer programs that operates and controls the PSS system of FIG. 36. FIG. 37 shows, for example, a Windows NT implementation of the PSA software that includes: a Start PSA program 3702; a Stop PSA program 3704; a PSA Status program 3706; a Tail Log program 3708; a Service Terminal program 3710; an SSK Status program 3712; a Start of Day program 3714; a Start of Day (No Reset) program 3716; a POS Transfer program 3718; a Check Chance program 3720; and an Uninstall program 3722. Each computer program is described below in detail.

Start PSA 3702 is used to start/restart the PSA software for use with the PSS system. In a preferred embodiment of the Start PSA 3702 program, Start PSA 3702 can be configured to run Start of Day 3714 automatically upon completion of Start PSA 3702 so that transactions may be accepted again as soon as possible. Thus, Start of Day 3714 need not be run separately when running Start PSA 3702. However, if Start PSA 3702 is stopped while it is running, Start of Day 3714 must be executed manually before transactions can be accepted.

Stop PSA 3704 is used to stop operation of the PSS system so that no further transactions can take place. Any customers who have not yet completed a transaction will need to check out traditionally and have their purchases scanned by the cashier. Stop PSA 3704 is often used to stop the PSS system during the day when an error condition has occurred. Stopping the system via Stop PSA 3704 does not affect the store's normal POS systems. All transactions other than PSS transactions will continue as normal; any outstanding PSS transactions are simply treated as normal POS transactions. If Stop PSA 3704 is used to stop the PSA system while Start of Day 3714 is running, Start of Day 3714 must be reexecuted manually after the PSA system is restarted using Start PSA 3702.

PSA Status 3706 is used by PSS system support personnel to display that status of PSA-related tasks and PSS hardware. Similarly, Tail Log 3708 is used by support personnel to used to display the most recent messages recorded in a PSA log file.

Service Terminal 3710 allows the system operators to perform day-to-day maintenance tasks on the PSS system, including but not limited to adding and updating customer information, checking and managing the system hardware, viewing reports of system usage, and using diagnostics to assist in solving problems. Nominally, Service Terminal 3710 is started at the beginning of each store day and is the only program required for operation of the PSS system. The main menu for the Service Terminal program 3710, which is shown in FIG. 38, can be displayed all the time during operation of the PSS system so that need to start and restart the program is eliminated.

Figure 38:
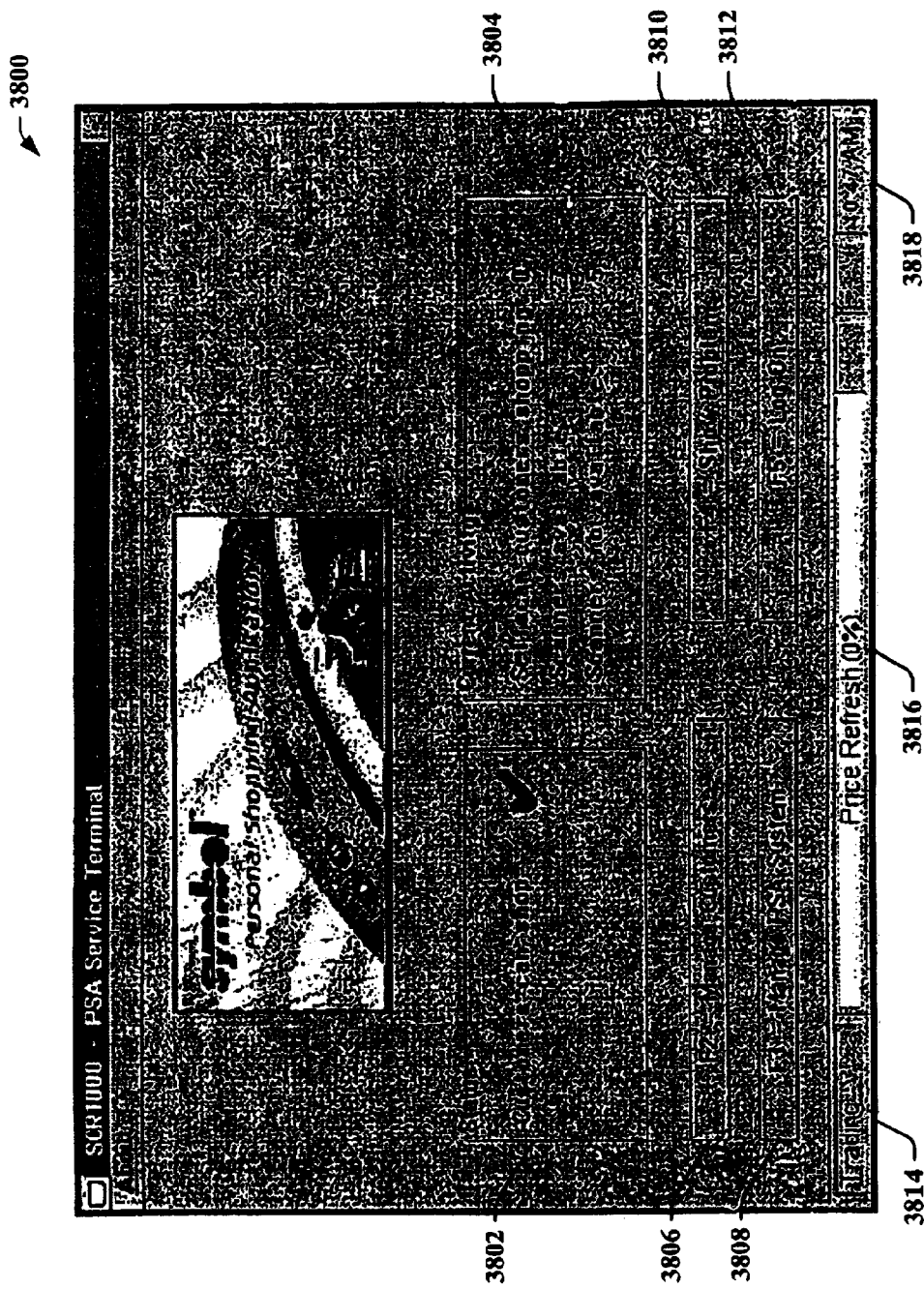
FIG. 38 is another graphical user interface for use with the personal shopping system of FIG. 36.

As shown in FIG. 38, the Service Terminal main menu 3800 is a graphical user interface (GUI) that includes a PSS status area 3802, a current activity status area 3804, and menu option areas 3806, 3808 and 3810. The PSS status area 3802 displays messages indicating whether or not the system is currently allowing customers to shop, and whether or not there is a problem with the PSS system for managing the system and diagnosing problems. The current activity status area 3804 displays the number of PSS customers currently shopping, the number of portable terminals (hand held scanners) that are available for issue to customers, and the number of portable terminals (hand held scanners) that are not available for issue to customers. Portable terminals may be unavailable to customers because of low battery levels, because they have been marked as defective, or because they are being processed by the system.

The main menu 3800 further includes status bars 3814 and 3816 for displaying the trading status of the store and the status of any ongoing update operations, respectively. The trading status bar 3814 is located along the bottom left-hand corner of the menu, and is used to display messages indicating the trading status of the store: Trading (customers can use the system); Not Trading (between End of Day and Start of Day; customers cannot use the system); and Shutdown (the system has been stopped). The update status bar 3816, located next to the trading status bar 3814, is used to display messages indicating the status of an ongoing update operation: Start of Day (Start of Day processing is in progress), End of Day (End of Day processing is in progress), Price Refresh (POS Transfer processing is in progress), Price Update (one or more item prices have changed, and the price updates are waiting to be loaded into the hand held scanners), and No update in progress. The first three of these update messages include a progress indicator, showing the progress of the operation as a percentage (based on the average time taken by the system to complete processing for that operation). The Price Update message does not include a progress indicator, but instead includes the time at which the portable terminals (hand held scanners) will be updated.

Menu option 3806, "Manage Customers," is used to access and maintain customer information. Customer information may include, by way of example and not limitation, "self-scan" data including check results and a history of "self-scan" transactions, shopping status and other customer details. Via the menu option 3806, a system administrator can, for example, suspend, release, delete or add a customer, disable a customer scanner, or reprint a customer's transaction ticket.

Menu option 3808, "Manage PSA System," is used for operating and maintaining the hardware and software components of the PSS system, and to provide statistical and diagnostic data about the system. Via menu option 3808, an operator can for example select PSA Status, Start of Day, Start of Day (No Reset), POS Transfer, Reports, Maintenance and Diagnostics functions. Reports can be generated showing, for example, daily, weekly and annual turnover rates, and scanner statistics. Maintenance functions include locking, unlocking, disabling and releasing scanners, enabling and disabling rack or cradle systems, and testing printers and message lights. Diagnostic functions include viewing log files and monitoring system components.

Menu option 3810, "Show Problems," is used to provide detail information regarding specific system problems or errors.

In addition, some of the tasks performed using the Service Terminal program involve using the customer's shopper card to obtain access to stored customer data. The card contains computer-readable data, for example a magnetic stripe or bar code, that identifies the customer. Thus, the Service Terminal 3710 program is capable of prompting a customer to read-in his or her shopper card using the appropriate the card reader attached to the system controller. The program also allows a system operator to type in the card number instead of reading the card.

Referring again to FIG. 37, the SSK Status program 3712 is provided for use by support personnel, and is primarily used to display the status of communications between the system controller and the rack or cradle systems.

Start of Day 3714 prepares the system to accept a day's transactions. It must be run at the start of each store day, and as such is preferably run automatically. The program is accessible via the Service Terminal program described above. Start of Day (no reset) 3716 is similar to program 3714 except that is performs Start of Day processing without attempting to set up and reload the portable terminal (hand held scanner) data files. Thus, the time required to complete Start of Day processing is much less. It is typically used in place of Start of Day 3714 when the system is not be using by customers, but instead the system is being used for maintenance or testing purposes during overnight hours or during days when the store is closed to customers.

The POS Transfer program 3718 transfers price data files from one or more POS systems to the PSS system controller, and updates the database 3622 to include the new data. This ensures that the PSA software is aware of any price changes made at the POS systems during the day, or any items added or deleted.

The Check Chance program 3720 allows a system operator to disable checking on transactions so as to speed up checkout processing during busy periods.

The Uninstall program 3722 is provided for use by support personnel and is used to remove the PSApplication software from the PSS controller computing platform.

Figure 39:
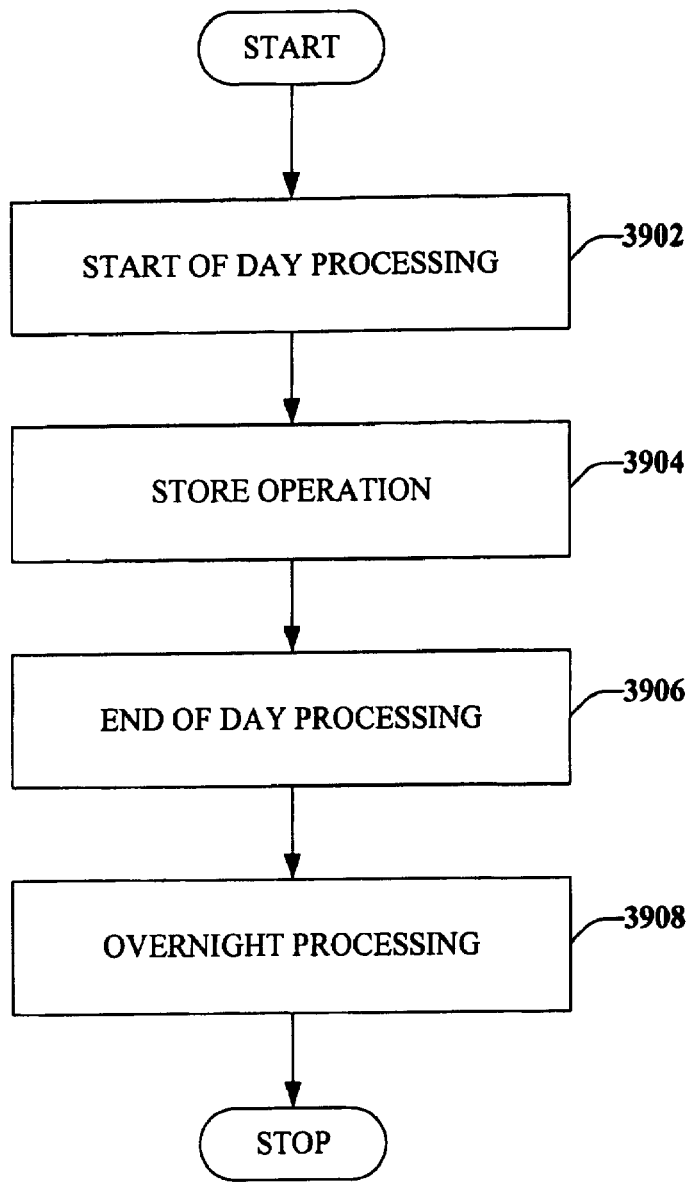
FIG. 39 is a flow diagram showing the processing steps performed by the personal shopping system of FIG. 36.

As shown in FIG. 39, the PSA program allows an establishment shopping system to perform the following tasks: "Start of Day" processing (Step 3902); store processing (Step 3904); "End of Day" processing (Step 3906); and overnight processing (Step 3908).

"Start of Day" processing, which is normally run by store staff using the Service Terminal program, prepares the system to accept the day's transactions. This task is normally run as soon as possible after staff first arrives in the store, to get the system in operation before the store opens to customers. Start of Day processing includes: creating updated versions of pricing data files to be stored in corresponding "batch" portable terminals; replacing the previous day's pricing data files; deleting updates files containing the previous day's price changes; loading program files; loading the updated pricing data files in the batch portable terminals; for batch scanners; restarting PSS system tasks. "Batch" portable terminals are understood to be those rack or cradle terminals described above. Nominally, customers cannot obtain portable terminals until the Start of Day processing has ended.

"Store Operation" (Step 3904) tasks include: processing price changes; processing customer data; suspending and releasing customers; managing the PSS system hardware; replacing the portable terminals from the terminal return racks; viewing reports on system usage; using diagnostics; managing transaction checking; and using the PSS system's "scanahead" feature.

Price changes occurring during the day are normally made at the POS system. The PSA processes these changes differently for batch scanners and radio scanners, as described below.

For "batch" scanners, the PSA processes price changes by doing the following: checking periodically for price changes; creating new data files with details of the changes to be loaded into the portable terminals; and updating the portable terminals with the new data files. If a portable terminal is removed from the rack when the file update occurs, or is issued to a customer while the file update is in progress but before this portable terminal has been updated, the item prices and totals shown at the portable terminal may not match those stored in the POS system. Therefore, when the transaction is processed at the checkout, the prices stored in the POS system will be used to recalculate the total. This may result in a difference between the prices displayed at the portable terminal and charged at the checkout. The portable terminal will be updated with the new information after it is returned to the rack, and before it is issued to another customer.

Price changes are written from the POS system to the controller's main file containing the complete pricing data. However, to speed up the process of loading the new data into the portable terminals, the system does not load the complete file into the portable terminals. Instead, it writes to a separate file containing only the item records that changed during the day; this file is then copied to each portable terminal in addition to the main file. During the next Start of Day processing, a new complete price data file is created, and the file containing price changes data is deleted. The new complete file is then loaded into the portable terminals, to ensure the portable terminals contain up-to-date information ready for the next day.

The PSA processes price changes for radio scanners by performing the following steps: checking periodically for changes; and updating the system controller with the new pricing data. This means that the prices stored on the system controller are kept up-to-date. If the customer has already scanned an item before its price changes, the original price continues to be used for the customer's current transaction; this ensures that, if the customer scans more than one of the same item in a transaction, the same price is shown on the portable terminal for all of these items. When the transaction is processed at the checkout, the prices stored in the POS system will be used to recalculate the total. This may result in a difference between the prices displayed by the portable terminal and charged at the checkout.

Customer information stored and updated by the PSS system includes: a customer's shopper card number; the customer's name and address; text used to address the customer by name in "greeting" messages, such as "Mr. Smith", the customer's preferred language (if the system is configured to support multiple languages); and the customer's preferred currency (if the system is configured to support multiple currencies). Customer information may be pre-loaded from an existing store loyalty system or other information system.

Next, a customer's shopper card may have to be blocked or suspended from the PSS, for example, if the customer is misusing the system or if the card has been lost or stolen. A customer's shopper card can be suspended via the Service Terminal program to suspend the customer, and released at a later time so that the customer can resume using the system.

While the PSS system is being used, system hardware may have to be maintained or replaced. For example, certain portable terminals or racks may have to be removed from service for cleaning, repair, or to identify defective portable terminals. The operation of system components may have to be tested, and action taken if any of the components are not operating correctly. The system allows an operator to: unlock all or a specified portable terminal so that it can be removed for cleaning or repair; disable a complete rack so that no portable terminals are issued from the rack; re-enable a disabled rack so that portable terminals can be issued from it; reset all portable terminals in a rack or in a specific column of a rack; disable a portable terminal (mark it as "out of service") so that it will not be issued to any other customer rest of the day; test the operation of the message lights and transaction ticket printers on racks and the card readers on Entry Stations; change the allocation of racks to specific Entry Stations, etc.

Depending on the layout of the store, there may be one or more racks located at the far end of the store (on the way to the checkouts), known as "remote return racks". These racks are used only by customers returning portable terminals after shopping so that they do not need to return to the store entrance to return their portable terminals; they are used to issue portable terminals. The PSS system allows an operator to periodically process, collect and replace returned portable terminals to corresponding racks at the store entrance so that they can be issued to subsequent customers.

Details of system usage for a previous day in the store, or information regarding sales during a previous day, week, or year can be accessed and printed in report form when required.

The PSS system further includes diagnostics facilities for providing system information to support personnel. The system allows an operator to: view a log file that records normal system operations, warning messages, and error messages generated by system components during processing; view detailed information about the cause of a specific message and any recommended action; view a summary of any problems previously detected in racks or portable terminals; view the most recent error message with detailed cause and action information; view the status of racks and portable terminals, and if necessary, disable a portable terminal or release it so that it can be removed from the rack; view the status of system components; and view the status of the internal software components of the system.

In normal operation, the system periodically specifies that a customer's transaction must be checked in order to ensure that the system is being used accurately. The system associates a value known as a "checkchance" with each customer, which defines the probability of that customer's transactions being checked. The checkchance varies with the number of factors, including but not limited to the number times that the customer has used the system, the accuracy of his or her previous checked transactions, and store parameters. Store parameters can include, for example, the time of day, the season, the number of customers in a checkout line, and the geographic location of the store.

At times when there are large numbers of customers using the system, checking a large transaction may mean that other customers are kept waiting for an unacceptable time. To speed up checkout processing at busy times, checking can be disabled for a period of time. Because the decision to check a customer's transaction is made when the portable terminal is returned to the rack, customers currently waiting at checkouts may still be checked; however, any customers who returns a portable terminal to the rack while checking is disabled will go through without checking.

During peak shopping periods, when there are large numbers of customers in the store who are not using the PSS system, customers may be kept waiting at checkouts for a long period. The "scanahead" feature, which is available only with radio scanners, is an extension of the PSS system that allows store staff to speed up checkout processing for waiting customers. With this feature, store staff can use a portable terminal to scan a customer's purchases while the customer is waiting to check out. At the checkout, the customer's transaction is then processed in the same way as for an unchecked PSS transaction since the checking has already been done by the store staff.

"End of Day" processing (Step 3906) is performed when the store closes at the end of the day. Normally, End of Day processing is triggered automatically according to a set time corresponding to the closing of the store. When End of Day processing begins, the Entry Station display shows a message indicating that the system is unavailable; this message remains on the display until Start of Day processing has been completed (usually the in the morning). End of Day processing includes: generating reports for the day's processing; deleting the oldest stored report of each type; generating the weekly (if end of week) or annual sales (if end of year) reports; deleting any outstanding PSS transactions on the system (where the customer obtained a portable terminal but did not use the transaction ticket at the checkout); and clearing the internal files that hold records of the day's transactions.

End of Day processing also includes transferring the price data file from the POS system to the PSS controller and updating the PSA's database to include the new data. This ensures that the PSA software is aware of any price changes made on the POS system, or any items added or deleted.

"Overnight" processing (Step 3908) is performed in stores open to customers 24 hours a day. In a 24-hour store, Start of Day processing is always performed automatically by the system. There is no need to run Start of Day manually, except when restarting the system after it was stopped during Start of Day processing.

Referring once again to FIG. 36, the picking module 3606 allows a customer to remotely generate a shopping list that is tendered using the PSS system Preferably, tendering is performed using the standard function of PSA interfaced to a POS system.

Figure 40:
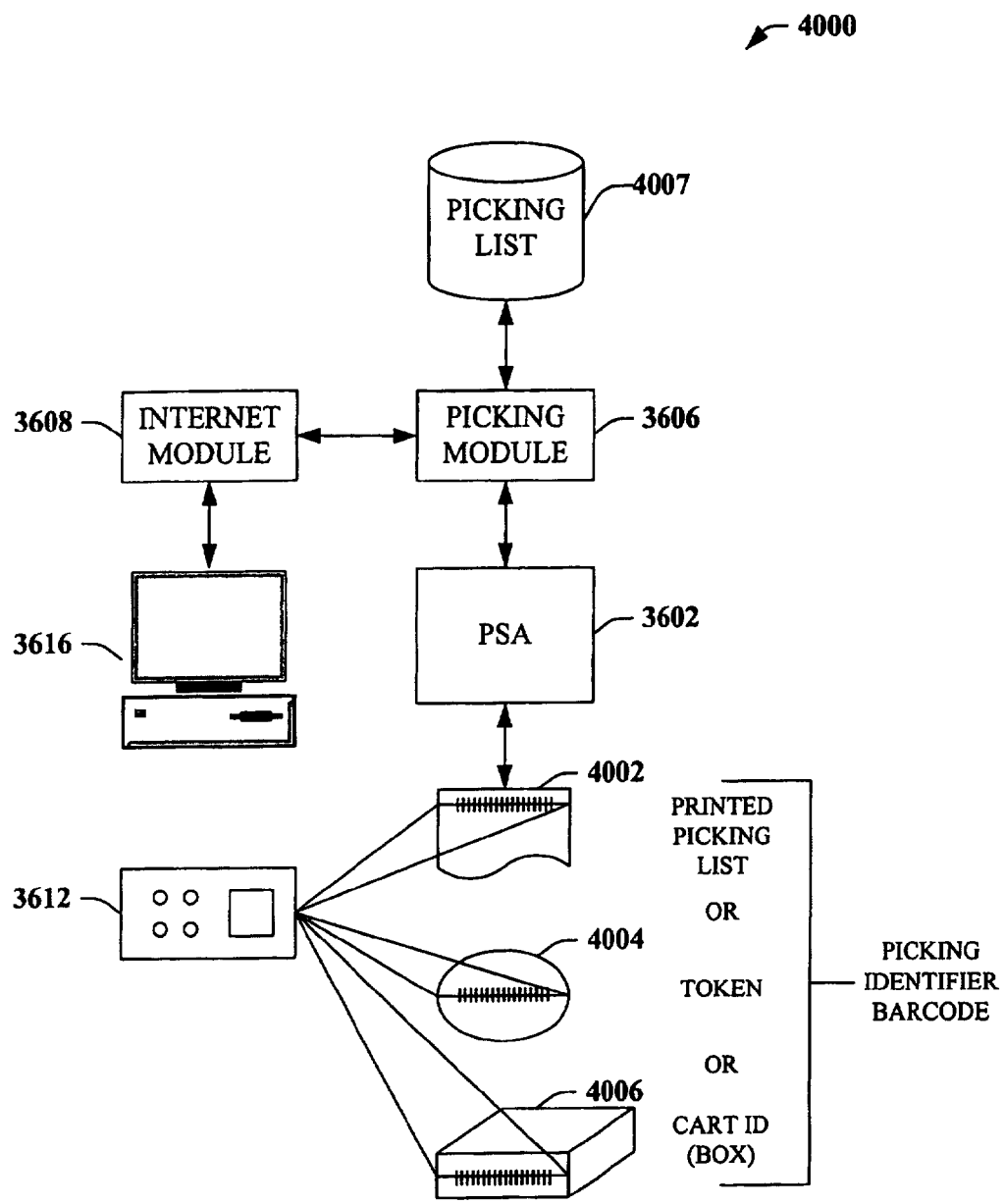
FIG. 40 is a diagram showing the operation of the picking module shown in FIG. 36.
Figure 41:
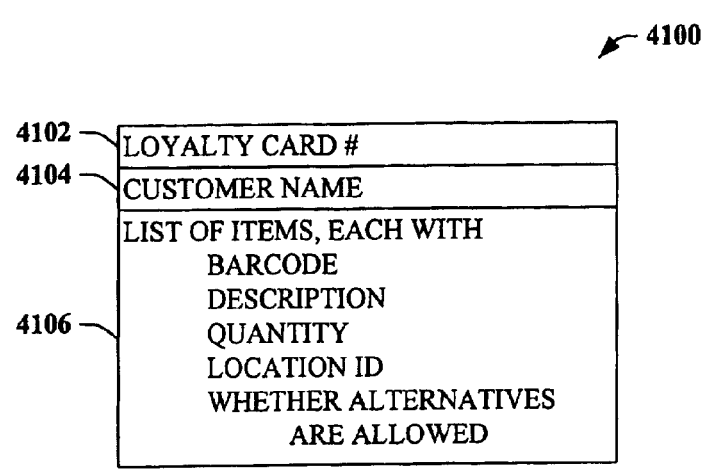
FIG. 41 is an example of a picking list for use with the personal shopping system of FIG. 36.

FIG. 40 illustrates the operation of the "picking" feature of the PSS. A customer generates a shopping list, via a web site or e-mail, from a home terminal 3616 having access to the Internet. The list is forwarded via an Internet interface module 3608 to a picking module 3606, which in turn generates a "picking list" 4002 corresponding to the items identified in the shopping list. An example of a picking list is shown in FIG. 41. Preferably, the picking list includes a loyalty or member card number 4102, a customer name 4104 and a list 4106 of items to be purchased. For each of the items to be purchased, the list 4106 preferably includes a barcode, a description of the item, an order quantity, a location identifier and whether alternatives or substitutes are allowed for the that item. The location identifier specifies where the item is located within the store relative to other items.

The picking module 3606 then assigns a picking list ID barcode to the picking list, which is in turn passed to the PSA system. For multiple picking lists, corresponding ID barcodes are assigned and the lists are sorted in a picking sequence. Each picking list ID barcode is then printed on paper 4002 or a plastic token 4004, cart or box 4006 as shown in FIG. 40.

Next, a "picker" scans the picking list ID barcode using a portable terminal (hand-held scanner). The picking module 3606 further assigns a "basket" number, nominally up to four, which allows the picker to pick up to four customer orders simultaneously by scanning the corresponding number of picking list ID barcodes. Thus, as shown in FIG. 42A, for each picking list ID barcode the picker is asked by the portable terminal to verify the correct basket number. After scanning up to 4 picking list identifiers, the picker is prompted by the portable terminal to scan the first item. If there are multiple picking lists, the picker is also provided a "basket" number for identifying which items correspond to the individual picking lists. The order in which the items are displayed ensures the optimum path through store for the picker.

In a preferred embodiment of the present invention, a description of each item to be scanned is displayed as shown in FIG. 42B on the front face of hand-held scanner. Using the hand-held scanner, the picker selects the items to be purchased by scanning the displayed item and depressing the "+" and "−" keys to add or subtract the displayed item to or from the corresponding basket. The picker can check a running or total purchase amount for a corresponding basket by depressing the "=" key on the hand-held scanner. The "Basket" option is used to select a different basket and display the next item to be scanned in that basket. If alternate products are identified in the picking list, the "Alternate" option allows the picker to scan an item as an alternate.

While scanning the selected items, if an item is scanned having an order quantity greater than 1, the scanner displays the following message: "Have all n items been placed in the basket?" This feature allows the picker, for example, to scan a single item, but put multiple ones of the same item in a basket without having to scan each item individually. Thus if ten cans of soup are required, the picker need only scan a single can.

Figure 42C:
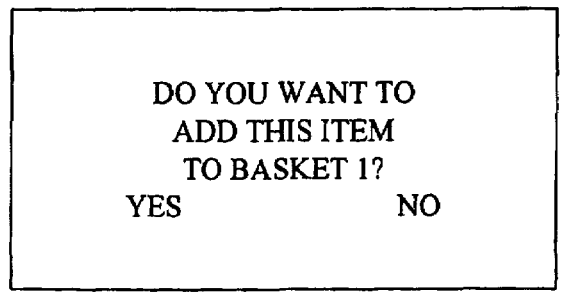

If the picker scans an item that is not in any basket list, the message shown in FIG. 42C is displayed asking the picker whether or not the item should be added to the active basket. In the example of FIG. 42C, basket 1 is active and thus the picker is asked whether or not to add the scanned item to basket 1.

Figure 42D:
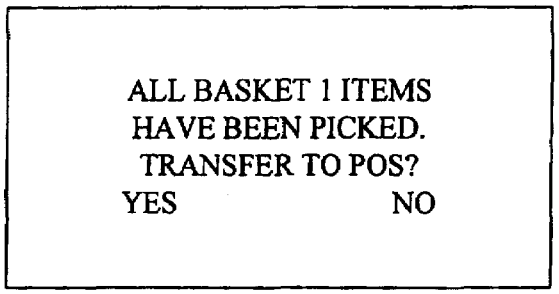
Figure 42E:
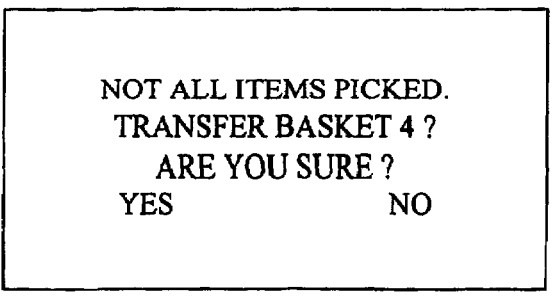

When all items in selected basket have been scanned, the picker is prompted with the message shown in FIG. 42D. If all basket items have been picked, the picker terminates the picking activity for the indicated basket by transferring to a POS system. If the picking activity is incomplete for any other baskets, for example basket 4, then the picker is notified as showing in FIG. 42E and given the option to transfer the incomplete basket to the POS system.

Figure 43:
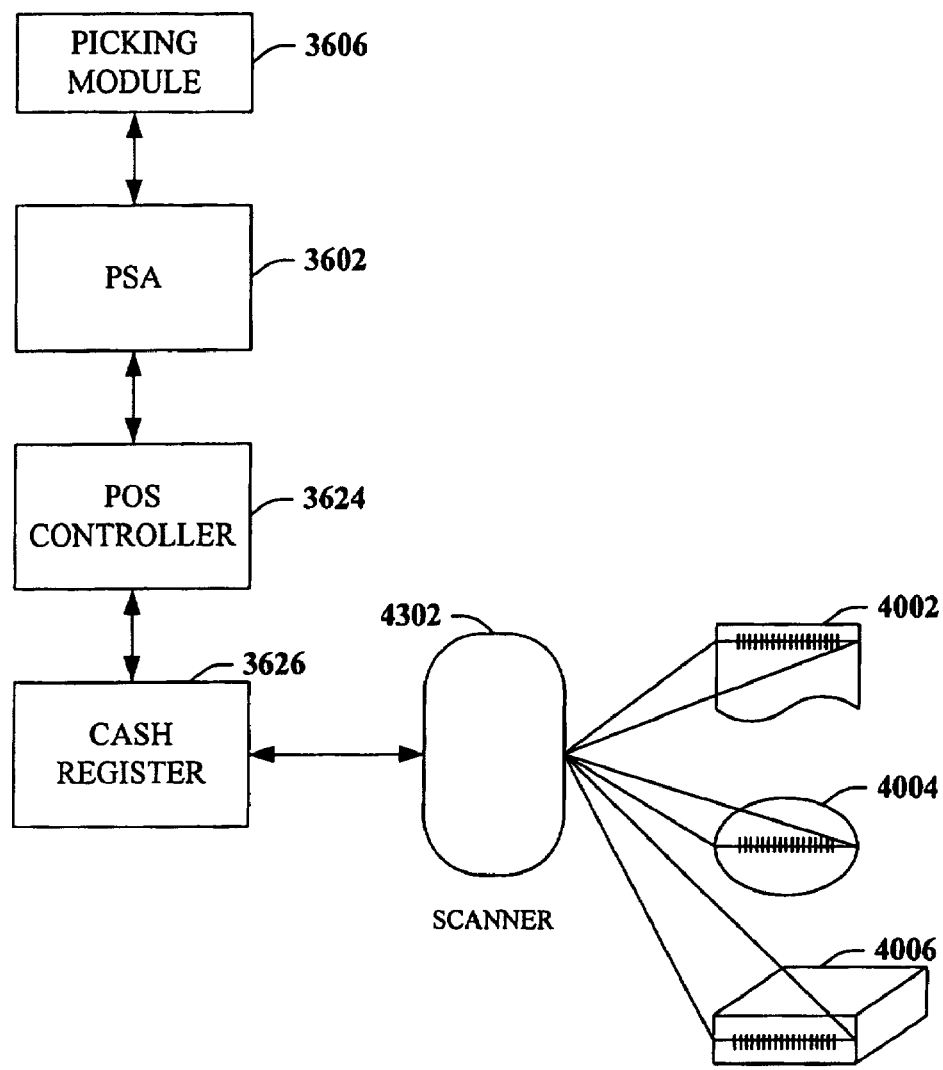
FIG. 43 is a diagram showing the checkout processing step of the picking module shown in FIG. 36.

FIG. 43 depicts the checkout processing feature of the picking module. After the picker has finished picking the items, the picker returns the scanner and proceeds to a checkout station or register. A cashier at the checkout station scans the picking list ID barcode, which is either on paper, token or on a cart/box, which brings up the transaction at the checkout station.

Referring again to FIG. 36, the thin client interface 3604 allows for data processing and computing functionality to be implemented on the PSA or server side of the PSS. Graphics and display functionality is implemented at the handheld or remote portable units. As shown by way of example and not limitation, the thin client interface 3604 applies to batch rack systems 3614 and portable terminals 3613 as described above with reference to FIG. 36.

The keypad/voice interface 3610 allows the data exchange of data originating at a remotely located portable terminal 3414 over a telephone line using DTMF communication. The keypad/voice interface 3610 further allows for the access of a voice response system that confirms a user's order communicated over the telephone via the remotely located portable terminal 3414.

Figure 44:
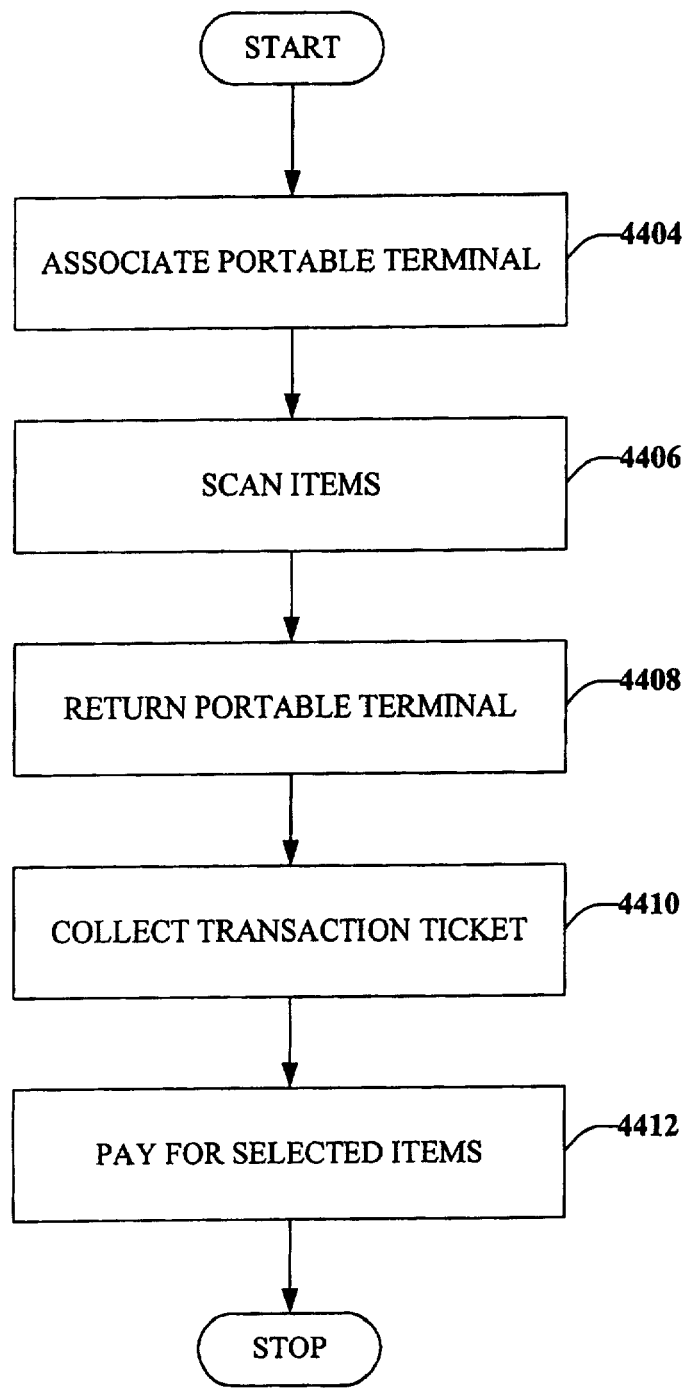
FIG. 44 is a flow diagram of a method of shopping using the personal shopping system of FIG. 36.

FIG. 44 shows a method for shopping at a retail establishment using the PSS system of FIG. 36. The method includes the steps of: associating a portable shopping terminal with a corresponding in-store communications network (Step 4404); scanning one or more items to be purchased (Step 4406); returning the portable shopping terminal to the terminal receptacle (Step 4408); collecting a receipt corresponding to the scanned items (Step 4410); and purchasing the scanned items at a customer check-out station (Step 4412). With respect to the present method, the associating step can be performed by having the customer check-in at a customer entry station and obtain an authorized terminal from a terminal receptacle. For example, the customer can check-in using a preferred customer or other customer identification card and a corresponding card reader. Alternatively, the customer can simply use a terminal that "freely associates" with the in-store communications network as described above.

According to the preferred method of FIG. 44, a customer upon entry into a retail establishment proceeds to a customer check-in station whereat the customer is prompted to provide customer identification, which is preferably in the form of a shopper, club member, loyalty or preferred customer card. The customer checks in to use the PSS system by inserting his or her shopper card into the card reader in the Entry Station (Step 4402). In locations where more than one language is spoken, the PSS system can be set up to display messages in different languages according to each customer's preference; the information stored for each customer includes his or her preferred language. Initial "welcome" and "please wait" messages, which are displayed before the customer has been identified, can be set up to include more than one language in the same message, for example "Welcome/Bienvenue/Wilkommen." After the customer's card has been read successfully, the system then displays all messages in the preferred language for that customer on the entry station, the portable terminal and transaction ticket if one is made available at the entry station.

Further, in European countries where the Euro is used in addition to the local currency, the system can convert any currency amount to and from the corresponding Euro amount, and store information regarding a customer's preferred currency. In this case, all totals can be converted and/or amounts in messages displayed using the preferred currency with the appropriate currency symbol (except for messages on 2-line scanners which do not display the currency symbol). In locations where the Euro is not used, or where the system is not set up to provide this option, all messages are displayed in the standard currency used by the store. Currency conversion and preference selection can be made available through any of the above-described portable terminals for use at the shopping establishment or from a remote location over the Internet, telephone or other communications network.

When the system has successfully processed the card data, it then displays another message greeting the customer by name, and identifying the location from which the customer can obtain a hand held scanner (Step 4404). Depending on how the system is configured, this message shows the location in one of two ways: by identifying the rack (A, B, . . . ) and the column within this rack (1, 2, 3, or 4) where the hand held scanner is located, or by identifying only the column number (1, 2, 3, . . . ), which uniquely identifies a particular column within the store. The rack letter (if used) is shown on the front of each rack, and the column number is shown on the front of each column. The customer locates the hand held scanner (identified by a flashing red LED), and removes it from the rack. The hand held scanner can either be held in the hand, or placed in the holder provided for it on the customer's shopping cart.

If the system cannot issue a hand held scanner to this customer, the message display requests the customer to go to the Customer Service desk for assistance. This may happen for any of the following reasons: the customer has used the wrong card, or has inserted it incorrectly; the customer's card is damaged; the customer is not authorized to use the system; the customer's previous transaction was not completed correctly; the customer is already using a hand held scanner.

As described earlier, the displayed message is normally in the customer's preferred language (if the system has successfully read the card and the system has been set up to include this customer as a PSS customer). In situations where the system cannot read the card, or where the customer is not a PSS customer, the same message is used for all customers.

When checking-in, the PSS system can be further configured such that the portable terminal displays marketing information to the customer, such as details of new products or special offers. In the case of a 4-line scanner, for example, up to four lines of marketing text are displayed when the customer first takes the portable terminal from the receptacle. If there are more than four lines of text, the customer can press "=" button on the hand held scanner to display the next four lines, and continue pressing this button to scroll through the text four lines at a time. After displaying the last line of the text, pressing the "=" button again returns to the start of the text and continues to scroll through the text. Marketing text is displayed only until the customer first presses the "+" or "−" button (the use of these buttons is described later in this section). After this, the "=" button reverts to its normal function of displaying totals for the current transaction. If the system uses 2-line scanners, or is not configured to display marketing information, the display on the hand held scanner shows the totals for the current transaction (which will initially be zero). The customer is now ready to scan the items to be purchased (Step 4406).

As each items to be purchased is selected, the customer locates the bar code on the item, presses the "+" button on the hand held scanner to activate the reader, and then points the hand held scanner so that the red beam is directed across the bar code. When the hand held scanner has successfully read the bar code, it indicates this by an audible signal (beep), and the LED changes from red to green. The hand held scanner's display shows the price of the item selected and the number of units of this item that have been scanned so far. The customer then places the scanned item in the shopping cart. For radio scanners, note that there may be a short delay between pressing a button and seeing the updated information on the display. The top right-hand corner of the display normally shows a small vertical bar;

when the customer presses a button, this bar begins to rotate to indicate that processing is in progress, and continues to rotate until the screen is updated.

If the hand held scanner reads the bar code successfully but does not have a record of the item corresponding to the bar code, it displays a message asking the customer to give the item to the cashier. The customer can still purchase the item, but must keep it separate from the other items in the shopping cart, and then ask the cashier to scan it when paying for the selected items (as described in Checking Out below). The customer may also find that some items cannot be scanned (because the bar code is missing, or because it is damaged and cannot be read by the hand held scanner); these items are handled in the same way. Items that cannot be scanned successfully, and must be scanned by the cashier, are known as "exception items".

Instead of holding the hand held scanner and pointing it at the bar code, the customer may leave the hand held scanner in the holder on the shopping cart, and pass each item's bar code in front of the reader after pressing the "+" button. This method is useful when handling heavy or bulky items that require both hands. Preferably, the "+" and "−" keys activate the bar code reader for at least 3 seconds so as to allow the customer time to properly position a bulky item in the beam path of the bar code reader.

If the customer scans an item but later decides not to purchase it, the item can be subtracted from the total. To do this, the customer scans the item by pressing the "−" button on the hand held scanner instead of the "+" button. When the hand held scanner has successfully read the bar code, it indicates this in one of two ways. First, for an item that was scanned successfully, the hand held scanner displays the item price of the item (on batch scanners, this is preceded by a minus sign to indicate that the item has been removed), and the remaining number of units of this item that have been previously scanned. For example, if the customer scans three of the same item and later removes one, the display will show two items remaining. Second, for an exception item (one for which the message "Give to Cashier" was displayed when scanning), the hand held scanner displays the message "Item removed". The customer then places the removed item back on the store shelf.

Optionally, while shopping the customer can check a running total by depressing the "=" button on the hand held scanner. The hand held scanner then displays the total value of all items selected so far, including applicable taxes and discounts. In the U.S. and other areas where certain items can be purchased using food stamps, an optional feature allows the customer to press the "=" button a second time to display the total value of the selected items that may be paid for using food stamps. Where this does not apply, pressing the "=" button a second time has no effect.

In the U.S. and some other areas, taxes may be payable on individual items but not be included in the item price. In these areas, note that the total spend will be greater than the sum of the item prices because it includes the taxes.

By pressing the appropriate keys, if available, the customer can view details of the items already scanned, as follows. By pressing the "I" button on a 5-key scanner, for example, the customer can view the item descriptions of the last three items scanned; after a short period of time (typically a few seconds), the item prices appear on the display, overwriting the rightmost characters of each item description. Pressing the "I" button again displays the previous three items, and so on back on the first item scanned. There is no need to wait for the item prices to appear before pressing the button again. If the number of items in the transaction is not a multiple of 3, scrolling back to the first item scanned results in a display showing only one or two items. In this case, the first line or the first two lines of the display contain a text message indicating that the top of the list is being displayed. Pressing the "II" button displays the next three items, and so on to the last item scanned. While the customer is using this feature, the last line of the hand held scanner display shows a reminder that the "I" button scrolls up and the "II" button scrolls down. If the customer has scanned an item and later removed it using the "−" button, the item is not included in the displayed list.

When a button on the hand held scanner is pressed to display an item price (added or subtracted) or the total value so far, this value remains on the display for 10 seconds. After this, the hand held scanner display reverts to showing a count of the total number of items scanned so far.

For radio scanners, if the customer presses a button that is not valid at the time it is used, the hand held scanner indicates this by an audible signal (short beep). For example, this occurs if the customer presses the "−" button when no items have yet been scanned, or presses the "I" button when the hand held scanner is already showing the first item in the list.

Referring again to FIG. 44, once the customer has scanned-in the items to be purchased, the customer must return the portable terminal (Step 4408) and collect a transaction ticket/receipt (Step 4410). After scanning all the required items, the customer replaces the hand held scanner in any available rack or cradle slot. In some stores, there may be a separate rack for returned scanners (at the far end of the store, on the way to the checkouts); this is known as a "remote return rack." Otherwise, the customer returns to the original rack at the entrance to the store to return the hand held scanner.

Once the portable terminal is returned, the customer is provided with a transaction ticket via a printing device at the rack or cradle location (Step 4410). The information on the transaction ticket is printed in the customer's preferred language, and typically includes the following information: customer name and card number; date and time at which the transaction ticket was printed; a list of exception items, for which the hand held scanner read the bar code successfully but did not have a record of the item; the total price of all the successfully scanned items; and a bar code which will be used at the checkout to represent the transaction.

Alternatively, a customer having scanned-in all the purchased items is merely instructed to proceed with further action without having to first collect a transaction ticket and/or receipt. For example, once the customer has scanned in all the items, he or she can be instructed to proceed to a checkout counter or return the scanner device without receiving a transaction ticket or receipt.

Next as shown in FIG. 44, the customer must pay for and receive the selected items (Step 4412). Accordingly, all scanned items are routed through a standard point-of-sale station, where the price of the scanned items are recalculated based on the latest available price data. If the price of one or more items has changed since the price data was last loaded into the customer's hand held scanner, the recalculation performed at the point-of-sale may mean that the price or total value shown on the customer's transaction ticket, if available, does not match that on the hand held scanner. The customer must retain this transaction ticket and present it at the checkout. If there is a problem with printing the transaction ticket (for example, if the printer is faulty or out of paper), or if the transaction ticket is lost or damaged before the customer reaches the checkout, the customer can request a reprint of the transaction ticket by presenting his or her shopper card at the Customer Service terminal.

If the customer decides to purchase additional items after obtaining the transaction ticket and before checking out, these items should be placed with the exception items, if any, and kept separate from the other items in the shopping cart. The customer then asks the cashier to scan them, as for exception items.

The herein described embodiments of the present invention are intended to provide the preferred embodiments of the present invention as currently contemplated by the applicants. It would be obvious to any one of skill in the relevant art based on the herein described examples without straying from the present invention that numerous modifications could be made to the described preferred embodiments. Accordingly, the herein described embodiments are merely exemplary in nature and are not intended to represent every possible embodiment of the present invention.

What is claimed is:

1. A personal shopping system for servicing customers at shopping establishment and remote locations over at least one communications network, the shopping system comprising:
    at least one point-of-sale (POS) system located in the shopping establishment;
    at least one establishment or remotely located portable shopping terminal that acquires shopping related data;
    one or more proximity sensors that monitor customer activity in product sales areas in the shopping establishment; and
    a centrally located controller that communicates with the POS system, the at least one shopping terminal and the proximity sensors via the at least one network, processes the shopping related data, and controls shopping transactions engaged in by the customers, the at least one shopping terminal is a bar code storage device that reads bar codes from a hardcopy source, stores the bar codes, and transfers the bar codes to the controller over the at least one network, the controller including at least one computer executable instruction that generates a theft condition upon expiration of a time period that starts after receipt of a signal from the proximity sensor, the controller further comprises a means for processing transactions related to the shopping establishment including start of day processing, normal store processing, end of day processing and overnight processing.

2. The shopping system according to claim 1, the portable terminal comprising an elongated pen-shaped housing having an end with an optically transparent passage there through that enables bar codes to be read.

3. The shopping system according to claim 1, the portable terminal comprising:
    a housing having a generally elongated rectangular design which fits into user's hand, the housing having a front surface, a back surface, a top surface, a bottom surface and two side surfaces;
    a touch sensitive display disposed on the front surface;
    a plurality of buttons disposed on the front surface wherein each of the buttons is associated with at least one user function or application upon activation;
    a bar code reader that reads bar codes, the bar code reader including a visible light source that displays the area of reading for the bar code reader upon activation of a bar code reading function on the portable terminal, the bar code reader being configured to transmit the visible light away from the top surface of the portable terminal's housing such that the light is visible to the user holding the portable terminal; and
    at least two bar code activation buttons located on the two side surfaces of the housing such that the user's hand supports the portable terminal from the bottom and side surfaces of the portable terminal upon activation of the bar code reader with either of the bar code activation buttons, the user can view the display and the visible light source upon activation of either of the bar code activation buttons.

4. The shopping system according to claim 3, the portable terminal further comprises a touch sensitive area within the touch sensitive display that receives data inputs from a stylus pen.

5. The shopping system according to claim 3, the portable terminal further comprises an information key that allows a user to display product information.

6. The shopping system according to claim 1, the controller comprises inference means for deriving a shopping profile for the customer.

7. The shopping system according to claim 1, the at least one shopping terminal comprises means for converting any currency amount to and from a corresponding Euro amount.

8. The shopping system according to claim 1, the at least one shopping terminal is coupled to a telephone line and the shopping terminal comprises means for providing secure and silent communications to transmit data to and from the shopping terminal without notifying or disturbing a user.

9. The shopping system according to claim 1, the shopping terminal comprises means for fingerprint identification.

10. The shopping system according to claim 1, the bar code storage device comprises:
    an egg-shaped housing;
    a bar code reader that reads bar codes from a hardcopy source, the bar code reader including a visible light indicator that indicates the scanning status of the bar code reader and at least one bar code activation button located on the top surface of the bar code storage device that activates the bar code reader;
    memory storage mean coupled to the bar code reader for storing the bar codes; and
    communication means for transferring the bar codes to the controller over the at least one network.

11. The shopping system according to claim 1, the at least one shopping terminal comprises a scanning system comprising a wearable computer processor and a wearable scanning device in communication with the computer processor.

12. The shopping system according to claim 11, the scanning system further comprises a headset having a speaker and a miniature display device that provides audio, graphical and video information.

13. The system of claim 1, the controller activates one of an alarm and a camera upon receipt of a theft condition.

14. The shopping system according to claim 1, the controller means for controlling the transaction processing and the operation of the POS system and the at least one shopping terminal comprises:
    means for communicating with at least one shopping terminal located within the shopping establishment;
    means for communicating with at least one remotely located shopping terminal outside the shopping establishment via a telephone;
    means for communicating voice data between the controlling means and the at least one remotely located shopping terminal;

means for remotely ordering goods to be gathered by store personnel at the shopping establishment; and means for communicating with the at least one remotely located shopping terminal over the Internet.

15. The shopping system according to claim 14, the controlling means comprises:

means for starting and restarting the operation of the shopping system;

means for terminating the operation of the shopping system;

means for displaying the operational status of the shopping system;

means for controlling the day-to-day operations and maintenance tasks of the shopping system;

means for displaying the status of communications related to the shopping system;

means for preparing the shopping system to accept an upcoming day's transactions;

means for transferring price data files from the POS system to the controller; and means for allowing a system operator to disable checking on transactions by the controller so as to speed up checkout processing during busy periods.

16. The shopping system according to claim 14, the means for remotely ordering goods is used to generate a picking list from a home computing terminal having access to the Internet.

17. The shopping system according to claim 1, the shopping terminal is a portable terminal, the portable terminal comprising means for freely associating with a corresponding communications network.

18. The system of claim 1, the proximity sensors are affixed to at least one self in a product area and are activated upon removal of a product from the self.

19. The system of claim 18, activation of a proximity sensor triggers a status identifier that signifies that the system anticipates a product to be scanned by the portable shopping terminal.

20. The system of claim 19, the theft condition is triggered after failure to detect a product scan within a predetermined period of time after activation of one or more sensors.

21. A personal shopping system that services customers at one or more shopping establishments and remote locations over at least one communications network, the shopping system comprising:

at least one point-of-sale (POS) system located in the shopping establishment;

at least one establishment or remotely located portable shopping terminal that acquires shopping related data; and a centrally located controller that communicates with the POS system and the at least one shopping terminal via the at least one network, processes the shopping related data, and controls shopping transactions engaged in by the customers, the controller including at least one computer executable instruction that generates a theft condition upon expiration of a time period that starts after receipt of a signal from the proximity sensor, the controller comprising:

means for starting and restarting operation of the shopping system;

means for terminating operation of the shopping system;

means for displaying operational status of the shopping system;

means for controlling the day-to-day operations and maintenance tasks of the shopping system;

means for displaying the status of communications related to the shopping system;

means for preparing the shopping system to accept an upcoming day's transactions;

means for transferring price data files from the POS system to the controller; and means for allowing a system operator to disable checking on transactions by the controller so as to speed up checkout processing during busy periods.

* * * * *